(12) United States Patent
Zhang et al.

(10) Patent No.: US 12,520,075 B2
(45) Date of Patent: Jan. 6, 2026

(54) CLIPPING EARPHONES

(71) Applicant: SHENZHEN SHOKZ CO., LTD., Guangdong (CN)

(72) Inventors: Lei Zhang, Shenzhen (CN); Chaojie Cui, Shenzhen (CN); Lei Zhong, Shenzhen (CN); Jiang Xu, Shenzhen (CN); Weijie Yuan, Shenzhen (CN); Lei Wang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/976,303

(22) Filed: Dec. 10, 2024

(65) Prior Publication Data

US 2025/0193579 A1 Jun. 12, 2025

Related U.S. Application Data

(63) Continuation of application No. PCT/CN2024/076378, filed on Feb. 6, 2024.

(30) Foreign Application Priority Data

Dec. 11, 2023 (CN) .......................... 202311701969.7

(51) Int. Cl.
*H04R 1/28* (2006.01)
*H04R 1/10* (2006.01)
*H04R 9/06* (2006.01)

(52) U.S. Cl.
CPC ......... *H04R 1/2826* (2013.01); *H04R 1/1008* (2013.01); *H04R 1/105* (2013.01);
(Continued)

(58) Field of Classification Search
CPC .... H04R 1/1016; H04R 3/005; H04R 1/1041; H04R 2410/05; H04R 1/1083; H04R 3/04;
(Continued)

(56) References Cited

U.S. PATENT DOCUMENTS

| 11,140,469 B1 | 10/2021 | Miller et al. |
| 2015/0110329 A1* | 4/2015 | Tanaka ................ H04R 1/1016 381/380 |

(Continued)

FOREIGN PATENT DOCUMENTS

| CN | 115942181 A | 4/2023 |
| CN | 116320876 A | 6/2023 |

(Continued)

OTHER PUBLICATIONS

International Search Report in PCT/CN2024/076378 mailed on Aug. 7, 2024, 7 pages.
(Continued)

*Primary Examiner* — Carolyn R Edwards
*Assistant Examiner* — Julie X Dang
(74) *Attorney, Agent, or Firm* — METIS IP LLC

(57) ABSTRACT

Embodiments of the present disclosure provide a clipping earphone, comprising a sound-production portion disposed within a concha cavity of a wearer and in contact with an inner wall of the concha cavity. The sound-production portion includes a shell, the shell forming an accommodation cavity; a sound-production component, accommodated in the accommodation cavity; a sound outlet hole, disposed on the shell and configured to export a sound generated by the sound-production component, wherein a portion of the sound outlet hole is blocked by the inner wall of the concha cavity; an abutting portion, configured to abut against the back of an ear of a wearer; and an ear hook, configured to
(Continued)

bypass an antihelix and helix of the wearer to connect the sound-production portion and the abutting portion.

19 Claims, 25 Drawing Sheets

(52) U.S. Cl.
CPC ............. *H04R 1/1075* (2013.01); *H04R 9/06* (2013.01); *H04R 2400/11* (2013.01); *H04R 2460/11* (2013.01)

(58) Field of Classification Search
CPC .. H04R 1/406; H04R 1/105; H04R 2201/025; H04R 2499/11; H04R 2430/01; H04R 1/2826; H04R 1/1008; H04R 1/1075; H04R 9/06; H04R 2400/11; H04R 2460/11; H04W 52/0254; Y02D 30/70
USPC ........................................ 381/370, 380, 381
See application file for complete search history.

(56) References Cited

U.S. PATENT DOCUMENTS

| 2022/0095029 | A1* | 3/2022 | Zheng | H04R 1/1008 |
| 2023/0247339 | A1* | 8/2023 | Stark | H04R 1/1008 381/370 |

FOREIGN PATENT DOCUMENTS

| CN | 219780339 U | * | 9/2023 |
| CN | 219919124 U | | 10/2023 |
| CN | 220023018 U | | 11/2023 |
| JP | 3239620 U | | 10/2022 |

OTHER PUBLICATIONS

Written Opinion in PCT/CN2024/076378 mailed on Aug. 7, 2024, 9 pages.
The Extended European Search Report in European Application No. 24817823.8 mailed on Oct. 13, 2025, 7 pages.

* cited by examiner

Free field $\theta=0°$ (a)

$\theta=60°$ (b)

$\theta=120°$ (c)

$\theta=180°$ (d)

$\theta=240°$ (e)

$\theta=300°$ (f)

CLIPPING EARPHONES

CROSS REFERENCE TO RELATED APPLICATIONS

This application is a Continuation of International Application No. PCT/CN2024/076378, filed on Feb. 6, 2024, which claims priority to Chinese application No. 202311701969.7, filed on Dec. 11, 2023, the entire contents of which are incorporated herein by reference.

TECHNICAL FIELD

The present disclosure relates to the field of sound-production devices, and in particular, to a clipping earphone.

BACKGROUND

With the development of acoustic output technology, acoustic devices (such as earphones) have been widely used in daily life. These devices can be paired with electronic equipment like smartphones and computers to provide audio playback for users. The clipping earphone is a new type of earphone that is typically compact and can be clipped onto the wearer's helix for use. Unlike in-ear earphones, clipping earphones do not block the ear canal, ensuring safety in outdoor environments and offering better comfort compared to in-ear earphones. However, due to their small size, clipping earphones suffer from issues such as insufficient volume and poor sound quality that needs improvement.

Therefore, it is necessary to propose a clipping earphone to improve the output performance of a clipping earphone.

SUMMARY

Embodiments of the present disclosure provide a clipping earphone, comprising: a sound-production portion, configured to be disposed within a concha cavity of a wearer and in contact with an inner wall of the concha cavity, including a shell, the shell forming an accommodation cavity; a sound-production component accommodated in the accommodation cavity; and a sound outlet hole disposed on the shell and being configured to export a sound generated by the sound-production component, wherein a partial region of the sound outlet hole is blocked by the inner wall of the concha cavity; an abutting portion configured to abut behind an ear of the wearer; and an ear hook configured to bypass an antihelix and a helix of the wearer and connect the sound-production portion and the abutting portion.

In some embodiments, the ear hook has a first symmetry plane, a projection of an outer end surface of the sound outlet hole on the first symmetry plane forms an arcuate segment, and a projection of the shell on the first symmetry plane has an arcuate outer profile, and at least a portion of the arcuate outer profile overlaps the arcuate segment.

In some embodiments, the shell has a feature point that is in contact with or closest to the abutting portion, a projection of the feature point on the first symmetry plane forms a first projection point, and an arcuate length between an endpoint of two endpoints of the arcuate segment that is closer to the first projection point and the first projection point is in a range of 1.7 mm to 4.5 mm.

In some embodiments, an arcuate length between an endpoint of the two endpoints of the arcuate segment that is farther away from the first projection point and the first projection point is in a range of 12 mm to 15.5 mm.

In some embodiments, the shell projects onto and forms a first projection on the first symmetry plane, the abutting portion projects onto and forms a second projection on the first symmetry plane, and a tangent line that is tangent to a lower endpoint of the first projection and a lower endpoint of the second projection is a common tangent line, and a first tangent point of the common tangent line and the first projection is located on the arcuate segment.

In some embodiments, a ratio of an arcuate length between a first endpoint of the arcuate segment and the first tangent point to an arcuate length between a second endpoint of the arcuate segment and the first tangent point is in a range of 0.5 to 0.85, the first endpoint is an endpoint of two endpoints of the arcuate segment that is closer to the first projection point, and the second endpoint is an endpoint of the two endpoints of the arcuate segment that is farther away from the first projection point, and the second endpoint of the arcuate segment is closer to an ear canal opening of the ear.

In some embodiments, a normal line at the first tangent point intersects a normal line at a first endpoint point of the arcuate segment or a normal line at a second endpoint point of the arcuate segment at a center point, and a line connecting the first endpoint and the center point forms a first angle with a line connecting the first tangent point and the center point, a line connecting the second endpoint and the center point form a second angle with the line connecting the first tangent point and the center point, and a ratio of the first angle to the second angle is in a range of 0.2 to 1.3.

In some embodiments, the first angle is in a range of 15° to 55°.

In some embodiments, the second angle is in a range of 40° to 80°.

In some embodiments, an arcuate length of the arcuate segment is in a range of 5.2 mm to 16.7 mm, and a width of the sound outlet hole is in a range of 1.4 mm to 2.2 mm.

In some embodiments, a ratio of an arcuate length of the arcuate segment to a length of a straight line segment between a first endpoint and a second endpoint of the arcuate segment is in a range of 1.05 to 1.4.

In some embodiments, the ear hook has a first symmetry plane, and the sound outlet hole is located on one side of the first symmetry plane.

In some embodiments, the sound outlet hole has an outer end surface with an elongated shape, the outer end surface has a second symmetry plane that is parallel to a length wise extension direction of the outer end surface, and an angle between the first symmetry plane and the second symmetry plane is in a range of 15° to 45°.

In some embodiments, a projection of the outer end surface of the sound outlet hole on the first symmetry plane forms an arcuate segment, the clipping earphone further comprises a pressure relief hole, a shortest straight line distance between a projection point of a center of the pressure relief hole on the first symmetry plane and the arcuate segment is in a range of 8.1 mm to 11 mm.

In some embodiments, the shell has a feature point that is in contact with or closest to the abutting portion, a projection of the feature point on the first symmetry plane forms a first projection point, the clipping earphone further comprises a pressure relief hole, an arcuate length between a projection point of a center of the pressure relief hole on the first symmetry plane and the first projection point is in a range of 7.5 mm to 9.5 mm.

In some embodiments, the ear hook has a first symmetry plane, the sound outlet hole has an outer end surface with an elongated shape, the outer end surface has a second symmetry plane parallel to a lengthwise extension direction of the outer end surface, and the second symmetry plane is perpendicular to the first symmetry plane.

In some embodiments, the sound outlet hole has a center axis, and the center axis is disposed on the first symmetry plane.

In some embodiments, the clipping earphone further comprises two pressure relief holes, the two pressure relief holes being symmetrically arranged with respect to the first symmetry plane.

In some embodiments, the sound outlet hole has a center axis, and the center axis derivates from the first symmetry plane.

In some embodiments, the shell has a feature point that is in contact with the abutting portion or is closest to the abutting portion, the feature point projects onto the first symmetry plane to form a first projection point; and a straight line distance between a center of a projection of the outer end surface of the sound outlet hole on the first symmetry plane and the first projection point is in a range of 7.0 mm to 8.5 mm.

In some embodiments, the sound-production component includes two sound drivers, a first sound transmission channel is formed between vibration diaphragms of the two sound drivers, the sound outlet hole is in acoustic communication with the first sound transmission channel, and the first sound transmission channel forms a front cavity or a portion of the front cavity of the two sound drivers.

In some embodiments, each sound driver includes a magnet and a magnetic shield sequentially remote from a corresponding vibration diaphragm, and a basket for support; at least one of the basket or the magnetic shield is provided with a plurality of air vent holes, a second sound transmission channel is formed between the two baskets of the two sound drivers, back sides of the two vibration diaphragms of the two sound drivers are in acoustic communication with the second sound transmission channel via the air vent holes on the baskets, and the second sound transmission channel forms a rear cavity or a portion of the rear cavity of the two sound drivers.

In some embodiments, a difference between a resonance frequency of the front cavity and a resonance frequency of the rear cavity is in a range of 0.5 kHz to 1.5 kHz.

In some embodiments, the resonance frequency of the front cavity is less than 6 kHz.

In some embodiments, the resonance frequency of the rear cavity is more than 4.5 kHz.

In some embodiments, an area of the sound outlet hole is in a range of 5 $mm^2$ to 18 $mm^2$.

In some embodiments, a volume of the front cavity is in a range of 60 $mm^3$ to 120 $mm^3$.

In some embodiments, an area of the pressure relief hole is in a range of 6 $mm^2$ to 15 $mm^2$.

In some embodiments, a volume of the rear cavity is in a range of 80 $mm^3$ to 180 $mm^3$.

In some embodiments, the air vent holes on the two baskets are located on two sides of the first symmetry plane, respectively, and the pressure relief hole extends in a direction perpendicular to the first symmetry plane.

In some embodiments, two ends of the pressure relief hole extend to one air vent hole on each of the two baskets, respectively.

In some embodiments, the two ends of the pressure relief hole have a larger opening size than a middle segment of the pressure relief hole.

In some embodiments, the shell includes a first rigid shell, a second rigid shell, and a first flexible body configured to contact with the concha cavity of the wearer; the first rigid shell and the second rigid shell combine to form the accommodation cavity; the first flexible body covers an outer wall of the second rigid shell; and the sound outlet hole is located on the second rigid shell and the first flexible body.

In some embodiments, the ear hook has a first symmetry plane, and the shell has a feature point that is in contact with or closest to the abutting portion; the feature point projects onto the first symmetry plane to form a first projection point, the ear hook projects onto the first symmetry plane to form a third projection, the third projection includes an inner contour curve, a point on the inner contour curve that is farthest from the first projection point is designated as a second feature point, and a distance between the first projection point and the second feature point is in a range of 15 mm to 20 mm.

In some embodiments, the shell projects onto the first symmetry plane to form a first projection, and a line connecting the first projection point and the second feature point is defined as a first connection line, a first auxiliary line is drawn from the second feature point toward one side of the first projection, and a value of an angle between the first auxiliary line and the first connection line has a first preset range, an intersection point between a curve segment on the inner contour curve that is connected with the first projection and the first auxiliary line is defined as a fourth feature point, a line connecting the fourth feature point and the second feature point is defined as a second connection line, and the first preset range is in a range of 30° to 41°.

In some embodiments, a portion of the inner contour curve corresponding to the second connection line has a first arcuate length, and a ratio of the first arcuate length to a length of the second connection line is defined as a first arc-chord ratio, and the first arc-chord ratio is in a range of 1.05 to 1.25.

In some embodiments, with the fourth feature point as a center, a second arcuate segment and a third arcuate segment are determined on two sides of the fourth feature point, respectively, an arcuate length of the second arcuate segment and an arcuate length of the third arcuate segment are in a preset arcuate length range, a line connecting an end of the second arcuate segment that is farthest from the fourth feature point and an end of the third arcuate segment that is farthest from the fourth feature point is defined as a third connection line, an arcuate segment corresponding to the third connection line has a second arcuate length, the preset arcuate length range is in a range of 2.5 mm to 3.5 mm, a ratio of the second arcuate length to a length of the third connection line is defined as a second arc-chord ratio, and second arc-chord ratio is in a range of 1.26 to 1.44.

In some embodiments, the clipping earphone further comprises a pressure relief hole, wherein a projection of the pressure relief hole onto the first symmetry plane is located on the arcuate segment corresponding to the third connection line.

BRIEF DESCRIPTION OF THE DRAWINGS

The present disclosure is further illustrated in terms of exemplary embodiments. These exemplary embodiments are described in detail with reference to the drawings. These embodiments are not limiting, and in these embodiments, the same numbering denotes the same structure, where.

DETAILED DESCRIPTION

Figure 1A:
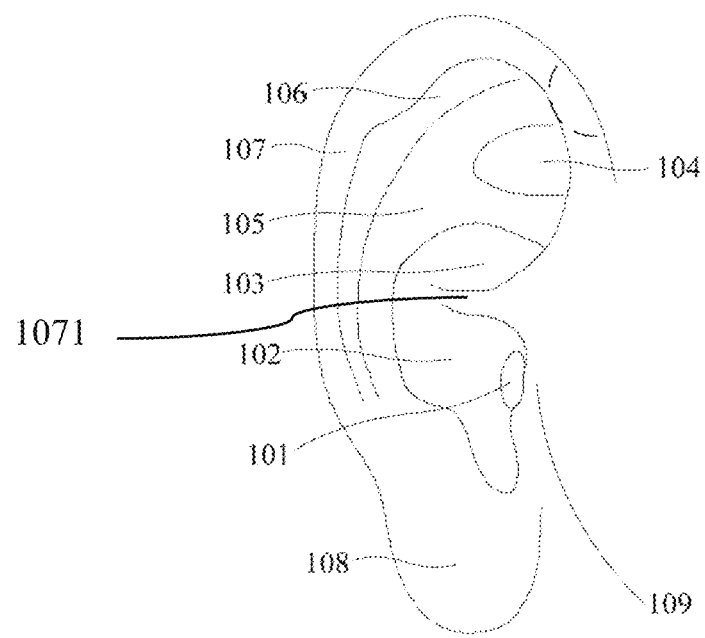
FIG. 1A is a schematic diagram illustrating an exemplary ear portion according to some embodiments of the present disclosure.

In order to more clearly illustrate the technical solutions of the embodiments of the present disclosure, a brief description of the accompanying drawings required to be used in the description of the embodiments is given below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system", "device", "unit" and/or "module" as used herein is a way to distinguish between different components, elements, parts, sections, or assemblies at different levels. However, other expressions may replace words if other words accomplish the same purpose.

As shown in the present disclosure and in the claims, unless the context clearly suggests an exception, the words "one", "a", "an," "one kind," and/or "the" do not refer specifically to the singular, but may also include the plural. Generally, the terms "including" and "comprising" suggest only the inclusion of clearly identified steps and elements that do not constitute an exclusive list, and the method or apparatus may also include other steps or elements.

In the description of the present disclosure, it is to be understood that the terms "first", "second", "third", "fourth", etc. are used only for descriptive purposes and are not to be understood as indicating or implying relative importance or implicitly specifying the number of technical features indicated. Thereby, the limitations "first", "second", "third", "fourth" may expressly or implicitly include at least one such feature. In the description of the present disclosure, "plurality" means at least two, e.g., two, three, or the like, unless explicitly and specifically limited otherwise.

In the present disclosure, unless otherwise expressly specified or limited, the terms "connection", "fixing", etc. are to be understood broadly. For example, the term "connection" refers to a fixed connection, a detachable connection, or a one-piece connection; a mechanical connection, or an electrical connection; a direct connection, or an indirect connection through an intermediate medium, a connection within two elements, or an interaction between two elements, unless expressly limited otherwise. For those of ordinary skill in the art, the specific meanings of the above terms in the present disclosure may be understood on a case-by-case basis.

FIG. 1A is a schematic diagram illustrating an exemplary ear portion according to some embodiments of the present disclosure. Referring to FIG. 1A, an ear portion 100 (which may also be referred to as an auricle) may include an external ear canal 101, a concha cavity 102, a cymba conchae 103, a triangular fossa 104, an anthelix 105, a scapha 106, a helix 107, an earlobe 108, a tragus 109, and an auricular foot 1071. In some embodiments, stabilization of the wearing of an acoustic device is achieved by one or more parts of the ear portion 100 supporting the acoustic device. In some embodiments, the external ear canal 101, the concha cavity 102, the cymba conchae 103, the triangular fossa 104, or the like, have a certain depth and volume in a three-dimensional space, which may be used to realize the need for wearing the acoustic device. For example, an acoustic device (e.g., in-ear earphones) is worn in the external ear canal 101. In some embodiments, the wearing of the acoustic device may be realized with the help of other parts of the ear portion 100 other than the external ear canal 101. For example, the wearing of the acoustic device is achieved with the aid of the cymba conchae 103, the triangular fossa 104, the anthelix 105, the scapha 106, the helix 107, other parts of the ear portion, or a combination thereof. In some embodiments, the earlobe 108 is further utilized to improve the comfort and reliability of the acoustic device in terms of wearing. Wearing the acoustic device and transmitting sound by utilizing parts of the ear portion 100 other than the external ear canal 101 can "liberate" the user's external ear canal 101. When the user wears the acoustic device, the acoustic device does not block the user's external ear canal 101 (or the ear canal or an opening of the ear canal), and the user receives both sounds from the acoustic device and sounds from the environment (e.g., honking, car bells, sounds of people nearby, sounds of traffic directing, etc.), which can reduce a probability of a traffic accident. In some embodiments, the acoustic device is designed to fit the ear portion 100 according to the construction of the ear portion 100 to realize a sound-production portion of the acoustic device to be worn at various positions of the ear. For example, when the acoustic device is a clipping earphone, the clipping earphone includes a sound-production portion, an abutting portion, and an ear hook, and the ear hook has a curved structure that is capable of bypassing the antihelix 105 and the helix 107 of a wearer and connecting the sound-production portion and the abutting portion, so that the sound-production portion is located in the concha cavity 102 and is in contact with an inner wall of the concha cavity 102, and the abutting portion abuts behind the ear of the wearer.

Individual differences may exist between different users, resulting in different shapes, sizes, and other differences in the ear. For ease of description and understanding, the present disclosure will primarily use a model of an ear with a "standard" shape and size as a reference for further describing different embodiments of the ear in different embodiments, if not otherwise specified. For example, a simulator with a head and (left and right) ear portions, e.g. GRAS 45BC KEMAR, obtained based on ANSI: S3.36, S3.25 and IEC: 60318-7 standards may be used as a reference for wearing an acoustic device to present a scenario in which the majority of users normally wear an acoustic device. Merely by way of example, the ear portion as a reference may have the following relevant features including: a dimension of a projection of the auricle on a sagittal plane along a vertical axis being in a range of 49.5 mm to 74.3 mm, and a dimension of the projection of the auricle on a sagittal plane along a sagittal axis being in a range of 36.6 mm to 55 mm. Accordingly, in the present disclosure, words such as "worn by a wearer", "in a wearing state", "under a wearing state", or the like, refer to the acoustic device described in the present disclosure being worn in the ear portions of the aforementioned simulator. Taking into account that there are individual differences among different users, the structure, shape, size, thickness, etc., of one or more parts of the ear portion 100 may be somewhat different. In order to meet the needs of different users, the acoustic device can be differentiated, and these differentiations can be expressed in the fact that the feature parameters of one or more of the structures in the acoustic device (e.g., the sound-production portion, the ear hook, etc., hereinafter) may be in different ranges to adapt to different ears.

It should be noted that in the fields of medicine and anatomy, three basic section surfaces of the human body including a sagittal plane, a coronal plane and a horizontal plane, and three basic axes including a sagittal axis, a coronal axis, and a vertical axis, are defined. The sagittal plane is a section surface perpendicular to the ground along an anterior-posterior (e.g., the chest to the back) direction of the body, which divides the body into left and right parts; the coronal plane is a section surface perpendicular to the ground along a left-right (e.g., the left shoulder to the right shoulder) direction of the body, which divides the body into front and rear parts; the horizontal plane is a section shoulder parallel to the ground along an up-down (e.g., top of the head to the bottom of the feet) direction perpendicular to the body, which divides the human body is divided into upper and lower parts. Correspondingly, the sagittal axis is an axis along the anterior-posterior direction of the body and perpendicular to the coronal plane, the coronal axis is an axis along the left-right direction of the body and perpendicular to the sagittal plane, and the vertical axis is an axis along the up-down direction of the body and perpendicular to the horizontal plane. By observing the ear of the above-described simulator along the direction in which the coronal axis of the body is located, a schematic diagram illustrating a front contour of an ear portion as shown in FIG. 1A may be obtained.

Figure 1B:
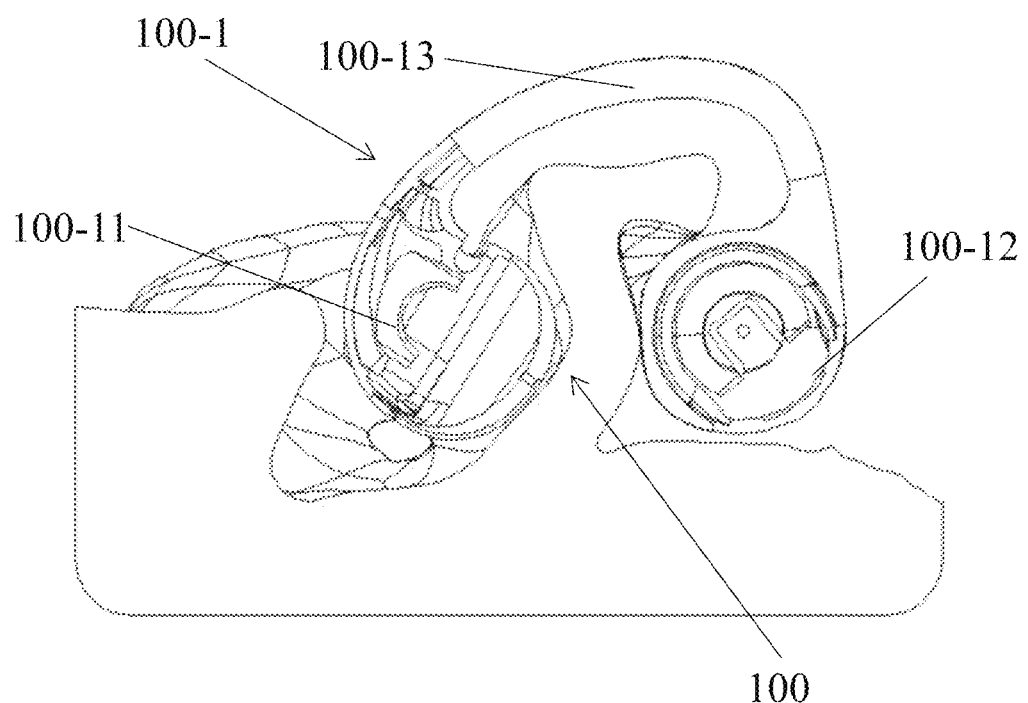
FIG. 1B is a schematic diagram illustrating wearing a clipping earphone according to some embodiments of the present disclosure.

FIG. 1B is a schematic diagram illustrating wearing a clipping earphone according to some embodiments of the present disclosure. In some embodiments, the clipping earphone includes but is not limited to an air-conduction earphone, a bone-conduction earphone, and an earphone with a combination of air-conduction and bone-conduction, or the like. As shown in FIG. 1B, a clipping earphone 100-1 may include a sound-production portion 100-11, an abutting portion 100-12, and an ear hook 100-13 connecting the sound-production portion 100-11 and the abutting portion 100-12. The clipping earphone 100-1 may be clamped to the ear portion 100 of the wearer by the cooperation of the ear hook 100-13, the sound-production portion 100-11, and the abutting portion 100-12.

In some embodiments, when the clipping earphone 100-1 is in a wearing state, the sound-production portion 100-11 is disposed within a concha cavity of the wearer (e.g., the concha cavity 102) and fits an inner wall of the concha cavity. The abutting portion 100-12 abuts behind the ear of the wearer, for example, abuts against the back of the concha cavity. Two ends of the ear hook 100-13 are connected to the abutting portion 100-12 and the sound-production portion 100-11, respectively, and a middle region between the two ends of the ear hook 100-13 forms an extension segment having a certain curvature, so that the ear hook 100-13 may bypass an antihelix (e.g., the antihelix 105) and helix (e.g., the helix 107) of the wearer when the ear hook 100-13 is worn. The ear hook 100-13 may be resilient, when the sound-production portion 100-11 is moving away from the abutting portion 100-12, the ear hook 100-13 may provide a resilient force that drives the sound-production portion 100-11 closer to the abutting portion 100-12. In the wearing state, a resilient force of the ear hook 100-13 may be converted into a clamping force that makes the sound-production portion 100-11 and the abutting portion 100-12 to be clamped on two sides of the concha cavity, thereby ensuring the wearing stability.

In some embodiments, in order to match a shape of the concha cavity, a shape of a shell of the sound-production portion 100-11 needs to be similar to the shape of the concha cavity in the form of a sphere, a sphere-like body, or a fusiform body, so as to enable the sound-production portion 100-11 into full contact with the inner wall of the concha cavity and be clamped on the two sides of the concha cavity by cooperating with the abutting portion 100-12. Due to being constrained by a spatial dimension of the concha cavity, a small shell size of the sound-production portion 100-11 limits the size of a sound-production component disposed within the shell, resulting in a low efficiency of the sound-production portion 100-11.

On this basis, embodiments of the present disclosure propose a clipping earphone, including a sound-production portion, an abutting portion, and an ear hook for connecting the sound-production portion and the abutting portion. A sound outlet hole is provided on a shell of the sound-production portion, a portion of the sound outlet hole is blocked by a wall of a concha cavity in a wearing state, and a portion of the sound outlet hole that is not blocked is oriented toward an opening of an ear canal of a wearer. By providing that the portion of the sound outlet hole is blocked by the inner wall of the concha cavity, the inner wall of the concha cavity functions as a reflection wall in a direction of sound propagation near the direction of sound propagation. The reflection wall reflects a sound, thereby the sound exported out of the sound outlet hole forming a reflection field. In the reflection field, the interference and diffraction between reflected sound waves and source sound waves (i.e., original sound waves coming out of the sound outlet hole) create a sound reinforcement zone, which enhances the volume of a sound transmitted to the ear canal of the wearer.

Figure 2:
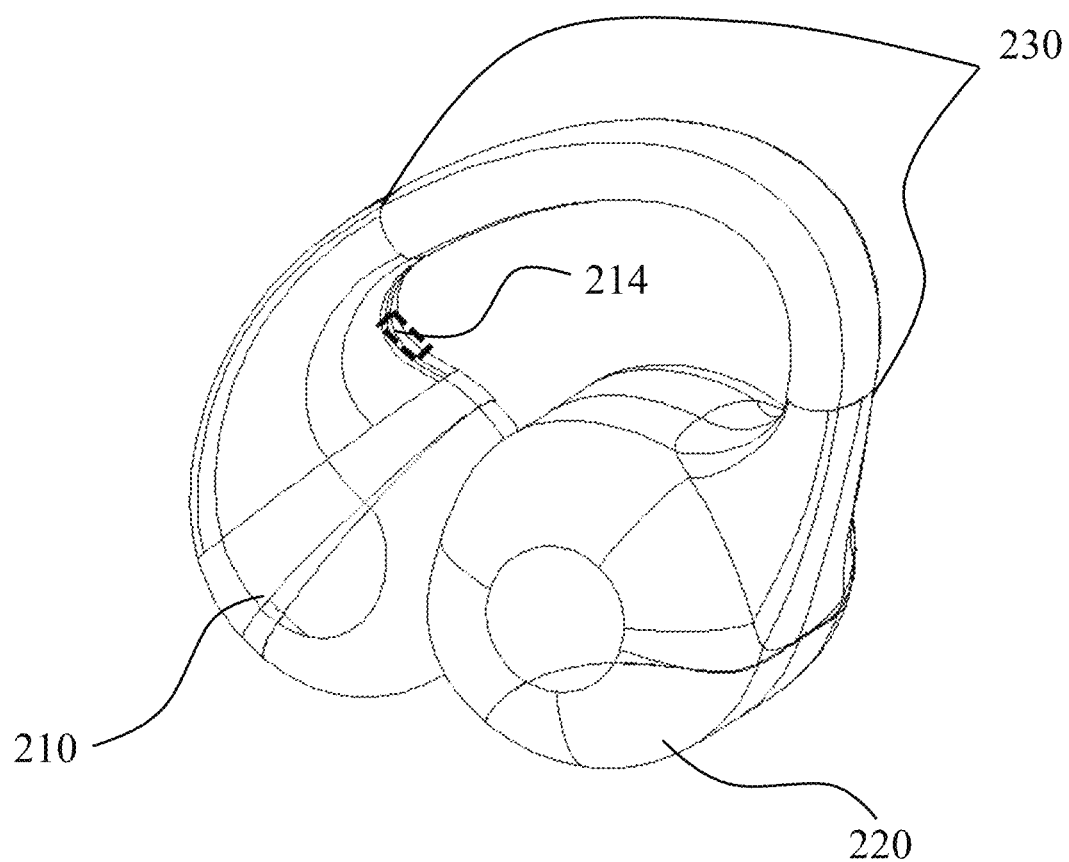
FIG. 2 is a schematic diagram illustrating an exemplary structure of a clipping earphone according to some embodiments of the present disclosure.
Figure 3:
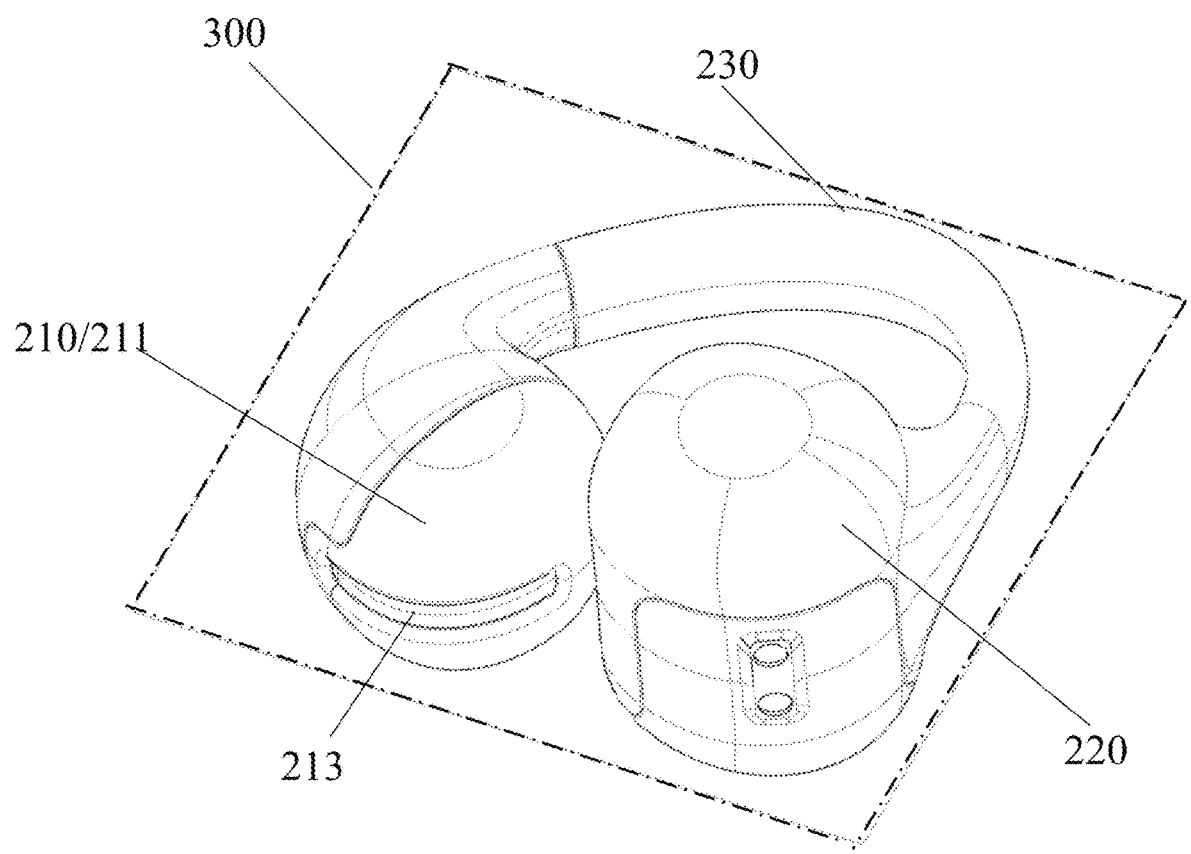
FIG. 3 is a schematic diagram illustrating an exemplary structure of a clipping earphone viewed from another angle according to some embodiments of the present disclosure.

FIG. 2 is a schematic diagram illustrating an exemplary structure of a clipping earphone according to some embodiments of the present disclosure. FIG. 3 is a schematic diagram illustrating an exemplary structure of a clipping earphone viewed from another angle according to some embodiments of the present disclosure. FIG. 2 is a front view of a clipping earphone when it is placed upright on a horizontal surface (e.g., a tabletop), and FIG. 3 is a front view of a clipping earphone when it is placed horizontally on a horizontal surface (e.g., a tabletop). In conjunction with FIG. 2 and FIG. 3, in some embodiments, a clipping earphone 200 may include a sound-production portion 210, an abutting portion 220, and an ear hook 230 for connecting the sound-production portion 210 and the abutting portion 220. The ear hook 230 has an overall arcuate structure. In conjunction with the above, when the clipping earphone 200 is in a wearing state, the ear hook 230 may bypass an antihelix (e.g., the antihelix 105) and helix (e.g., the helix 107) of a wearer such that the sound-production portion 210 is located in a concha cavity of the wearer (e.g., the concha cavity 102) and is in contact with an inner wall of the concha cavity, and the abutting portion 220 abuts behind an ear of the wearer. The sound-production portion 210 and the abutting portion 220 form a clamping state to clamp the ear, so as to clamp and wear the clipping earphone 200 on the helix of the wearer, thereby realizing the stable wearing of the clipping earphone 200.

The sound-production portion 210 is a sound-playing device. The sound-production portion 210 is configured to convert an electrical signal into a sound signal and play the sound signal to the wearer. For example, the sound signal generated by the sound-production portion 210 is transmitted to an opening of an ear canal of the wearer via a sound outlet hole 213 of the sound-production portion 210.

In some embodiments, as shown in FIG. 3, the sound-production portion 210 includes a shell 211, a sound-production component (e.g., a sound-production component 212 in FIG. 5), and the sound outlet hole 213. The shell 211 may be a frame body with a hollow structure. The ear hook 230 is connected to the shell 211. The shell 211 may form an accommodation cavity for accommodating other components (e.g., the sound-production component) of the sound-production portion 210. In some embodiments, the shell 211 includes a first rigid shell (e.g., a first rigid shell 2111 shown in FIG. 9) and a second rigid shell (e.g., a second rigid shell 2112 shown in FIG. 9), with the first rigid shell and the second rigid shell enclosing to form the accommodation cavity. One of the two rigid shells (e.g., the second rigid shell) is oriented toward and in contact with the inner wall of the concha cavity of the wearer. The other rigid shell is connected to the ear hook 230. In some embodiments, a material of the rigid shell is plastic, metal, or other materials capable of being used as a support material to provide better support and solidity to an internal structure (e.g., the sound-production component) of the shell 211. In some embodiments, the shell 211 also includes a flexible shell (e.g., a first flexible body 2113 shown in FIG. 9). An outer surface of one of the two rigid shells (e.g., the second rigid shell) that is in contact with the inner wall of the concha cavity of the user may be covered with the flexible shell, and the flexible shell can enhance the comfort of the clipping earphone 200 when worn and a matching degree between the clipping earphone 200 and the ear portions (such as the concha cavity) of the wearer. More information about the shell 211 can be found elsewhere in the present disclosure, e.g., in FIG. 9 and the related descriptions thereof.

The sound-production component is a module capable of converting an electrical signal into a sound signal. The sound-production component is disposed in the accommodation cavity formed by the shell 211. In some embodiments, the sound-production component includes a sound driver (also known as a horn). The sound driver may convert the electrical signal into the sound signal and output the sound signal. For example, the sound driver has a vibration diaphragm and a coil and a magnetic circuit assembly (e.g., a magnet and a magnetic guide shield) capable of driving a vibration of the vibration diaphragm. The vibration diaphragm may separate a cavity structure of the sound-production portion 210 into a front cavity and a rear cavity. The sound driver has a front side and a rear side. The front side of the sound driver may be a side of the vibration diaphragm that is back away from the magnetic circuit assembly, and the rear side of the sound driver may be a side of the vibration diaphragm that faces the magnetic circuit assembly or a side of the magnetic circuit assembly that is back away from the vibration diaphragm. During a vibration, the side of the vibration diaphragm that is back away from the magnetic circuit assembly and the side of the vibration diaphragm that faces the magnetic circuit assembly generate a sound, respectively, and the sound generated by the side of the vibration diaphragm that is back away from the magnetic circuit assembly radiates outwardly through the front cavity, and the sound generated by the side of the vibration diaphragm that faces the magnetic circuit assembly radiates outwardly through the rear cavity. In some embodiments, the sound-production component includes two sound drivers. The two sound drivers are disposed relative to each other (i.e., the vibration diaphragms of the two sound drivers are disposed relative to each other), and a sound transmission channel (also referred to as a first sound transmission channel) is formed between the vibration diaphragms of the two sound drivers. The first sound transmission channel is in acoustic communication with the sound outlet hole 213, and the first sound transmission channel forms the front cavity or a portion of the front cavity of the two sound drivers (which may also be understood that the two sound drivers share the front cavity). In some embodiments, each sound driver includes a magnet and a magnetic shield sequentially located away from a corresponding vibration diaphragm, and basket for support. Another sound transmission channel (also known as a second sound transmission channel) may be formed between the two baskets of the two sound drivers, and back sides of the two vibration diaphragms of the two sound drivers are in acoustic communication with the second sound transmission channel through air vent holes on the baskets. The second sound transmission channel forms the rear cavity or a portion of the rear cavity of the two sound drivers (which may be understood that the two sound drivers share the rear cavity). Further descriptions of the sound-production component can be found elsewhere in the present disclosure, e.g., FIG. 5 and the related descriptions thereof.

As shown in FIG. 3, the sound outlet hole 213 is disposed on the shell 211, and the sound outlet hole 213 may export the sound generated by the sound-production component. In some embodiments, the outer end surface of the sound outlet hole 213 has the shape of a strip structure (e.g., an elongated strip), which can also be referred to as an elongated shape. In some embodiments, the sound outlet hole 213 is disposed at a central region on the shell 211. In such cases, the outer end surface of the sound outlet hole 213 is symmetrical with respect to a dichotomous plane of a bottom surface of the shell 211. The bottom surface of the shell 211 is a surface opposite to an end surface where the shell 211 is connected to the ear hook 230. In the wearing state, the bottom surface of the shell 211 faces an ear canal (e.g., the external ear canal 101) of the wearer. The dichotomous plane of the bottom surface is a plane that is parallel to an extension direction of the ear hook 230 (or, a plane that is parallel to or coincides with a first symmetry plane 300 of the ear hook 230 mentioned later) and that divides the bottom surface of the shell 211 into two symmetrical (or nearly symmetrical) portions. In some embodiments, the sound outlet hole 213 is off-center on the shell 211. In such cases, the outer end surface of the sound outlet hole 213 is not symmetrical with respect to the dichotomous plane of the bottom surface of the shell 211. For example, the sound outlet hole 213 is located on one side of a symmetry plane (e.g., the first symmetry plane 300 mentioned later) of the ear hook 230. In some embodiments, the sound outlet hole 213 is oriented toward the opening of the ear canal (or referred to as "ear canal opening") of the wearer and is not blocked by the inner wall of the concha cavity, so the sound field of sound exported from the sound outlet hole 213 is a free field, and a volume of the sound in the free field is relatively smaller, which results in a smaller volume transmitted to the opening of the ear canal of the wearer. In order to increase the volume of the sound exported from the sound outlet hole 213 to the opening of the ear canal, in some embodiments, a position of the sound-production portion 210 in the concha cavity and a position of the sound outlet hole 213 on the shell 211 may be designed to enable a portion of the sound outlet hole 213 to be blocked by the inner wall of the concha cavity, with an unblocked portion of the sound outlet hole 213 oriented toward the opening of the ear canal of the wearer. By designing a portion of the sound outlet hole 213 to be blocked by the inner wall of the concha cavity, it is possible to make the sound field of the sound exported from the sound outlet hole 213 form a reflection field, which enhances the volume of the sound transmitted to the opening of the ear canal. Specifically, when a portion of the sound outlet hole 213 is blocked by the inner wall of the concha cavity, in the proximity of the sound propagation path, the inner wall of the concha cavity constitutes a reflection wall surface along the sound propagation direction, which may reflect sound. The mutual interference and diffraction between reflected sound waves and source sound waves (i.e., original sound waves exported from the sound outlet hole 213) may form a sound reinforcement zone, thereby increasing the volume of the sound. In some embodiments, a parameter of the sound outlet hole 213, the shell 211, etc., may be set such that a portion of the sound outlet hole 213 is blocked by the inner wall of the concha cavity, thereby forming a reflection enhancement. There is a portion of the sound outlet hole 213 that is not blocked, and the unblocked portion of the sound outlet hole 213 is oriented toward the ear canal, so that sound can be timely and accurately transmitted to the ear canal of the wearer, thereby improving the listening effect and the listening volume. Further descriptions of the free field and the reflection field can be found in FIG. 10A to FIG. 13, and the related descriptions thereof. Further descriptions of setting parameters of the sound outlet hole 213, the shell 211, etc., can be found elsewhere in the present disclosure, e.g., in FIG. 4A and the related descriptions thereof.

The abutting portion 220 abuts behind the ear of the wearer, and the abutting portion 220 cooperates with the sound-production portion 210 to form a clamping state to clamp the ear. In some embodiments, the abutting portion 220 has an abutting shell, and the abutting portion 220 is connected to the ear hook 230 through the abutting shell. The abutting shell may form an accommodation space. In some embodiments, the accommodation space formed by the abutting portion serves as a battery compartment for accommodating a battery and/or other components (e.g., a circuit board). In some embodiments, the battery provides electrical power to the clipping earphone 200. For example, the battery is electrically connected to the sound-production component of the sound-production portion 210 such that the battery may provide electrical energy for the sound-production component. In some embodiments, the circuit board is electrically connected (e.g., via wires or a flexible circuit board) to the sound-production component of the sound-production portion 210 to enable the circuit board to control the sound production of the sound-production component. In some embodiments, the circuit board and the battery are disposed both in the accommodation space formed by the abutting shell. In some embodiments, the circuit board and the battery are disposed in the accommodation space formed by the abutting shell and the accommodation cavity formed by the shell 211 of the sound-production portion 210, respectively, and the circuit board and the battery are electrically connected to each other through corresponding conductors and further electrically connected to the sound-production component of the sound-production portion 210 through the conductors.

In conjunction with the above, in the wearing state, the ear hook 230 may bypass the antihelix (e.g., the antihelix 105) and the helix (e.g., the helix 107) such that the sound-production portion 210 is located within the concha cavity and is in contact with the inner wall of the concha cavity of the wearer, and the abutting portion 220 abuts behind the ear of the wearer. In some embodiments, titanium wires are provided within the ear hook 230, and the titanium wires extend along the extension direction of the ear hook 230. Compared to other materials, the titanium wires have excellent properties such as high mechanical strength, high toughness, and lightweight, which ensures the stability and comfort when the clipping earphone 200 is worn. In some embodiments, a titanium sheet is provided within the ear hook 230. The titanium sheet is in the form of a sheet structure, and the titanium sheet extends along the extension direction of the ear hook 230. A surface of the titanium sheet is perpendicular to a symmetry plane (i.e., the first symmetry plane 300) of the ear hook 230 along the extension direction of the ear hook 230. The titanium sheet may reduce or avoid the torsion that occurs in the ear hook 230 during the wearing process or in the wearing state to further improve the stability and comfort when the clipping earphone 200 is worn. In some embodiments, the ear hook 230 includes a first connection segment, an extension segment, and a second connection segment that are connected in sequence. The first connection segment, the extension segment, and the second connection segment are all arcuate structures. The first connection segment is a partialregion in which the ear hook 230 is connected to the sound-production portion 210, the second connection segment is a partial region in which the ear hook 230 is connected to the abutting portion 220, and the extension segment is a partial region between the first connection segment and the second connection segment. In some embodiments, by setting parameters (e.g., an arcuate length, a curvature, etc.) of the first connection segment, it can be ensured that the sound-production portion 210 does not hit the tragus and does not block the ear canal of the wearer, thereby improving the wearing comfort and safety of the clipping earphone 200. In some embodiments, a curvature of the second connection segment is set larger (i.e., the second connection segment has a higher degree of curvature), thereby making the overall layout of the clipping earphone 200 more compact, reducing a volume of space occupied by the clipping earphone 200, and improving the storage or carrying convenience. The curvature of the second connection segment may be a curvature of an arcuate segment of an inner contour or outer contour of a projection of the second connection segment on the symmetry plane (i.e., the first symmetry plane 300) of the ear hook 230 along its extension direction. In some embodiments, an extension length of the extension segment is set larger (e.g., greater than a length threshold), thereby ensuring that the clipping earphone 200 can fit the ear sizes of different people. The extension length is a length of the extension segment along its extension direction.

In some embodiments, the ear hook 230 has the first symmetry plane. Referring to FIG. 3, in some embodiments, the ear hook 230 has the first symmetry plane 300 along an extension direction of the ear hook 230. The first symmetry plane 300 is parallel or substantially parallel to the extension direction of the ear hook 230. The first symmetry plane 300 divides the ear hook 230 into two symmetrical or nearly symmetrical portions. The extension direction of the ear hook 230 is a direction in which an end of the ear hook 230 that is connected to the abutting portion 220 extends toward an end of the ear hook 230 that is connected to the sound-production portion 210.

In some embodiments, the shape of the outer end surface of the sound outlet hole 213 is an arcuate strip structure. As described above, the sound outlet hole 213 may be provided at a central region or be off-center on the shell 211. In conjunction with FIG. 3, when the sound outlet hole 213 is provided at a central region on the shell 211, the outer end surface of the sound outlet hole 213 may be symmetrical with respect to the first symmetry plane 300. When the sound outlet hole is off-center on the shell 211, the sound outlet hole 213 is not symmetrical with respect to the first symmetry plane 300. It is to be understood that, since the shell 211 of the sound-production portion 210 has a certain thickness and the sound outlet hole 213 is provided on the shell 211 for exporting a sound output from the sound-production component to the outside of the clipping earphone 200, the sound outlet hole 213 also has a certain depth. Based on this, the outer end surface of the sound outlet hole 213 may be an end surface of the sound outlet hole 213 that is disposed on an outer wall surface of the shell 211.

In some embodiments, a projection of the outer end surface of the sound outlet hole 213 on the first symmetry plane 300 forms an arcuate segment, a projection of the shell 211 on the first symmetry plane 300 has an arcuate outer contour, and at least a portion of the arcuate outer contour overlaps the arcuate segment. For ease of description, the arcuate segment formed by the projection of the outer end surface of the sound outlet hole 213 on the first symmetry plane 300 is hereinafter simply noted as an arcuate segment of the sound outlet hole 213. The arcuate outer contour of the projection of the shell 211 on the first symmetry plane 300 is hereinafter simply noted as an arcuate outer contour of the shell 211. In some embodiments, the sound-production portion 210 (or the shell 211) is spheroidal in shape overall, and the projection of the shell 211 on the first symmetry plane 300 has an arcuate outer contour. Since the sound outlet hole 213 is opened on the shell 211 of the sound-production portion 210, the outer end surface of the sound outlet hole 213 has an arcuate surface. Based on this, it can be seen that the projection of the outer end surface of the sound outlet hole 213 on the first symmetry plane 300 may form an arcuate segment. Furthermore, when the outer end surface of the sound outlet hole 213 is symmetrical with respect to the first symmetry plane 300, the arcuate segment of the sound outlet hole 213 overlaps at least a portion of the arcuate outer contour of the shell 211.

By setting at least a portion of the arcuate outer contour of the shell 211 to overlap with the arcuate segment of the sound outlet hole 213, it can be ensured that the outer end surface of the sound outlet hole 213 is symmetrical with respect to the first symmetry plane 300, thereby ensuring that the portion of the sound outlet hole 13 may be blocked by the inner wall of the concha cavity in the wearing state, so that the sound field of the sound exported from the sound outlet hole 213 forms the reflection field, henceforth forming the reflection enhancement and increasing the volume heard by the wearer.

Figure 4A:
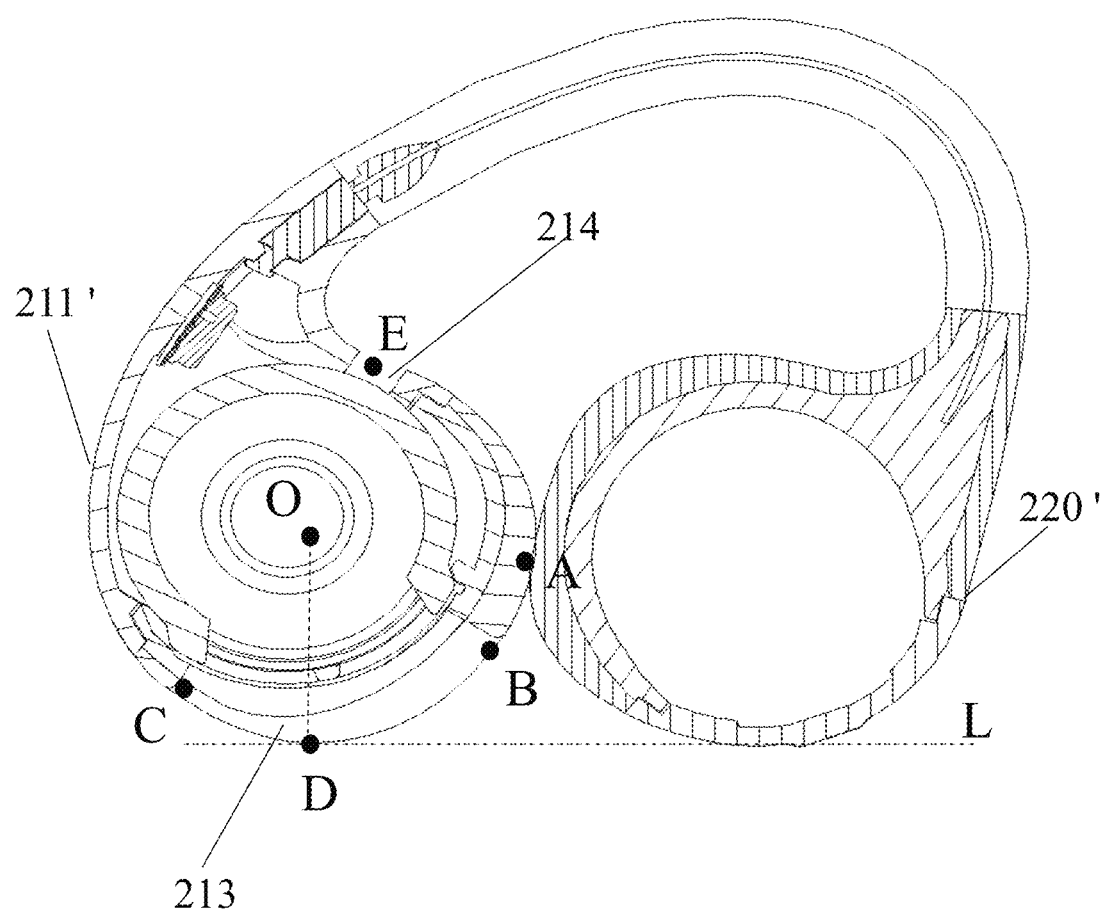
FIG. 4A is a schematic diagram illustrating a projection of a clipping earphone on a first symmetry plane according to some embodiments of the present disclosure.

FIG. 4A is a schematic diagram illustrating a projection of a clipping earphone on a first symmetry plane according to some embodiments of the present disclosure. In some embodiments, the shell 211 has a feature point that is in contact with or closest to the abutting portion 220. In some embodiments, when the clipping earphone 200 is in a natural state (i.e., the clipping earphone 200 is not being worn by a wearer), the shell 211 of the sound-production portion 210 is in contact with the abutting portion 220. When the shell 211 is in contact with the abutting portion 220 through a point, then the point on the shell 211 that is in contact with the abutting portion 220 is the feature point. Contacting through a point here refers to that the place where the shell 211 is in contact with the abutting portion 220 is a point, or a contact region where the shell 211 is in contact with the abutting portion 220 is small enough to be approximated as a point. When the shell 211 is in contact with the abutting portion 220 through a surface, in this case, the centroid of the contact surface where the shell 211 is in contact with the abutting portion 220 is the feature point. In some embodiments, when the clipping earphone 200 is in the natural state, the shell 211 of the sound-production portion 210 may be not in contact with the abutting portion 220, and there is a distance between the shell 211 of the sound-production portion 210 and the abutting portion 220. In this case, a point on the shell 211 that is closest to the abutting portion 220 is the feature point. The point on the shell 211 that is closest to the abutting portion 220 refers to an endpoint of a shortest connection line between the shell 211 and the abutting portion 220 that is located at the shell 211. In some embodiments, as shown in FIG. 4A, the feature point on the shell 211 is projected on the first symmetry plane 300 to form a first projection point A.

Continuing to refer to FIG. 4A, a projection of the sound outlet hole 213 on the first symmetry plane 300 forms an arcuate segment as described above, which corresponds to an arc BC formed by a point B and a point C in FIG. 4A. The arcuate segment includes two endpoints including a first endpoint B and a second endpoint C. The first endpoint B is an endpoint of two endpoints of the arcuate segment that is closer to the first projection point A. The second endpoint C is an endpoint of the two endpoints of the arcuate segment that is farther away from the first projection point A.

Since the feature point on the shell 211 is located in a region on the shell 211 that is closest to the abutting portion 220, when the clipping earphone 200 is in a wearing state, the shell 211 and the abutting portion 220 clamp the concha cavity from inside and outside of the concha cavity, and thus the feature point on the shell 211 is blocked by the concha cavity. Based on this, a portion of the sound outlet hole 213 that is closer to the feature point of the shell 211 may be blocked by an inner wall of the concha cavity, and a portion of the sound outlet hole 213 that is farther away from the shell 211 may not be blocked by the inner wall of the concha cavity. In terms of a projection curve or a projection point, a region of the arcuate segment of the sound outlet hole 213 that is close to the first projection point A is blocked by the inner wall of the concha cavity, and a region of the arcuate segment that is father away from the first projection point A is not blocked. This also means that when a portion of the sound outlet hole 213 is blocked by the inner wall of the concha cavity, a region that is first blocked is the first endpoint B of the arcuate segment and a region that is proximate to the first endpoint B. A region of the sound outlet hole 213 that is not blocked is the second endpoint C of the arcuate segment and a region that is proximate to the second endpoint C. The second endpoint C is closer to an ear canal opening of the ear than the first endpoint B. Thus, a distance (e.g., an arcuate length) between the first endpoint B or the second endpoint C of the arcuate segment and the first projection point A may affect a position of the sound outlet hole 213 with respect to the concha cavity when worn, and thus affects whether the inner wall of the concha cavity obscures the portion of the sound outlet hole 213.

In some embodiments, in order to ensure that a portion of the sound outlet hole 213 is blocked by the inner wall of the concha cavity, the arcuate length between the first endpoint B of the arcuate segment and the first projection point A is in a range of 1.7 mm to 4.5 mm. In some embodiments, in order to ensure that a portion of the sound outlet hole 213 is blocked by the inner wall of the concha cavity, the arcuate length between the first endpoint B of the arcuate segment and the first point of projection A is in a range of 2 mm to 4 mm.

In some embodiments, in order to ensure that a portion of the sound outlet hole 213 is not blocked by the inner wall of the concha cavity, the arcuate length between the second endpoint C of the arcuate segment and the first projection point A is in a range of 12 mm to 15.5 mm. In some embodiments, in order to ensure that a portion of the sound outlet hole 213 is not blocked by the inner wall of the concha cavity, the arcuate length between the second endpoint C of the arcuate segment and the first projection point A is in a range of 13 mm to 15 mm.

It will be appreciated that the arcuate segment of the sound outlet hole 213 overlaps at least a portion of the arcuate outer contour of the shell 211, and therefore, the first endpoint B and the second endpoint C of the arcuate segment are both on the arcuate outer contour of the shell 211. The feature point is a "point" on an outer wall surface of the shell 211, and therefore, the first projection point A of the feature point is also on the arcuate outer contour of the shell 211. Thus, the arc line between the first endpoint B or second endpoint C and the first projection point A is a portion of an arc line of the arcuate outer contour of the shell 211.

In some embodiments, the shell 211 projects at the first symmetry plane 300 to form a first projection 211', and the abutting portion 220 projects at the first symmetry plane 300 to form a second projection 220'. The first projection 211' and the second projection 220' have a common tangent line L. The common tangent line L is a tangent line that is tangent to both a lower endpoint of the first projection 211' and a lower endpoint of the second projection 220'. It is to be noted that when the clipping earphone 200 is placed upright on a horizontal surface (e.g., a tabletop), the sound-production portion 210 and the abutting portion 220 face the horizontal surface and are in contact with the horizontal surface while the ear hook 230 is not in contact with the horizontal surface, and the clipping earphone 200 can be placed stably and will not be tilted. Based on this, the lower endpoint of the first projection 211' is a projection point formed by an intersection point between the sound-production portion 210 and the horizontal plane (or a shaped center of a contact surface between the sound-production portion 210 and the horizontal plane) projecting on the first symmetry plane 300 when the clipping earphone 200 is placed upright on the horizontal plane. The lower endpoint of the second projection 220' is a projection point formed by an intersection point between the abutting portion 220 and the horizontal plane (or a shaped center of a contact surface between the abutting portion 220 and the horizontal plane) projecting on the first symmetry plane 300 when the clipping earphone 200 is placed upright on the horizontal plane.

In some embodiments, the common tangent line L is tangent to the first projection 211' at the lower endpoint of the first projection 211', with a tangent point being noted as a first tangent point D. When the clipping earphone 200 is in the wearing state, the first tangent point D corresponds approximately to an opening of the ear canal. In some embodiments, the first tangent point D between the common tangent line L and the first projection 211' is located on the arcuate segment of the sound outlet hole 213 (as shown in FIG. 4A, the first tangent point D is located on the arc BC). In conjunction with the foregoing, when a portion of the sound outlet hole 213 is blocked by the inner wall of the concha cavity, a portion that is first blocked is the first endpoint B of the arcuate segment and a region that is proximate to the first endpoint B, and a region that is not blocked is the second endpoint C of the arcuate segment and a region that is proximate to the second endpoint C. Therefore, a majority of a region on the arcuate segment of the sound outlet hole 213 that is located between the first tangent point D and the first endpoint B may be blocked by the inner wall of the concha cavity, while a region on the arcuate segment of the sound outlet hole 213 that is located between the first tangent point D and the second endpoint C is rarely blocked by the inner wall of the concha cavity.

Since most of the region on the arcuate segment of the sound outlet hole 213 that is located between the first tangent point D and the first endpoint B is blocked by the inner wall of the concha cavity, the region on the arcuate segment of the sound outlet hole 213 that is located between the first tangent point D and the second endpoint C is rarely blocked by the inner wall of the concha cavity, a position of the first tangent point D on the arcuate segment may affect a dimension of the portion of the sound outlet hole 213 that is blocked or is not blocked by the inner wall of the concha cavity. For example, when the first tangent point D is closer to the first endpoint B, the portion of the sound outlet hole 213 that is blocked is smaller and the portion that is not blocked is larger. When the first tangent point D is closer to the second endpoint C, the portion of the sound outlet hole 213 that is blocked is larger and the portion that is not blocked is smaller.

In some embodiments, in order to ensure that the portion of the sound outlet hole 213 that is blocked and/or the portion that is not blocked has appropriate dimensions to enhance the effect of the reflection field on the sound enhancement, a ratio of an arcuate length between the first endpoint B of the arcuate segment and the first endpoint D to an arcuate length between the second endpoint C of the arcuate segment and the first tangent point D is in a range of 0.5 to 0.85. In some embodiments, in order to ensure that the portion of the sound outlet hole 213 that is blocked and/or the portion that is not blocked has appropriate dimensions, the ratio of the arcuate length between the first endpoint B of the arcuate segment and the first tangent point D to the arcuate length between the second endpoint C of the arcuate segment and the first tangent point D is in a range of 0.6 to 0.75.

In some embodiments, a normal line at the first tangent point D intersects a normal line at the first endpoint B of the arcuate segment or a normal line at the second endpoint C of the arcuate segment at a center point O. In some embodiments, when the first tangent point D, the first endpoint B, and the second endpoint C are co-circular, the normal line at the first tangent point D, the normal line at the first endpoint B, and the normal line at the second endpoint C intersect at a point, which is the center point O. In some embodiments, when the first tangent point D, the first endpoint B, and the second endpoint C are not co-circular, the center point is an intersection point between the normal line at the first tangent point D and the normal line at the first endpoint B. Alternatively, the center point is an intersection point between the normal line at the first tangent point D and the normal line at the second endpoint C.

In some embodiments, a line connecting the first endpoint B and the center point O forms a first angle (e.g., ∠BOD) with a line connecting the first endpoint D and the center point O, and a line connecting the second endpoint C and the center point O forms a second angle (e.g., ∠COD) with a line connecting the first endpoint D and the center point O. A magnitude of the first angle may reflect an arcuate length between the first tangent point D and the first endpoint B of the arcuate segment. In some embodiments, the larger the first angle, the longer the arcuate length between the first tangent point D and the first endpoint B of the arcuate segment; and the smaller the first angle, the shorter the arcuate length between the first tangent point D and the first endpoint B of the arcuate segment. Similarly, a magnitude of the second angle may reflect an arcuate length between the first tangent point D and the second endpoint C of the arcuate segment. In some embodiments, the larger the second angle, the longer the arcuate length between the first tangent point D and the second endpoint C of the arcuate segment; and the smaller the second angle, the shorter the arcuate length between the first tangent point D and the second endpoint C of the arcuate segment. A ratio of the first angle to the second angle reflects a position of the first tangent point D on the arcuate segment. For example, a larger ratio of the first angle to the second angle indicates that the first tangent point D is closer to the second endpoint C of the arcuate segment, where a larger portion of the sound outlet hole 213 is blocked. A smaller ratio of the first angle to the second angle indicates that the first tangent point D is closer to the first endpoint B of the arcuate segment, where a smaller portion of the sound outlet hole 213 is blocked.

In some embodiments, in order to ensure that the portion of the sound outlet hole 213 that is blocked and/or the portion that is not blocked have appropriate dimensions to enhance the effect of the reflection field on the sound enhancement, the ratio of the first angle to the second angle is in a range of 0.2 to 1.3. In some embodiments, in order to ensure that the portion of the sound outlet hole 213 that is blocked and/or the portion that is not blocked have appropriate dimensions, the ratio of the first angle to the second angle is in a range of 0.5 to 1.0.

In some embodiments, in order to ensure that the arcuate length between the first tangent point D and the first endpoint B of the arcuate segment has a proper dimension, the first angle is in a range of 15° to 55°. In some embodiments, to ensure that the arcuate length between the first tangent point D and the first endpoint B of the arcuate segment has a proper dimension, the first angle is in a range of 25° to 45°.

In some embodiments, in order to ensure that the arcuate length between the first tangent point D and the second endpoint C of the arcuate segment has a proper dimension, the second angle is in a range of 40° to 80°. In some embodiments, to ensure that the arcuate length between the first tangent point D and the second endpoint C of the arcuate segment has a proper dimension, the second angle is in a range of 50° to 70°.

In some embodiments, the arcuate length of the arcuate segment of the sound outlet hole 213 (i.e., an arcuate length of the arc BC) may affect whether a portion of the sound outlet hole 213 is blocked or not blocked by the inner wall of the concha cavity, and affect an area of the blocked portion or the unblocked portion.

In some embodiments, if the arcuate length of the arcuate segment is too small, it results in the portion of the sound outlet hole 213 that is blocked being too small, or the sound outlet hole 213 even not being blocked. For example, when the arcuate length of the arcuate segment is too small and the arcuate length between the first endpoint B of the arcuate segment and the first projection point A is large, it may result in the first tangent point D being too close to the first endpoint B (i.e., an arcuate length between the first tangent point D and the first endpoint B is too small), which may result in the portion of the sound outlet hole 213 that is blocked being too small; or worse yet, it may also result in the first tangent point D failing to be located on the arcuate segment (e.g., the first tangent point D is located between the first endpoint B and the first projection point A), thereby causing the sound outlet hole 213 to fail to be blocked.

In some embodiments, if the arcuate length of the arcuate segment is too small, it also results in the portion of the sound outlet hole 213 that is not blocked being too small, or the sound outlet hole 213 being even completely blocked. For example, when the arcuate length of the arcuate segment is too small and the arcuate length between the second endpoint C of the arcuate segment and the first projection point A is small, it may result in the first tangent point D being too close to the second endpoint C (i.e., an arcuate length between the first tangent point D and the second endpoint C is too small), which may result in the portion of the sound outlet hole 213 that is not blocked being too small; or worse yet, it may also result in the first tangent point D failing to be located on the arcuate segment (e.g., the first tangent point D is located on one side of the second endpoint C away from the first projection point A), thereby causing the sound outlet hole 213 to be completely blocked.

In some embodiments, if the arcuate length of the arcuate segment is too long, an area of the outer wall surface of the shell 211 occupied by the outer end surface of the sound outlet hole 213 may be large, which affects the arrangement of other structures on the shell 211. For example, the shell 211 is provided with a pressure relief hole (e.g., a pressure relief hole 214). The pressure relief hole may be located away from the sound outlet hole 213 to ensure the acoustic performance of the clipping earphone 200. If the sound outlet hole 213 occupies a large area, it may affect the arrangement of the pressure relief hole or result in the pressure relief hole being located at a smaller distance from the sound outlet hole 213. In addition, if an arcuate length of the sound outlet hole 213 is too long, the area of the sound outlet hole 213 may be larger, which affects a range of resonance frequencies of the front cavity of the clipping earphone 200. More descriptions about the resonance frequency of the sound outlet hole 213 and the front cavity can be found elsewhere in the present disclosure, e.g., FIG. 7 to FIG. 8, and the related descriptions thereof.

In some embodiments, to ensure that a portion of the sound outlet hole 213 is blocked by the inner wall of the concha cavity as well as a portion of the sound outlet hole 213 is not blocked, the arcuate length of the arcuate segment of the sound outlet hole 213 is greater than 5.2 mm. In some embodiments, in order to ensure the acoustic performance of the clipping earphone 200 and to facilitate the arrangement of other structures on the shell 211, the arcuate length of the arcuate segment of the sound outlet hole 213 is less than 16.7 mm.

In some embodiments, in order to take into account that a portion of the sound outlet hole 213 is blocked by the inner wall of the concha cavity and a portion of the sound outlet hole 213 is not blocked, as well as to ensure the acoustic performance of the clipping earphone 200, the arcuate length of the arcuate segment of the sound outlet hole 213 is in a range of 5.2 mm to 16.7 mm. In some embodiments, in order to take into account that a portion of the sound outlet hole 213 is blocked by the inner wall of the concha cavity and a portion of the sound outlet hole 213 is not blocked, as well as to ensure the acoustic performance of the clipping earphone 200, the arcuate length of the arcuate segment of the sound outlet hole 213 is in a range of 7 mm to 15 mm. In some embodiments, a width of the sound outlet hole 213 is in a range of 1.4 mm to 2.2 mm to ensure that the sound outlet hole 213 has a suitable area. The width of the sound outlet hole 213 is a dimension of the outer end surface of the sound outlet hole 213 along a direction perpendicular to the first symmetry plane 300. More detailed descriptions of the area of the sound outlet hole 213 can be found in FIG. 7 to FIG. 8, and the related descriptions thereof.

In some embodiments, a ratio of the arcuate length of the arcuate segment of the sound outlet hole 213 to a length of a straight line segment between the first endpoint B and the second endpoint C of the arcuate segment (for ease of description, simply notated as an arc-chord ratio of the arcuate segment) reflects a curvature of the arcuate segment. In some embodiments, the arc-chord ratio of the arcuate segments affects the matching degree between the sound-production portion 210 and the concha cavity, and thus affects the ability of the inner wall of the concha cavity to partially obscure the sound outlet hole 213 to create reflection enhancement. For example, the arc-chord ratio of the arcuate segment being too small and the arcuate length of the arcuate segment being too large results in the sound-production portion 210 having difficulty reaching into the concha cavity to be in contact with the inner wall of the concha cavity, which results in the inability to form a reflection enhancement. In some embodiments, the arc-chord ratio of the arcuate segment affects the matching degree between the sound-production portion 210 and the concha cavity, which affects the wearing stability of the clipping earphone. For example, when the arc-chord ratio of the arcuate segment is too large, an ear structure fails to produce a better position-limiting effect on the sound-production portion 210, which results in the sound-production portion 210 being shifted or rotated due to the movement of the wearer, thereby affecting the stability. Based on this, in some embodiments, in order to improve the matching degree between the sound-production portion 210 and the concha cavity to form the reflection enhancement, as well as to improve the wearing stability, the arc-chord ratio of the arcuate segment is in a range of 1.05 to 1.4.

The outer end surface of the sound outlet hole 213 of the clipping earphone 200 shown in FIG. 2 is symmetrical with respect to the first symmetry plane 300, i.e., the sound outlet hole 213 is provided squarely on the shell 211. Unlike the manner of setting the position of the sound outlet hole 213 in FIG. 2, in some embodiments, the sound outlet hole 213 of the clipping earphone 200 is off-center on the shell 211, i.e., the outer end surface is not symmetrical with respect to the first symmetry plane 300. For example, the sound outlet hole 213 is provided on one side of the first symmetry plane 300. When wearing the clipping earphone 200, the clipping earphone 200 may be tilted due to factors such as the gravity of the clipping earphone 200, unstable wearing, etc. By disposing the sound outlet hole 213 off-center on the shell 211, the tilting of the clipping earphone 200 due to the gravity and other factors can be compensated for so that an blocked portion on the sound outlet hole 213 of the tilted clipping earphone 200 may be oriented toward the ear canal, thereby ensuring the listening effect and the listening volume.

In some embodiments, the sound outlet hole 213 has an outer end surface with an elongated shape, the outer end surface has a second symmetry plane that is parallel to an extension direction of the outer end surface. An angle may be formed between the second symmetry plane of the sound outlet hole 213 and the first symmetry plane 300 of the ear hook 230. A magnitude of the angle may affect the orientation of the sound outlet hole 213 relative to the opening of the ear canal in the wearing state. By setting this angle, it is possible to enable the unblocked portion on the sound outlet hole 213 to be oriented toward the ear canal when the clipping earphone 200 is tilted. In some embodiments, the clipping earphone 200 is tilted due to the influence of the gravity and other factors when the clipping earphone 200 is in the wearing state, and a tilting angle is normally in a range of 0° to 30°. The tilting angle refers to an angle between the first symmetry plane 300 of the ear hook 230 and the horizontal plane of the human body. In some embodiments, in order to ensure that the unblocked portion of the sound outlet hole 213 is oriented toward the ear canal when the clipping earphone 200 is tilted, the angle between the second symmetry plane of the sound outlet hole 213 and the first symmetry plane 300 of the ear hook 230 is in a range of 15° to 45°.

In some embodiments, see FIG. 2, the clipping earphone 20 also includes the pressure relief hole 214. The pressure relief hole 214 is disposed on the shell 211 of the sound-production portion 210. As shown in FIG. 2, the pressure relief hole 214 is disposed on a side of the shell 211 that is proximate to the ear hook 230 and toward the ear of the wearer. In some embodiments, the pressure relief hole 214 is in acoustic communication with the rear cavity of the sound-production component, and the pressure relief hole 214 may export a sound from the rear cavity to the outside of the shell 211. The pressure relief hole 214 may balance the pressure in the rear cavity, allowing a vibration diaphragm of the sound-production component to vibrate fully at large amplitudes in low frequencies, which enables the sound to achieve a deeper bass extension and more penetrating treble quality.

In some embodiments, a sound generated on a front side of the sound driver radiates outwardly via the sound outlet hole, and a sound generated on a rear side of the sound driver radiates outwardly via the pressure relief hole. Since the sound generated on the front side of the sound driver and the sound generated on the rear side of the sound driver are of equal amplitude and opposite phase, the sound radiated via the sound outlet hole and the sound radiated via the pressure relief hole are also of substantially equal amplitude and opposite phase. The two sounds are transmitted to the ear canal in such a way that they cancel out in opposite phases, thereby reducing a volume heard by the wearer. In some embodiments, the pressure relief hole 214 is located farther away from the ear canal than the sound output hole 213 to attenuate the phase cancellation at the ear canal between the sound output via the pressure relief hole 214 and the sound output via the sound output hole 213, thereby increasing the volume heard by the wearer.

Referring to FIG. 4A, a projection of a center of the pressure relief hole 214 on the first symmetry plane 300 forms a second projection point E. A distance between the second projection point E and the arcuate segment of the sound outlet hole 213 may reflect a distance between the pressure relief hole 214 and the sound outlet hole 213. A straight line distance between the second projection point E and the first endpoint B of the arcuate segment is a shortest straight line distance between the second projection point E and the arcuate segment. The shortest straight line distance between the second projection point E and the arcuate segment may be used to measure the distance between the pressure relief hole 214 and the sound outlet hole 213.

In some embodiments, in order to ensure that the pressure relief hole 214 is as far away as possible from the acoustic outlet hole 213, the shortest straight line distance between the second projection point E of the center of the pressure relief hole 214 on the first symmetry plane 300 and the arcuate segment is in a range of 8.1 mm to 11 mm. In some embodiments, in order to ensure that the pressure relief hole 214 is as far away as possible from the sound outlet hole 213, the shortest straight line distance between the second projection point E of the center of the pressure relief hole 214 on the first symmetry plane 300 and the arcuate segment is in a range of 8.5 mm to 10.5 mm.

By setting a range of the shortest straight line distance between the second projection point E and the arcuate segment, the pressure relief hole 214 can be made to move away from the sound outlet hole 213 to minimize the influence of the pressure relief hole 214 on the sound output via the sound outlet hole 213, thereby preventing sound waves emitted from the pressure relief hole 214 and sound waves emitted from the sound output hole 213 from canceling in a near field, which affects the listening volume of the wearer. Additionally, by setting a range of the shortest straight line distance between the second projection point E and the arcuate segment, it can also be ensured that the sound outlet hole 213 and the pressure relief hole 214 can be separated by the helix in the wearing state, and that the sound output via the pressure relief hole 214 needs to reach the opening of the ear canal by bypassing the helix, thereby further minimizing the effect of the pressure relief hole 214 on the sound output via the sound outlet hole 213 and also avoiding a sound short circuit.

It is to be known that, since the sound outlet hole 213 and the pressure relief hole 214 are provided on the shell 211, each side wall of the shell 211 has a certain thickness, and therefore, the sound outlet hole 213 and the pressure relief hole 214 are holes with a certain depth. At this point, the sound outlet hole 213 and the pressure relief hole 214 may both have an inner opening and an outer opening. For ease of description, in embodiments of the present disclosure, the outer end surface of the sound outlet hole 213 described above and below refers to an end surface of the outer opening of the sound outlet hole 213, and the center of the pressure relief hole 214 described above and below refers to a shaped center of the outer opening of the pressure relief hole 214. For ease of description, in embodiments of the present disclosure, an area of the sound outlet hole 213 hereinafter refers to an area of the outer opening of the sound outlet hole 213, and an area of the pressure relief hole 214 refers to an area of the outer opening of the pressure relief hole 214. It is to be appreciated that in some other embodiments, the area of the sound outlet hole 213 or the area of the pressure relief hole 214 also refers to an area of other cross-sectional regions of the sound outlet hole 213 or the pressure relief hole 214, such as an area of the inner opening of the sound outlet hole 213 or an area of the inner opening of the pressure relief hole 214, or an average of the area of the inner opening and the area of the outer opening of the sound outlet hole 213 or an average of the area of the inner opening and the area of the outer opening pressure relief hole 214, or the like.

In some embodiments, when the clipping earphone 200 is in the wearing state, the feature point on the shell 211 and its nearby region may be blocked by the inner wall of the concha cavity, and if the pressure relief hole 214 is close to the feature point, the pressure relief hole 214 may be blocked by the inner wall of the concha cavity, thereby causing the sound in the rear cavity of the sound-production component fails to be exported outwardly via the pressure relief hole 214, thereby affecting the listening effect of the clipping earphone 200. In some embodiments, in order to ensure that the pressure relief hole 214 is not blocked by the concha cavity, an arcuate length between the second projection point E of the center of the pressure relief hole 214 on the first symmetry plane 300 and the first projection point A of the feature point is not less than 7.5 mm.

In some embodiments, if the pressure relief hole 214 is far away from the feature point, on the one hand, it results in the shell 211 being larger in volume, which is not easy to carry and stow, and on the other hand, it results in the pressure relief hole 214 being too close to a connection position between the shell 211 and the ear hook 230, and the structural design at the connection position is relatively complicated, which does not facilitate the setting of the pressure relief hole 214. In order to ensure that it is convenient to set the pressure relief hole 214 on the shell 211 and/or the clipping earphone 200 with an appropriate volume, an arcuate length between the second projection point E of the center of the pressure relief hole 214 on the first symmetry plane 300 and the first projection point A of the feature point is not greater than 9.5 mm.

In some embodiments, in order to take into account that the pressure relief hole 214 is not blocked by the concha cavity and to facilitate the arrangement of the pressure relief hole 214 on the shell 211, the arcuate length between the second projection point E of the center of the pressure relief hole 214 on the first symmetry plane 300 and the first projection point A of the feature point is in a range of 7.5 mm to 9.5 mm.

In some embodiments, the pressure relief hole 214 is provided on an inner side of the ear hook 230 (i.e., a side facing the ear in the wearing state), and a curvature of a curate structure near where the pressure relief hole 214 is located is large, and the curate structure may form a "concave pit", which ensures that the pressure relief hole 214 is not be blocked by the ear in the wearing state, and thus ensures the pressure relief effect of the pressure relief hole 214. In some embodiments, a microphone hole is also provided on a side of the ear hook 230 that is opposite to the pressure relief hole 214, and in this setup, the microphone hole is disposed on a side of the ear hook 230 that is oriented toward the tragus when the clipping earphone 200 is in the wearing state, which improves the reception effect of the clipping earphone 200. At the same time, by setting the pressure relief hole 214 opposite to the microphone hole, the mutual interference between the pressure relief hole 214 and the microphone hole can also be reduced.

Figure 4B:
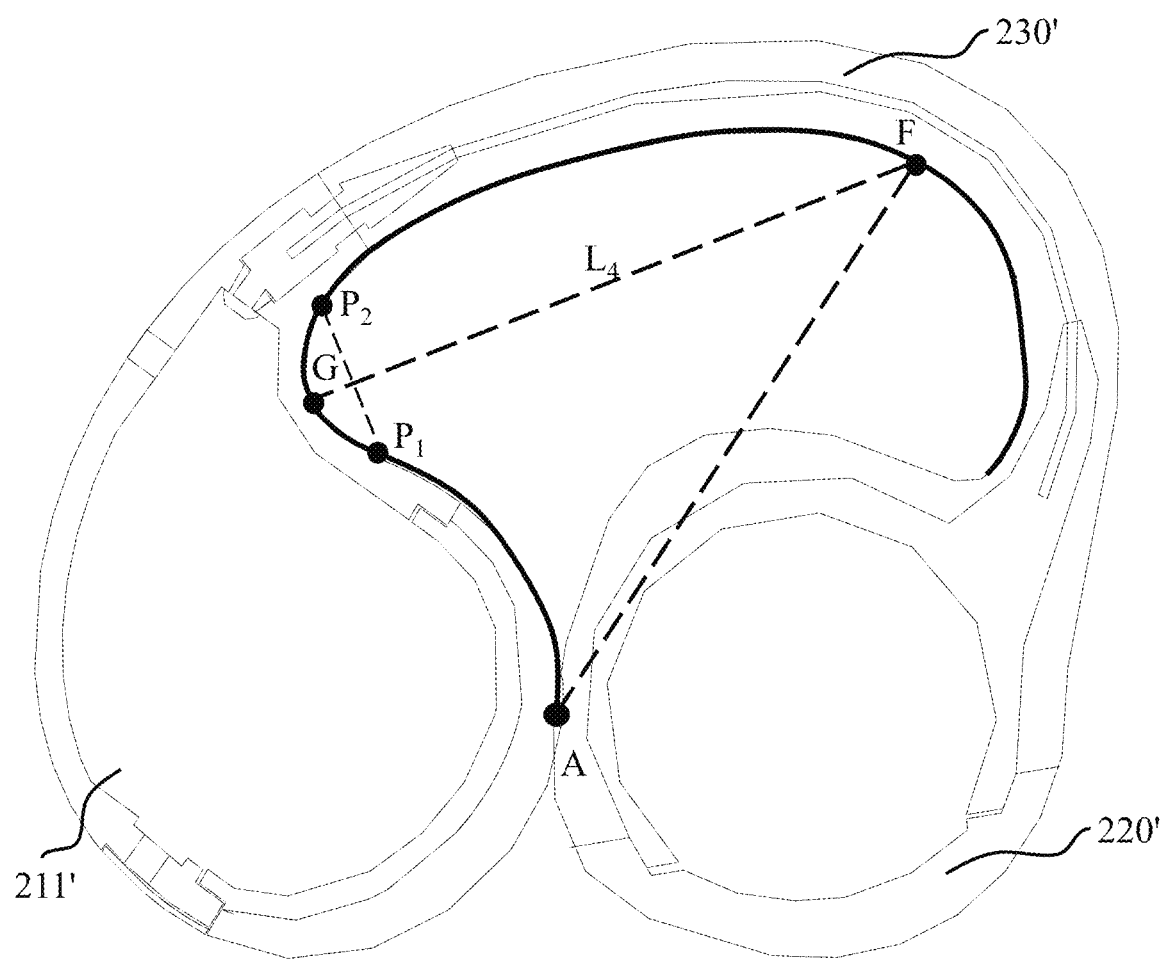
FIG. 4B is a schematic diagram illustrating a projection of a clipping earphone on a first symmetry plane according to some embodiments of the present disclosure.

FIG. 4B is a schematic diagram illustrating a projection of a clipping earphone on a first symmetry plane according to some embodiments of the present disclosure. Referring to FIG. 4B, in some embodiments, the ear hook 230 forms a third projection 230' on the first symmetry plane 300. In some embodiments, the third projection 230' includes an inner contour curve and an outer contour curve. The inner contour curve corresponds to a contour on one side of the ear hook 230 that is near a helix in a wearing state, and the outer contour curve corresponds to a contour on another side of the ear hook 230 that is away from the helix in the wearing state. In some embodiments, the third projection 230' has at least one point F on the inner contour curve that is furthest away from the first projection point A. In some embodiments, when there are a plurality of points that are furthest away from the first projection point A, at this time, a point among the plurality of points that is closest to the second projection 220' of the abutting portion 220 may be used as a second feature point F. The second feature point F may be determined by a tool, program, or the like. For example, by inputting a contour curve parameter of the clipping earphone 200 (e.g., an analog curve function of an inner contour of the clipping earphone 200, an analog curve function of an outer contour of the clipping earphone 200, etc.), information about the first projection point A may be determined through a corresponding tool, program, etc., thereby outputting information (e.g., a position, etc.) about the second feature point F.

In some embodiments, in the wearing state, the point A is located near a contact point between the sound-production portion 210 and the concha cavity, and the helix is located in a region enclosed by the inner contour of the ear hook 230 and is located essentially in a region on the inner contour of the ear hook 230 that is farthest from the first projection point A. In order to enable the clipping earphone 200 to be able to bypass the tragus of the wearer without squeezing or interfering with the tragus, by designing the first projection point A and the second feature point F, it is possible to make the ear hook 230 of the clipping earphone 200 bypass the ear of the wearer with a larger proportion in the wearing state, so that the clipping earphone 200 can be applied to a larger number of people.

If a distance between the first projection point A point and the second feature point F point is too small, for most users, the ear hook 230 in the wearing state may squeeze and interfere with the tragus, which affects the wearing comfort and the effect of the clamping. If the distance between the first projection point A point and the second feature point F point is too large, an overall size of the ear hook 230 may be too large, and the clipping earphone 200 is prone to be clamped unstably.

In some embodiments, the distance between the first projection point A point and the second feature point F point (i.e., a length of a line segment AF shown in FIG. 4B) is in a range of 15 mm to 20 mm to enable the ear hook 230 to bypass ears of most people, and at the same time to make the ear hook 230 of a suitable size and to avoid the problem of unstable clamping.

A connection line between the first projection point A and the second feature point F is defined as a first connection line. A first auxiliary line $L_4$ is made over the second feature point F to a side toward the first projection 211', a first angle between the first auxiliary line $L_4$ and a first connection line (i.e., a connection line AF) has a first preset range, and an intersection point G between the inner contour curve of the third projection 230' and the first auxiliary line $L_4$ may be defined as a fourth feature point. A line FG connecting the fourth feature point G and the second feature point F is defined as a second connection line, and the second connection line (i.e., the line FG) is co-linear with the first auxiliary line $L_4$. A portion of the ear hook 230 corresponding to the second connection line FG (e.g., a portion corresponding to an arc segment FG) is provided on a side of the second connection line FG that is back away from the abutting portion 220 to avoid the ear hook 230 from interfering with an antihelix and the helix.

In some embodiments, if an angle (i.e., $\angle AFG$) between the second connection line FG and the first connection line AF is too small, a portion of the inner contour of the ear hook 230 corresponding to the second connection line FG interferes with and extrudes with a portion between the helix and the concha cavity of the wearer's ear. If the angle between the second connection line FG and the first connection line AF is too large, it results in the ear hook 230 being oversized, which causes the sound-production portion 210 to interfere with the tragus of the wearer or block the opening of ear canal of the wearer.

In some embodiments, to prevent the sound-production portion 210 from blocking the opening of the ear canal of the wearer, and to prevent the sound-production portion 210 from interfering with the tragus, the antihelix, or the helix, the first preset range is 30° to 40°, i.e., the first angle between the second connection line FG and the first connection line AF is in a range of 30° to 41°.

In some embodiments, a portion of the inner contour curve (i.e., an arc FG) of the third projection 230' corresponding to the second connection line FG has a first arcuate length, and a ratio of the first arcuate length to a length of the second connection line FG is defined as a first arc-chord ratio. The first arc-chord ratio reflects a degree of flatness of the arc FG corresponding to the second connection line FG. The greater the first arc-chord ratio, the greater the degree of convexity of the arc FG corresponding to the second connection line FG, the greater the area of the region within the arc FG, and the less likely that the portion corresponding to the ear hook 230 interferes with a portion between the helix and the concha cavity. The smaller the first arc-chord ratio, the flatter the arc FG corresponding to the second connection line FG, and the smaller the area of the region within the arc FG, and the corresponding portion of the ear hook 230 may interfere with the portion between the helix to the concha cavity (e.g., the helix and the antihelix). In some embodiments, the first arc-chord ratio is greater than 1.05 to prevent the ear hook 230 from interfering with the helix and the antihelix.

If the first arc-chord ratio is too large, it may result in the size of the ear hook 230 being too large and the overall size of the clipping earphone 200 being too large, which affects the wearing effect and reduces portability. In some embodiments, the first arc-chord ratio is less than 1.25 to make the overall size of the clipping earphone 200 appropriate. In some embodiments, the first arc-chord ratio is in a range of 1.05 to 1.25 to balance the overall size of the clipping earphone 200 and the wearing effect.

On the inner contour curve of the third projection 230' and the contour of the first projection 211', a second arcuate segment (i.e., an arc $GP_1$) and a third arcuate segment (i.e., an arc $GP_2$) are determined on two sides of the fourth feature point G point with the fourth feature point G point as a center, and an arcuate length of the second arcuate segment (i.e., the arc $GP_1$) and an arcuate length of the third arcuate segment (i.e., the arc $GP_2$) are in preset arcuate length ranges. A line (i.e., a connection line $P_1P_2$) connecting an end (i.e., a point $P_1$) of the second arcuate segment (i.e., the arc $GP_1$) that is away from the fourth point G and an end (i.e., a point $P_2$) of the third arcuate segment (i.e., the arc $GP_2$) that is away from the fourth feature point E is defined as a third connection line. In some embodiments, a projection of the pressure relief hole 214 on the first symmetry plane 300 is provided on an arcuate segment corresponding to the third connection line $P_1P_2$ (i.e., an arc $P_1P_2$). In some embodiments, a ratio of a second arcuate length of the arc $P_1P_2$ corresponding to the third connection line $P_1P_2$ to a length of the third connection line $P_1P_2$ is defined as a second arc-chord ratio. The greater the second arc-chord ratio, the greater the curvature of the corresponding arc $P_1P_2$, and the deeper an inner contour near a connection position between the sound-production component 210 and the ear hook 230. The smaller the second arc-chord ratio is, the smaller the curvature of the corresponding arc $P_1P_2$ is, and the shallower the inner contour near the connection position between the sound-production component 210 and the ear hook 230.

In some embodiments, since the projection of the pressure relief hole 214 on the first symmetry plane 300 is located on the arc $P_1P_2$, to prevent the pressure relief hole 214 from being blocked by an auricle in the wearing state, the curvature of the arc $P_1P_2$ may be greater than a certain threshold value such that the inner contour near the connection position between the sound-production component 210 and the ear hook 230 has a sufficient depth, which allows the pressure relief hole 214 located at such a recessed region to remain unblocked by the auricle.

In some embodiments, to prevent the pressure relief hole 214 from being blocked by the ear hook 230, the second arc-chord ratio is greater than 1.26. In some embodiments, to avoid the connection between the sound-production portion 210 and the ear hook 230 from being too thin, which affects a strength of the connection, the recessed region may not be too deep, and the second arc-chord ratio may be less than 1.44, i.e., the second arc-chord ratio may be in a range of 1.26 to 1.44.

In some embodiments, the sound-production component includes a first sound driver and a second sound driver. The first sound driver may include a first vibration diaphragm and a first magnetic circuit component (e.g., a first magnet and a first magnetic shield) provided on one side of the first vibration diaphragm along its vibration direction. The second sound driver may include a second vibration diaphragm and a second magnetic circuit component (e.g., a second magnet and a second magnetic shield) provided on one side of the second vibration diaphragm along its vibration direction. A first sound transmission channel may be formed between the first vibration diaphragm and the second vibration diaphragm. The first sound transmission channel and the first magnetic circuit component are located on two sides of the first vibration diaphragm along its vibration direction, respectively, and the first sound transmission channel is equivalent to a front cavity of the first sound driver. Also, the first sound transmission channel and the second magnetic circuit component are located on two sides of the second vibration diaphragm along its vibration direction, respectively, and the first sound transmission channel is equivalent to a front cavity of the second sound driver. The first sound transmission channel serves as the front cavity of both the first sound driver and the second sound driver, and thus the first sound transmission channel is a common front cavity for the first sound driver and the second sound driver.

Figure 5:
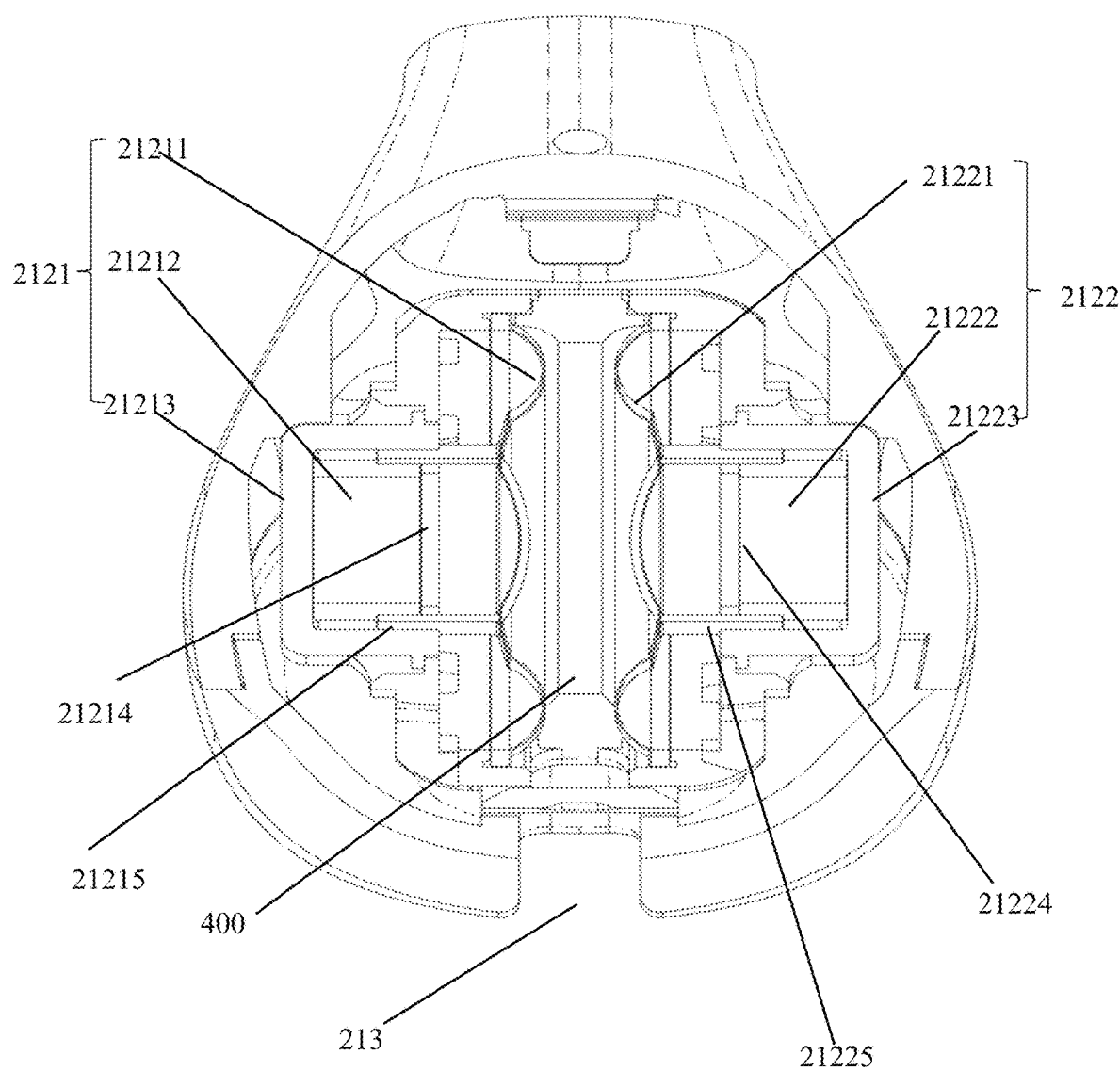
FIG. 5 is a schematic diagram illustrating an exemplary structure of a sound-production portion according to some embodiments of the present disclosure.

FIG. 5 is a schematic diagram illustrating an exemplary structure of a sound-production portion according to some embodiments of the present disclosure. Referring to FIG. 5, in some embodiments, the sound-production component 212 includes a first sound driver 2121 and a second sound driver 2122. The first sound driver 2121 includes a first vibration diaphragm 21211 and a first magnetic circuit component (e.g., a first magnet 21212 and a first magnetic shield 21213 sequentially located away from the first vibration diaphragm 21211) disposed on one side of the vibration first diaphragm 21211 along its vibration direction. The second sound driver 2122 includes a second vibration diaphragm 21221 and a second magnetic circuit component (e.g., a second magnet 21222 and a second magnetic shield 21223 sequentially located away from the second vibration diaphragm 21221) disposed on one side of the second vibration diaphragm 21211 along its vibration direction.

In some embodiments, the first sound driver 2121 and the second sound driver 2122 are disposed relative to each other.

The two sound drivers disposed relative to each other means that the first vibration diaphragm 21211 of the first sound driver 2121 and the second vibration diaphragm 21221 of the second sound driver 2122 are disposed relative to each other. In some embodiments, a front side of the first vibration diaphragm 21211 of the first sound driver 2121 is provided relative to a front side of the second vibration diaphragm 21221 of the second sound driver 2122. At this point, a first sound transmission channel 400 is formed between the first vibration diaphragm 21211 and the second vibration diaphragm 21221. The first sound transmission channel 400 is located on the front side of the first vibration diaphragm 21211 along its vibration direction (i.e., a side of the first vibration diaphragm 21211 that is back away from the first magnetic circuit component), and the first magnetic circuit component is located on a rear side of the first vibration diaphragm 21211 along its vibration direction (i.e., a side of the first vibration diaphragm 21211 that is toward the first magnetic circuit component), and at this time, the first sound transmission channel 400 is equivalent to a front cavity of the first sound driver 2121. At the same time, the first sound transmission channel 400 is disposed on the front side of the second vibration diaphragm 21221 along its vibration direction (i.e., a side of the second vibration diaphragm 21221 that is back away from the second magnetic circuit component), and the second magnetic circuit component is disposed on a rear side of the second vibration diaphragm 21221 along its vibration direction (i.e., a side of the second vibration diaphragm 21221 that is toward the second magnetic circuit component), and at this time, the first sound transmission channel 400 is also equivalent to a front cavity of the second sound driver 2122. The first sound transmission channel 400 serves as the front cavity for both the first sound driver 2121 and the second sound driver 2122, and thus, the first sound transmission channel 400 is a common front cavity for the first sound driver 2121 and the second sound driver 2122.

In some embodiments, the sound outlet hole 213 is in acoustic communication with the first sound transmission channel 400. A sound generated by the front side of the first vibration diaphragm 21211 and a sound generated by the front side of the second vibration diaphragm 21221 are radiated to the outside world through the first sound transmission channel 400 and via the sound outlet hole 213. When the two sound drivers share the front cavity, sound waves of the front cavities of the two sound drivers may be exported out of the shell of the sound-production portion via the same sound outlet hole, thereby simplifying the overall structure of the sound-production portion and reducing the manufacturing cost. In some embodiments, since the sound-production component 212 includes two sound drivers, it results in a larger volume of an accommodation cavity occupied by the two sound drivers. By setting the first sound driver 2121 and the second sound driver 2122 to share a common front cavity, a volume occupied by the two sound drivers can be reduced to facilitate the installation of other structures (e.g., a battery) in the accommodation cavity. Additionally, when the two vibration diaphragms work in concert, there is a greater effect on the change in sound pressure in the first sound transmission channel, and when a cross-sectional area of the sound outlet hole remains unchanged, the two sound drivers working in concert can increase the volume of the sound exported via the sound outlet hole, thereby improving the sound effect.

In some embodiments, the first sound driver 2121 includes the first magnet 21212 and the first magnetic shield 21213 that are located sequentially away from the first vibration diaphragm 21211 and a first basket for support. The first basket is provided with a plurality of air vent holes. The second sound driver 2122 includes the second magnet 21222 and the second magnetic shield that are located sequentially away from the second vibration diaphragm 21221 and a second basket for support. The second basket is provided with a plurality of air vent holes.

The first magnetic shield 21213 has an open end and a closed end, and the open end of the first magnetic shield 21213 is disposed toward the first vibration diaphragm 21211. The first magnet 21212 is disposed within the first magnetic shield 21213, and an end of the first magnet 21212 that is back away from the first vibration diaphragm 21211 is connected to an inner wall of the closed end of the first magnetic shield 21213. The first basket encloses around the first vibration diaphragm 21211, and one end of the first basket that is back away from the first vibration diaphragm 21211 is provided with a first mounting hole, the first magnetic shield 21213 passes through the first mounting hole, and an outer side wall of the first magnetic shield 21213 is connected to a wall of the first mounting hole. The first basket, the first magnetic shield 21213, and the first vibration diaphragm 21211 collectively form a cavity as the rear cavity of the first sound driver 2121. Similarly, the second magnetic shield 21223 has an open end and a closed end. The open end of the second magnetic shield 21223 is disposed toward the second vibration diaphragm 21221, the second magnet 21222 is disposed within the second magnetic shield 21223, and an end of the second magnet 21222 that is back away from the second vibration diaphragm 21221 is connected to an inner wall of the closed end of the second magnetic shield 21223. The second basket encloses around the second vibration diaphragm 21221, one end of the second basket that is back from the second vibration diaphragm 21221 is provided with a second mounting hole, the second magnetic shield 21223 passes through the second mounting hole, and an outer side wall of the second magnetic shield 21223 is connected to a wall of the second mounting hole. The second basket, the second magnetic shield 21223, and the second vibration diaphragm 21221 collectively form a cavity as the rear cavity of the second sound driver 2122.

The magnets (including the first magnet 21212 and the second magnet 21222) are configured to generate a magnetic field. When a strength of the magnetic field generated by the magnet changes, it may result in a change in the force subjected by a corresponding vibration diaphragm, which causes the corresponding vibration diaphragm to vibrate, and a vibration of the vibration diaphragm may lead to a vibration of the air in the first sound transmission channel 400, thereby generating sound waves. The magnetic shield may be configured to suppress magnetic leakage from the magnetic circuit component (e.g., the magnet, etc.) of the sound driver. The basket is primarily configured to support and secure components (e.g., the magnet and the magnetic shield) of the sound driver.

In some embodiments, a material used to make the first magnetic shield 21213 and the second magnetic shield 21223 includes one or a combination of mild steel, silicon steel sheet, silicon steel sheet, and ferrite. In some embodiments, the first magnet 21212, the first magnetic shield 21213, and the first basket are the same as or similar to the second magnet 21222, the second magnetic shield 21223, and the second basket.

In some embodiments, the first basket and the first magnetic shield 21213 are connected by bonding, snap connection, welding, riveting, or the like. For example, a connection between the first basket and the first magnetic shield 21213 are connected and secured by a sealant. The second basket and the second magnetic shield 21223 may also be connected by the same or similar connection as the previous embodiment.

In some embodiments, the first sound driver 2121 further includes a first magnetic conductor plate 21214 disposed within the first basket. The first magnetic conductor plate 21214 is connected to a side of the first magnet 21212 that is close to the first vibration diaphragm 21211 for adjusting a distribution of a magnetic field generated by the first magnet 21212. Similarly, the second sound driver 2122 further includes a second magnetic conductor plate 21224 disposed within the second basket. The second magnetic conductor plate 21224 is connected to one side of the second magnet 21222 that is close to the second diaphragm 21221 for adjusting a distribution of a magnetic field generated by the second magnet 21222. In some embodiments, the first magnetic conductor plate 21214 and the second magnetic conductor plate 21224 are the same or similar.

In some embodiments, the first sound driver 2121 further includes a first coil 21215 disposed within the first basket, the first coil 21215 being disposed around a side wall of the first magnet 21212. When the first coil 21215 is energized with a current (e.g., by energizing the current to the first coil 21215 through a welding pad on the first basket), the first coil 21215 vibrates and drives the first vibration diaphragm 21211 in response to the magnetic field. Similarly, the second sound driver 2122 further includes a second coil 21225 disposed within the second basket, the second coil 21225 being disposed around a side wall of the second magnet 21222. When the second coil 21225 is energized with a current (e.g., by energizing the current to the second coil 21225 through a welding pad on the second basket), the second coil 21225 vibrates and drives the second vibration diaphragm 2122 to vibrate in response to the magnetic field. In some embodiments, the first coil 21215 and the second coil 21225 are the same or similar.

In some embodiments, a second sound transmission channel is formed between the first basket and the second basket. One side of the first vibration diaphragm 21211 that is remote from the first sound transmission channel 400 is connected to the second sound transmission channel through an air vent hole on the first basket. One side of the second vibration diaphragm 21221 that is remote from the first sound transmission channel 400 is connected to an air vent hole on the second basket. Merely by way of example, an end surface of the first basket that is away from the first vibration diaphragm 21211 and an end surface of the second basket that is away from the second vibration diaphragm 21221 have a gap with an inner wall of the shell 211, so that a second sound transmission channel may be formed between the first basket, the second basket, and the shell 211. A cavity near the end surface of the first basket that is back from the first vibration diaphragm 21211 and a cavity near the end surface of the second basket that is back from the second vibration diaphragm 21221 may be in acoustic communication. One side of the first vibration diaphragm 21211 that is away from the first sound transmission channel 400, the first basket, and the first magnetic shield 21213 together form the rear cavity of the first sound driver 2121. One side of the second vibration diaphragm 21221 that is back away from the first sound transmission channel 400, the second basket, and the second magnetic shield 21223 together form the rear cavity of the second sound driver 2122. The rear cavity of the first sound driver 2121 and the rear cavity of the second sound driver 2122 are in acoustic communication with the second sound transmission channel via the air vent hole on the first basket and the air vent hole on the second basket, respectively, which is equivalent to a common rear cavity of the first sound driver 2121 and the second sound driver 2122. In some embodiments, the air vent hole is also provided on the magnetic shield. A plurality of air vent holes are provided on the first magnetic shield 21213 and the second magnetic shield 21223, respectively, and the rear cavity of the first sound driver 2121 is in acoustic communication with the second sound transmission channel via the air vent holes on the first magnetic shield 21213, and the rear cavity of the second sound driver 2122 is in acoustic communication with the second sound transmission channel through the air vent holes on the second magnetic shield 21223. In this setup, it is also possible to achieve the same, or nearly the same, effect as if the air vent holes were set up on a basket.

In some embodiments, the air vent holes on both baskets are in acoustic communication with the pressure relief hole 214 on the shell 211. The rear cavity of the first sound driver 2121 and the rear cavity of the second sound driver 2122 are in acoustic communication, and the airflow in the rear cavities of the two sound drivers may be directed to the same pressure relief hole (e.g., the pressure relief holes 214) via corresponding air vent holes, and then out of the shell 211 via the same pressure relief hole, which can simplify the overall structure of the sound-production portion 210 and reduce the manufacturing cost of the sound-production portion 210. In some embodiments, since the sound-production component 212 includes two sound drivers, which results in a larger volume of the accommodation cavity occupied by the two sound drivers, the volume occupied by the two sound drivers is further reduced by setting the first sound driver 2121 and the second sound driver 2122 to share a common rear cavity, which facilitates the installation of other structures (e.g., the battery) in the accommodation cavity. In some embodiments, a waterproof breathable membrane is provided over the sound outlet hole 213 and/or the second sound transmission channel when the first sound driver 2121 and the second sound driver 2122 share a common rear cavity. The waterproof breathable membrane may function as a waterproof and dustproof membrane while ensuring the sound quality of the clipping earphone 200 and increasing the reliability of the clipping earphone 200.

Figure 6:
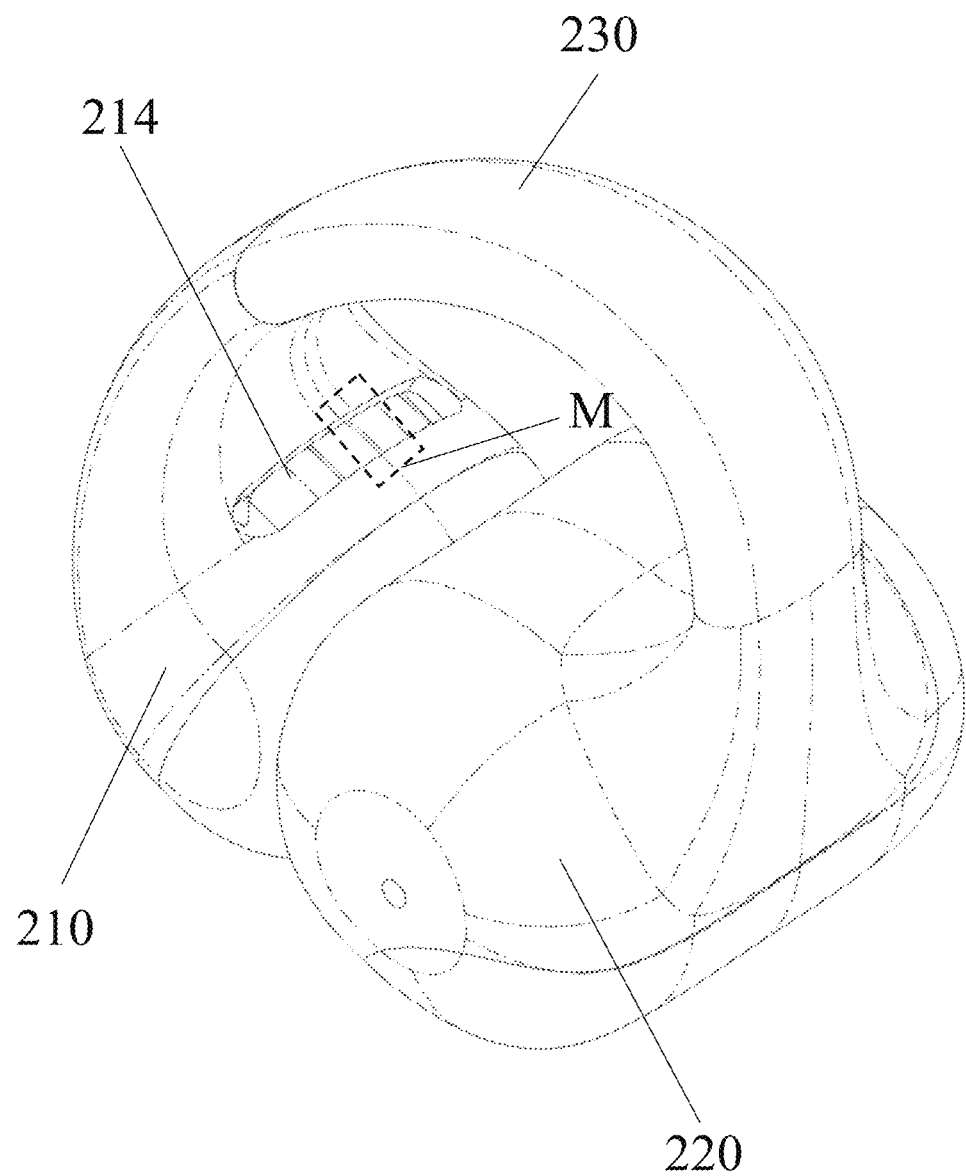
FIG. 6 is a schematic diagram illustrating an exemplary structure of a pressure relief hole according to some embodiments of the present disclosure.

In some embodiments, when the sound-production portion 210 (or a sound-production portion 1410 mentioned later) includes two sound drivers, the vibration diaphragms of the two sound drivers are the same or similar. That is, the first vibration diaphragm 21211 of the first sound driver 2121 is the same or similar to the second vibration diaphragm 21221 of the second sound driver 2122. A resonance frequency of the first vibration diaphragm 21211 and a resonance frequency of the second vibration diaphragm 21221 may both be less than 300 Hz, and a difference between the resonance frequency of the first vibration diaphragm 21211 and the resonance frequency of the second vibration diaphragm 21221 is less than 50 Hz. A resonance frequency of a vibration diaphragm refers to a first resonance peak that appears when performing a frequency sweep on the vibration diaphragm from low to high frequencies. The first resonance peak corresponds to a point where an impedance curve of the vibration diaphragm increases. It should be noted that, in consideration of the acoustic characteristics of the double vibration diaphragms, the resonance peaks of the two vibration diaphragms in the embodiment of the present disclosure have a frequency of less than 300 Hz, e.g., in a range of 200 Hz to 300 Hz, which can better exhibit a low-frequency portion of a sound signal, thereby providing a better musical effect. In addition, in the case where the first vibration diaphragm 212211 and the second vibration diaphragm 21221 are the same, there is no need to separately manufacture the first vibration diaphragm 21221 and the second vibration diaphragm 21221, and a type of material for manufacturing can be reduced, the reducing the cost and difficulty of production. FIG. 6 is a schematic diagram illustrating an exemplary structure of a pressure relief hole according to some embodiments of the present disclosure. Referring to FIG. 6, in some embodiments, the pressure relief hole 214 extends in a direction perpendicular to the first symmetry plane 300. For example, an outer end surface of the pressure relief hole 214 is a bar-shaped structure, with the bar-shaped structure extending in the direction perpendicular to the first symmetry plane 300 (the direction perpendicular to the first symmetry plane 300 may be considered to be a length direction of the outer end surface of the pressure relief hole 214). In some embodiments, an air vent hole on a first basket and an air vent hole on a second basket are located on each side of the first symmetry plane 300, respectively. For example, the air vent hole on the first basket is located on one side of the first symmetry plane 300, and the air vent hole on the second basket is located on the other side of the first symmetry plane 300.

In some embodiments, two ends of the pressure relief hole 214 extend to the air vent holes on each of the two baskets. It is specifically to be understood that an end portion of the pressure relief hole 214 extends to a location where a center of the end portion is closest to a center of the nearest air vent hole. This setup allows a sound coming out of the vent air holes to take the shortest possible path to reach the pressure relief hole 214, which is exported to the outside of the shell 211.

In some embodiments, the outer end surface of the pressure relief hole 214 is symmetrical with respect to the first symmetry plane 300. As can be seen from the above, the sound-production component 212 includes two sound drivers and the sound-production component 212 as a whole is a symmetrical structure, for example, the first basket and the second basket are provided with air vent holes, respectively. A sound in a rear cavity of a first sound driver and a sound in a rear cavity of a second sound driver are exported to the pressure relief hole 214 via corresponding air vent holes, respectively. By setting the outer end surface of the pressure relief hole 214 to be symmetrical with respect to the first symmetry plane 300, it is possible to make a path of the sound in the rear cavity of the first sound driver that is exported via the air vent holes on the first basket to the pressure relief hole 214 equal to or approximately equal to a path of the sound in the rear cavity of the second sound driver that is exported via the air vent holes on the second basket to the pressure relief hole 214. This ensures that the sound from the rear cavity of the first sound driver and the sound from the rear cavity of the second sound driver are exported via the pressure relief hole 214 to the outside of the shell 211, with either the same or nearly the same amplitude and phase (or with a consistent change in amplitude and phase between the two sounds).

In some embodiments, the two end portions of the pressure relief hole 214 have a larger opening size than a middle segment of the pressure relief hole 214. When the two end portions of the pressure relief hole 214 have a larger opening size than the middle segment, the pressure relief hole 214 has a similar "bone-shaped" shape.

In some embodiments, the sound-production component 212 includes a mounting bracket on which the first sound driver 2121 and the second sound driver 2122 are mounted. For example, the first basket is connected to the mounting bracket. The first conductor plate 21214, the first magnet 21212, the first magnetic shield 21213, and the first vibration diaphragm 21211 of the first sound driver 2121 are all connected to the mounting bracket through the first basket. That is, the first sound driver 2121 is mounted on the mounting bracket through the first basket. Similarly, the second basket is connected to the mounting bracket. The second conductor plate 21224, the second magnet 21222, the second magnetic shield 21223, and the second vibration diaphragm 21221 of the second sound driver 2122 are all connected to the mounting bracket through the second basket. That is, the second sound driver 2122 is mounted on the mounting bracket through the second basket. In some embodiments, both the first sound driver 2121 and the second sound driver 2122 are mounted on the same mounting bracket. For example, the mounting bracket is mainly disposed between the first sound driver 2121 and the second sound driver 2122, and a portion of a structure on the mounting bracket may enclose a first transmission channel cavity together with the first sound driver 2121 and the second sound driver 2122. In such a manner, the overall structure of the sound-production portion 210 can be simplified and the manufacturing cost of the sound-production portion 210 can be reduced. Additionally, the adjustment of a common cavity of the first sound driver 2121 and the second sound driver 2122 can be realized only by the design of the mounting bracket, which prevents the complex structure of the shell 211 from causing an impact on the acoustic effect of the common cavity. Based on the above-described manner of setting up the mounting bracket, in some embodiments, the mounting bracket may form a blockage to a portion (such as a region shown by dashed box M in FIG. 6) of the middle segment (i.e., a region on the pressure relief hole 214 other than the two end portions) of the pressure relief hole 214, and a region on the pressure relief hole 214 blocked by the mounting bracket fails to export a sound to the outside world. By setting the two end portions of the pressure relief holes 214 to have a larger opening size than the middle segment, the end portions of the pressure relief holes 214 are made to have a larger opening size, which allows the sound coming out of the air vent holes to pass through the end portions of the pressure relief hole 214 to be exported to the outside world more smoothly.

In some embodiments, a first maximum distance between the pressure relief hole 214 and the air vent hole on the first basket (or the first magnetic shield 21213) is the same or approximately the same as a second maximum distance between the pressure relief hole 214 and the air vent hole on the second basket (or the second magnetic shield 21223). For example, a ratio of a difference between the first maximum distance and the second maximum distance to a first maximum distance is less than 10%. With this setting, it is possible to effectively prevent the distance between the air vent hole of one of the sound drives and the pressure relief hole 214 from being too large, which affects the overall sound quality of the sound-production portion 210. In some embodiments, a maximum distance (the first maximum distance or a second maximum distance) between the pressure relief hole 214 and an air vent hole (the air vent hole of the first sound driver 2121 or the air vent hole of the second sound driver 2122) is less than 0.5 mm.

In some embodiments, a rear cavity of the sound-production portion 210 (the rear cavity of the first sound driver or the rear cavity of the second sound driver) has a first resonance frequency. By adjusting an area of the pressure relief hole 214, the adjustment of the first resonance frequency can be realized. A front cavity of the sound-production portion 210 (the front cavity of the first sound driver or the front cavity of the second sound driver) has a second resonance frequency. By adjusting an area of the air vent hole 213, the adjustment of the second resonance frequency can be realized.

Figure 7:
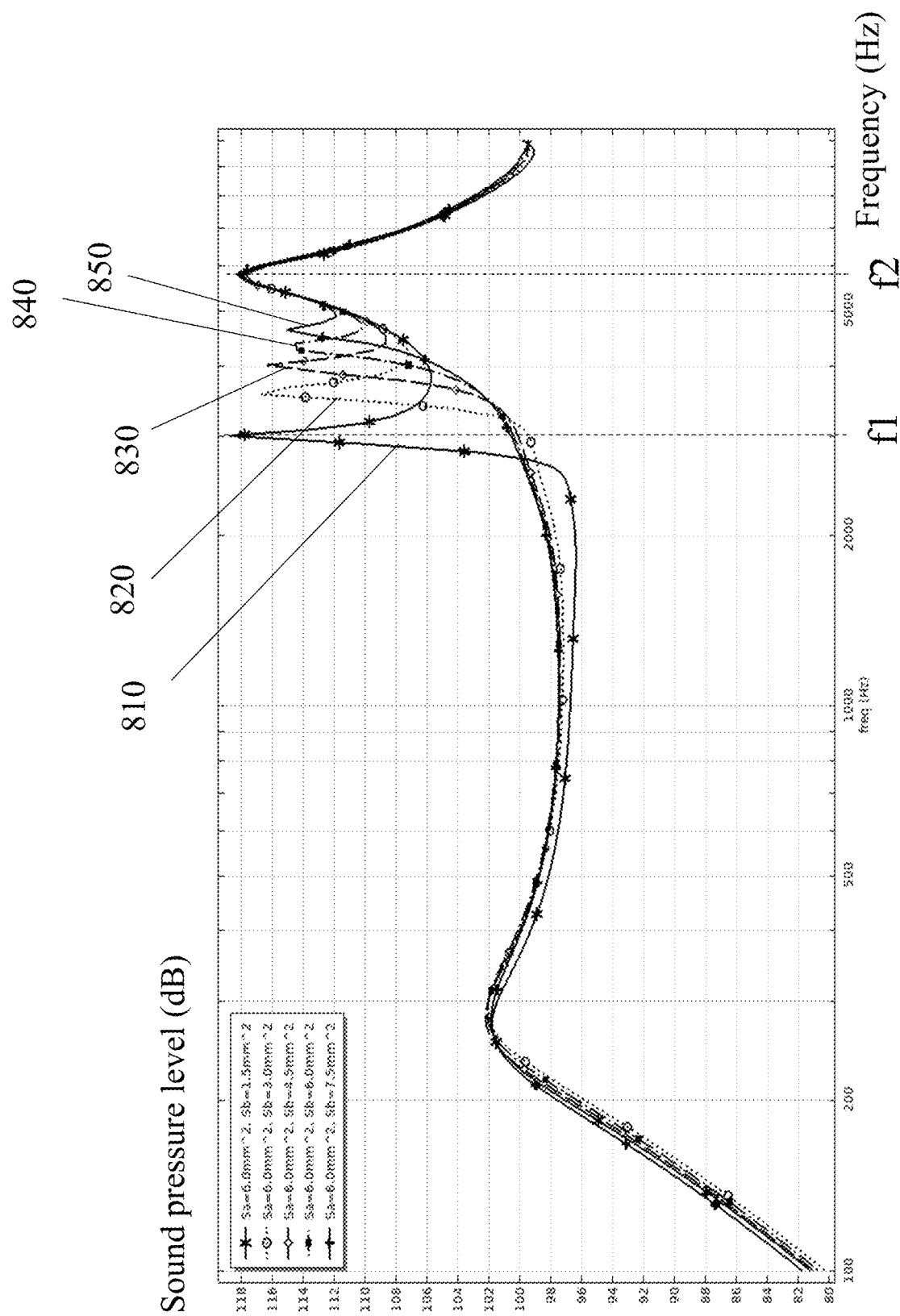
FIG. 7 is a diagram illustrating frequency response curves corresponding to a rear cavity when a pressure relief hole has different areas according to some embodiments of the present disclosure.

FIG. 7 is a diagram illustrating frequency response curves corresponding to a rear cavity when a pressure relief hole has different areas according to some embodiments of the present disclosure. A horizontal axis represents a frequency in Hz and a vertical axis represents a sound pressure level in dB. Different curves in FIG. 7 represent frequency response curves corresponding to the rear cavity when the pressure relief hole (e.g., the pressure relief hole 214) has different areas when an area of a sound outlet hole (e.g., the sound outlet hole 213) is constant (for example, an area of the sound outlet hole is 6 mm$^2$). A curve 810 represents a frequency response curve of the rear cavity when the area of the pressure relief hole is 1.5 mm$^2$; a curve 820 represents a frequency response curve of the rear cavity when the area of the pressure relief hole is 3 mm$^2$; a curve 830 represents a frequency response curve of the rear cavity when the area of the pressure relief hole is 4.5 mm$^2$; a curve 840 represents a frequency response curve of the rear cavity when the area of the pressure relief hole is 6 mm$^2$; and a curve 850 represents a frequency response curve of the rear cavity when the area of the pressure relief hole is 7.5 mm$^2$. As can be seen from FIG. 7, each curve has two resonance peaks, and the two resonance peaks correspond to different resonance frequencies. Taking the curve 810 as an example, the curve 810 has a first resonance peak and a second resonance peak, the first resonance peak corresponding to a first resonance frequency f1 of about 3000 Hz, and the second resonance peak corresponding to a second resonance frequency f2 of about 5900 Hz. A comparison of each curve shows that second resonance frequencies corresponding to second resonance peaks of each curve are essentially the same (about 5900 Hz), which is due to the same area of the sound outlet hole. If the sound outlet hole is of the same area, the second resonance frequencies of front cavities are substantially the same. By comparing each curve, a magnitude relationship between first resonance frequencies corresponding to first resonance peaks of each curve is as follows: a first resonance frequency of the curve 810<a first resonance frequency of the curve 820<a first resonance frequency of the curve 830<a first resonance frequency of the curve 840<a first resonance frequency of the curve 850. It can be seen that, within a certain range, a first resonance frequency corresponding to a first resonance peak of a curve gradually increases as the area of the pressure relief hole increases.

Figure 8:
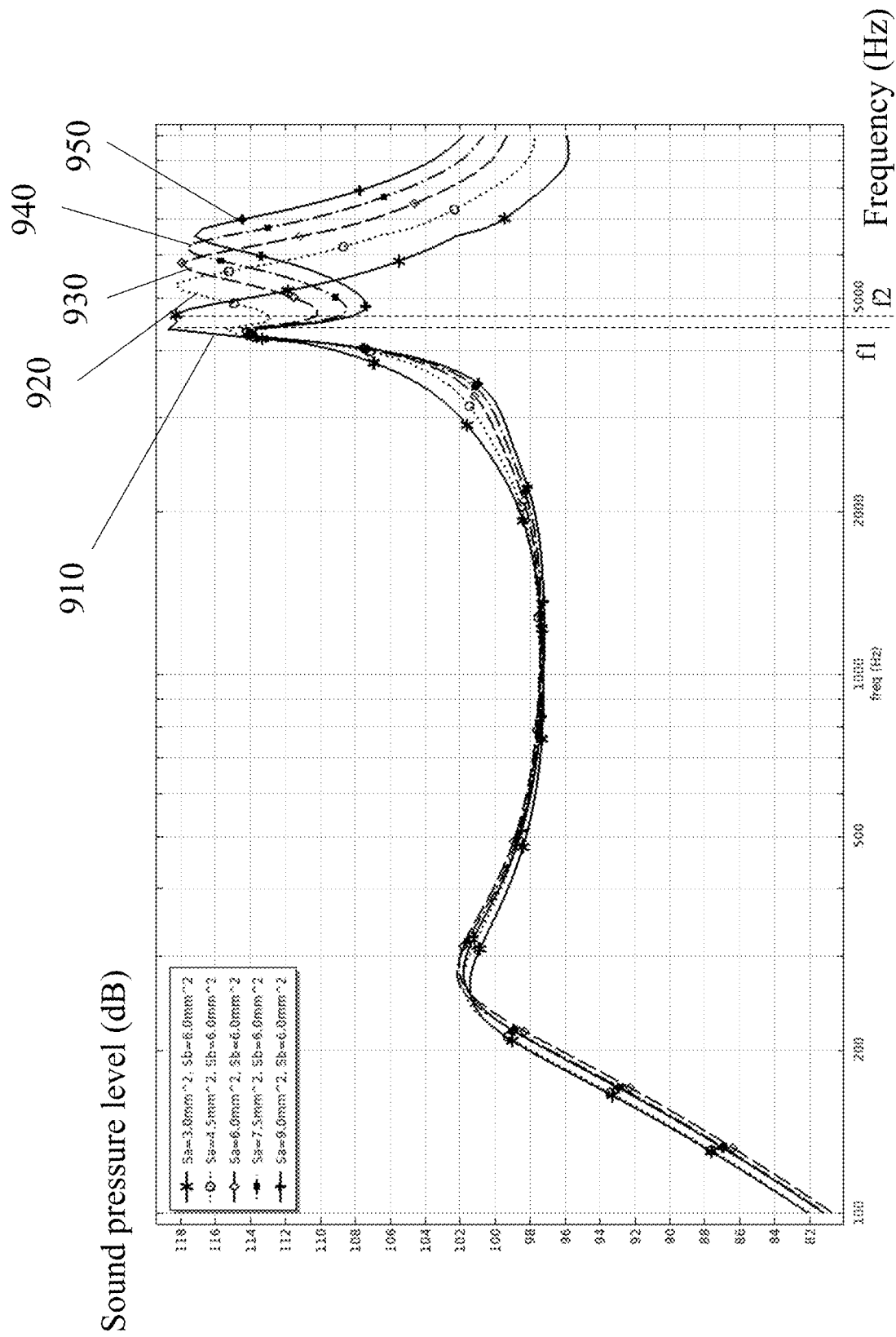
FIG. 8 is a diagram illustrating frequency response curves corresponding to a front cavity when a sound outlet hole has different areas according to some embodiments of the present disclosure.

FIG. 8 is a diagram illustrating frequency response curves corresponding to a front cavity when a sound outlet hole has different areas according to some embodiments of the present disclosure. A horizontal axis represents a frequency in Hz and a vertical axis represents a sound pressure level in dB. Different curves in FIG. 8 represent corresponding frequency response curves of the front cavity when the sound outlet hole (e.g., the sound outlet hole 213) has different areas when an area of a pressure relief hole (e.g., the pressure relief hole 214) is constant (for example, the area of the pressure relief hole is 6 mm$^2$). A curve 910 represents a frequency response curve of the front cavity when the area of the sound outlet hole is 3 mm$^2$; a curve 920 represents a frequency response curve of the front cavity when the area of the sound outlet hole is 4.5 mm$^2$; a curve 930 represents a frequency response curve of the front cavity when the area of the sound outlet hole is 6 mm$^2$; a curve 940 represents the frequency response curve of the front cavity when the area of the sound outlet hole is 7.5 mm$^2$; a curve 950 represents a frequency response curve of the front cavity when the area of the sound outlet hole is 9 mm$^2$. It can be seen from FIG. 8 that each curve has two resonance peaks, and the two resonance peaks correspond to different resonance frequencies. Taking the curve 910 as an example, the curve 910 has a first resonance peak and a second resonance peak, and the first resonance peak corresponds to a first resonance frequency f1 of about 4400 Hz, and the second resonance peak corresponds to a second resonance frequency f2 of about 4600 Hz. A comparison of each curve shows that first resonance frequencies corresponding to first resonance peaks of each curve are basically the same (about 4200 Hz), which is due to the same area of the pressure relief hole. If the pressure relief hole has the same area, first resonance frequencies of rear cavities are substantially the same. By comparing each curve, a magnitude relationship between the second resonance frequencies corresponding to the second resonance peaks of each curve is as follows: the second resonance frequency of the curve 910<the second resonance frequency of the curve 920<the second resonance frequency of the curve 930 the second resonance frequency of curve 930<the second resonance frequency of curve 940<the second resonance frequency of curve 950. It can be seen that, within a certain range, a second resonance frequency corresponding to a second resonance peak of a curve gradually increases as the area of the sound outlet hole increases.

In some embodiments, a second resonance frequency of the front cavity is greater than a first resonance frequency of the rear cavity. When there is a large difference between the second resonance frequency of the front cavity and the first resonance frequency of the rear cavity, a valley may form between the second resonance peak and the first resonance peak, resulting in undesirable sound in a middle-and-high frequency band (e.g., in a range of 3000 Hz to 5000 Hz). Taking the curve 810 in FIG. 7 as an example, the first resonance peak corresponds to the first resonance frequency f1 of about 3000 Hz, the second resonance peak corresponds to the second resonance frequency f2 of about 5900 Hz, and a difference between the second resonance frequency and the first resonance frequency is about 1900 Hz, and a larger valley is formed between the two resonance peaks, which results in a smaller sound pressure level in a frequency range near 4000 Hz, leading to an undesirable sound. When the difference between the second resonance frequency of the front cavity and the first resonance frequency of the rear cavity is small, a spacing between the second resonance peak and the first resonance peak is too small, or the second resonance peak even overlaps with the first resonance peak, which results in an overly rapid decline in the frequency response curve at high frequencies, leading to a weak high-frequency response. Taking the curve 910 in FIG. 8 as an example, the first resonance peak corresponding to the first resonance frequency f1 is about 4400 Hz, the second resonance peak corresponding to the second resonance frequency f2 is about 4600 Hz, and a difference between the second resonance frequency and the first resonance frequency is about 200 Hz, a spacing between the two resonance peaks is too small. In a frequency band higher than 4600 Hz, the curve 910 declines too quickly, resulting in a weak high-frequency response. Based on this, in some embodiments, the difference between the second resonance frequency of the front cavity and the first resonance frequency of the rear cavity is in a suitable range by adjusting the area of the sound outlet hole and/or the pressure relief hole, so as to improve the output effect of the clipping earphone 200 in the middle-and-high frequency. In some embodiments, the difference between the second resonance frequency of the front cavity and the first resonance frequency of the rear cavity is in a range of 0.5 kHz to 1.5 kHz. In some embodiments, the difference between the second resonance frequency of the front cavity and the first resonance frequency of the rear cavity is in a range of 0.7 kHz to 1.3 kHz by adjusting the area of the sound outlet hole and/or the pressure relief hole. In some embodiments, the difference between the second resonance frequency of the front cavity and the first resonance frequency of the rear cavity is in a range of 0.9 kHz to 1.1 kHz by adjusting the area of the sound outlet hole and/or the pressure relief hole.

In some embodiments, by adjusting the area of the pressure relief hole, it is possible to make the first resonance frequency of the rear cavity higher than 4.5 kHz. In this setting, on the one hand, it can be ensured that the difference between the second resonance frequency of the front cavity and the first resonance frequency of the rear cavity is in a suitable range; on the other hand, it can also be ensured that a frequency response curve is smoother (or a smoothness interval of a frequency response curve is larger) in a low-and-medium frequency range (e.g., in a range of 300 Hz to 4.5 kHz), so that phases and amplitudes of sounds exported from the front cavity via the sound outlet hole 213 and that exported from the rear cavity via the pressure relief hole 214 are more stable in the low-and-medium frequency range, such as the phase is approximately opposite and the amplitude is approximately equal, thereby strengthening the interference phase cancellation between the sound exported via the pressure relief hole 214 and the sound exported via the sound outlet hole 213 in a far field, and reducing the sound leakage in the far field of the clipping earphone 200.

In some embodiments, by adjusting the area of the sound outlet hole, it is possible to make the second resonance frequency of the front cavity lower than 6 kHz. In this setting manner, on the one hand, it can be ensured that the difference between the second resonance frequency of the front cavity and the first resonance frequency of the rear cavity is in a suitable range; on the other hand, it can also be ensured that the clipping earphone 200 has a better performance in the middle-and-high frequency.

In some embodiments, in order to ensure that the second resonance frequency of the front cavity is lower than 6 kHz, the area of the sound outlet hole is no more than 18 mm². In some embodiments, to ensure that a low-frequency volume is sufficiently loud, the area of the sound outlet hole is no less than 5 mm². In some embodiments, in order to account for the second resonance frequency and the low-frequency volume, the area of the sound outlet hole is in a range of 5 mm² to 18 mm². In some embodiments, in order to account for the second resonance frequency and the low-frequency volume, the area of the sound outlet hole is in a range of 8 mm² to 16 mm².

In some embodiments, a volume of the front cavity affects the second resonance frequency. When the area of the sound outlet hole is the same, the second resonance frequency is negatively correlated with the volume of the front cavity. Specifically, the larger the volume of the front cavity, the lower the second resonance frequency; the smaller the volume of the front cavity, the higher the second resonance frequency. In some embodiments, in order to ensure that the second resonance frequency is in a suitable range, the volume of the front cavity is in a range of 60 mm³ to 120 mm³. In some embodiments, in order to ensure that the second resonance frequency is in a suitable range, and so that the sound-production portion 210 is of a suitable size, the volume of the front cavity is in a range of 80 mm³ to 100 mm³.

In some embodiments, to ensure that the first resonance frequency of the rear cavity is higher than 4.5 kHz, the area of the pressure relief hole is in a range of 6 mm² to 15 mm². In some embodiments, a volume of the rear cavity affects the first resonance frequency. When the area of the pressure relief hole is the same, the first resonance frequency is negatively correlated with the volume of the rear cavity. Specifically, the larger the volume of the rear cavity, the lower the first resonance frequency; the smaller the volume of the rear cavity, the higher the first resonance frequency. In some embodiments, in order to ensure that the first resonance frequency is in a suitable range, the volume of the rear cavity is in a range of 80 mm³ to 180 mm³. In some embodiments, to ensure that the first resonance frequency is in a suitable range, as well as to allow the sound-production portion 210 to be of a suitable size, the volume of the rear cavity is in a range of 100 mm³ to 160 mm³. It should be noted that the area of the pressure relief hole herein refers to an equivalent total area of the pressure relief hole. For example, when there is one pressure relief hole, the area of the pressure relief hole herein is an area of a single pressure relief hole. When there are a plurality of pressure relief holes, the area of the pressure relief hole herein is a sum of areas of the plurality of pressure relief holes.

Figure 9:
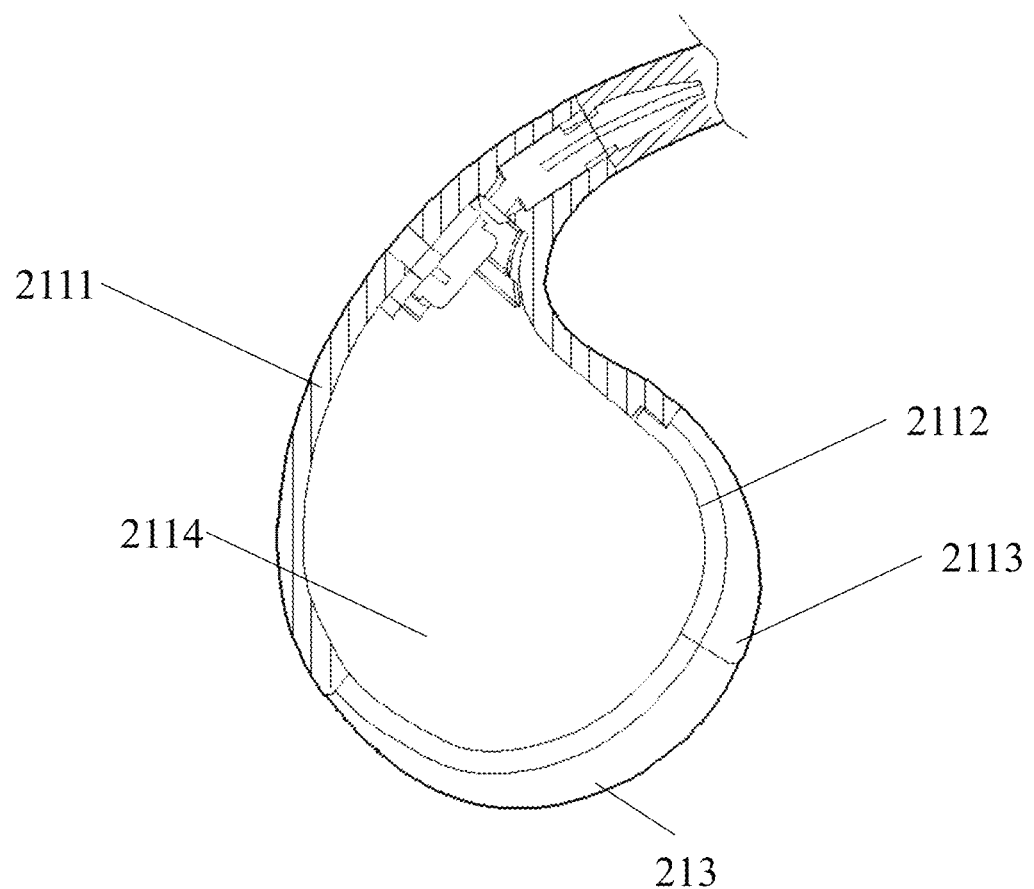
FIG. 9 is a schematic diagram illustrating an exemplary structure of a shell according to some embodiments of the present disclosure.

FIG. 9 is a schematic diagram illustrating an exemplary structure of a shell according to some embodiments of the present disclosure. Referring to FIG. 9, the shell 211 may include the first rigid shell 2111, the second rigid shell 2112 is disposed toward a concha cavity of a wearer during wear, and a first flexible body 2113 is configured to be in contact with the concha cavity of the wearer. In some embodiments, a rigid material is plastic, metal, or other materials capable of being used as a support material for a shell to provide better support and solidity to an internal structure of the shell 211, such as a sound-production component. In some embodiments, the first rigid shell 2111 and the second rigid shell 2112 combine to form the accommodation cavity 2114, and the sound-production component is disposed within the accommodation cavity 2114. The first flexible body 2113 is covered on an outer wall of the second rigid shell 2112, and the first flexible body 2113 may be made of silicone or other skin-friendly flexible materials to improve comfort when the sound-production component 211 is in contact with the wearer.

In some embodiments, the first rigid shell 2111 and the second rigid shell 2112 may provide better support to support the internal structure. In a wearing state, the second rigid shell 2112 may be oriented towards the concha cavity of the wearer and in contact with the wearer. In embodiments of the present disclosure, the first flexible body 2113 is covered on the outer wall of the second rigid shell 2112, which can improve the wearing comfort of the earphone.

In some embodiments, the first flexible body 2113 is covered on the outer wall of the second rigid shell 2112, and the first flexible body 2113 does not essentially affect the external structure and the internal space of the first rigid shell 2111, ensuring that internal space of the first rigid shell 2111 is utilized. Specifically, the first flexible body 2113 is wrapped around the outer wall of the second rigid shell 2112 so that a portion of the second rigid shell 211 has a double-layer wall thickness, and a portion of the first flexible body 2113 that is not wrapped around the outer wall of the shell 211 or is only close to the first rigid shell 21111 is wrapped around the first flexible body 2113 so that a thickness of the first rigid shell 2111 only requires to be thick with one wall. Therefore, the first rigid shell 2111 occupies a small volume of the accommodation cavity 2114, leaving more space for accommodating sound-production components with larger oscillators (e.g., a sound-production component including two sound drivers) to create better acoustics.

In some embodiments, an end portion of the second rigid shell 2112 and an end portion of the first rigid shell 2111 are spliced and fixed. The end portion of the second rigid shell 2112 is fixed to the end portion of the first rigid shell 2111 by means of splicing to form a reliable fixation with less occupied space, and this splicing manner also facilitates assembly and reduces the assembly process.

In some embodiments, the sound outlet hole 213 is located on the second rigid shell 2112 and the first flexible body 2113. By locating the sound outlet hole 213 on the second rigid shell 2112 and the first flexible body 2113, the sound outlet hole 213 does not extend into the first rigid shell 2111, which facilitates the splicing and fixation between the end portion of the first rigid shell 2111 and the end portion of the second rigid shell 2112, thereby improving precision. In addition, with this setup, misalignment of the sound outlet hole 213 can be avoided, and it also facilitates the installation of a stencil and a sound-tuning grid on the sound outlet hole 213.

Figure 10A:
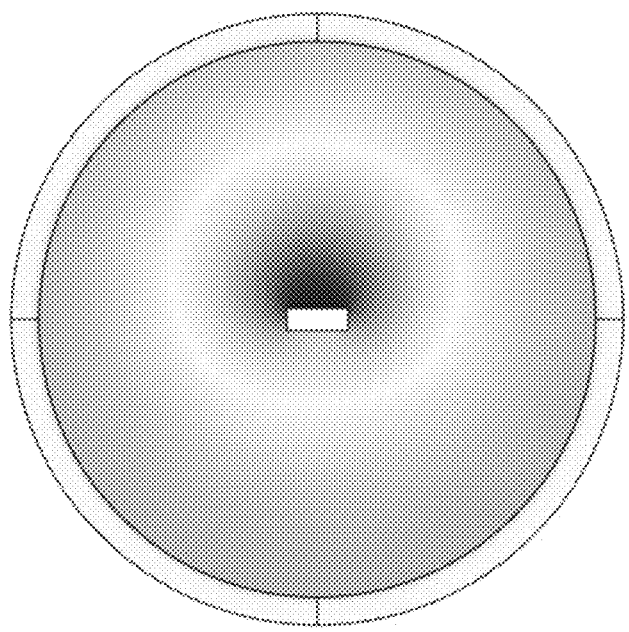
FIG. 10A is a schematic diagram illustrating a sound field of a free field according to some embodiments of the present disclosure.
Figure 10B:
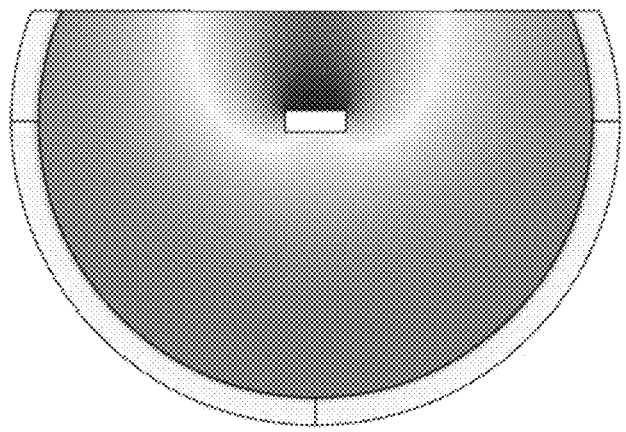
FIG. 10B is a schematic diagram illustrating a sound field of a reflection field according to some embodiments of the present disclosure.

FIG. 10A is a schematic diagram illustrating a sound field of a free field according to some embodiments of the present disclosure. FIG. 10B is a schematic diagram illustrating a sound field of a reflection field according to some embodiments of the present disclosure. The shades of gray regions in FIG. 10A and FIG. 10B represents a magnitude of a sound pressure level. The larger the gray scale, the larger the sound pressure level; and the lighter the gray scale, the smaller the sound pressure level. In some embodiments, a sound field of a sound exported via a sound outlet hole when the sound outlet hole is not blocked by a concha cavity is a free field, as shown in FIG. 10A. In some embodiments, when a portion of the sound outlet hole (e.g., the sound outlet hole 213) is blocked by an inner wall of the concha cavity, in the proximity of a sound propagation direction, the inner wall of the concha cavity constitutes a reflection wall surface along the sound propagation direction, and the reflection wall surface reflects a sound. A sound field of a sound exported via the sound outlet hole is a reflection field as shown in FIG. 10B. Reflected sound waves in the reflection field and source sound waves (i.e., original sound waves exported via the sound outlet hole 213) may interfere and diffract each other to form a sound reinforcement zone, thus increasing a sound pressure level of a sound.

Figure 10C:
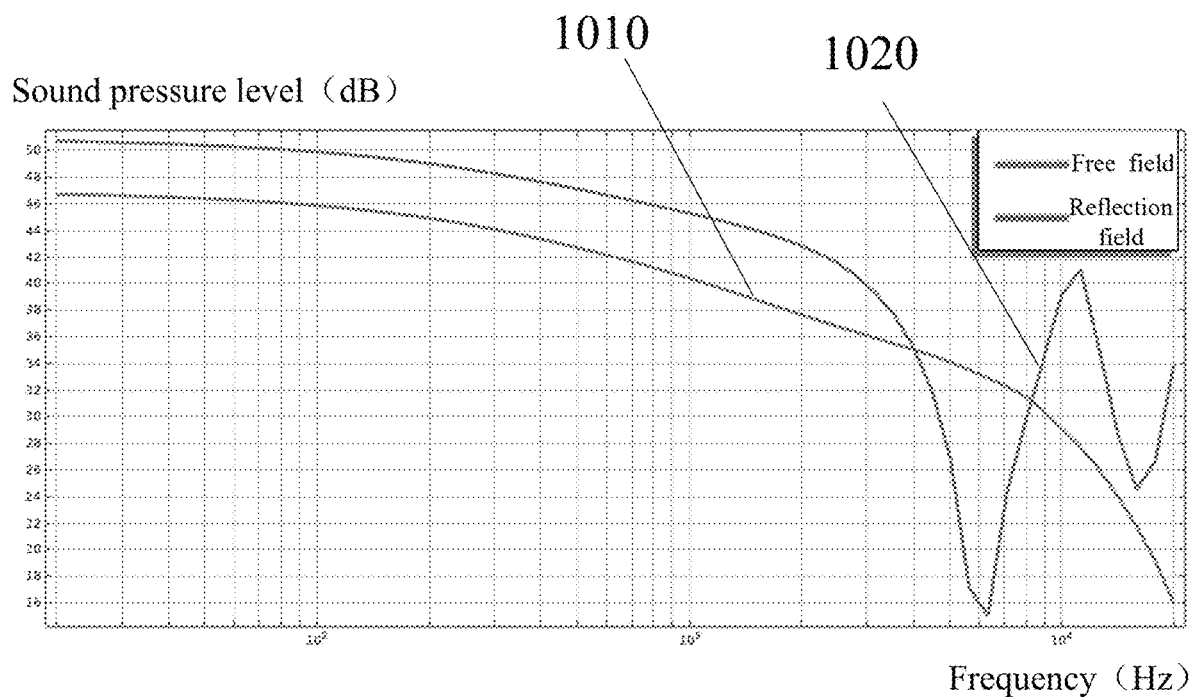
FIG. 10C is a diagram illustrating sound pressure level curves of a free field and a reflection field according to some embodiments of the present disclosure.

FIG. 10C is a diagram illustrating sound pressure level curves of a free field and a reflection field according to some embodiments of the present disclosure. A horizontal axis represents a frequency in Hz and a vertical axis represents a sound pressure level of a sound field in dB. A curve 1010 represents a sound pressure level curve of the free field, and a curve 1020 represents a sound pressure level curve of the reflection field. A comparison of the curve 1010 and the curve 1020 shows that the sound pressure level of the reflection field is overall higher than that of the free field (which may also be interpreted to mean that an average sound pressure level of the reflection field is higher than that of the free field), especially in a low-and-middle frequency band (e.g., less than 4,000 Hz) and in a high frequency band (e.g., higher than 8,000 Hz). This phenomenon is also known as the Horn effect.

Figure 11A:
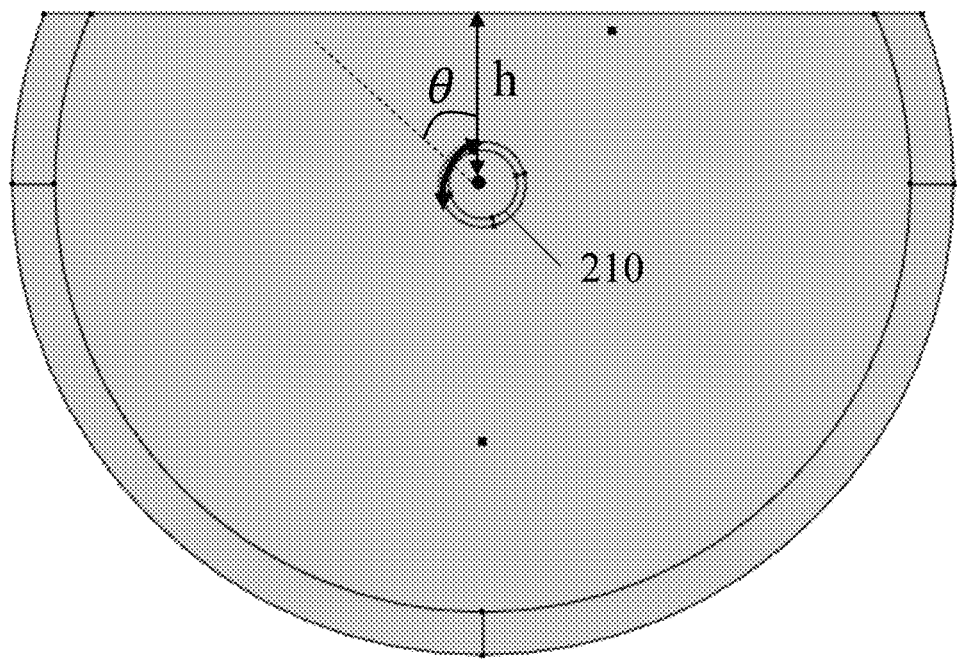
FIG. 11A is a schematic diagram illustrating an exemplary positional relationship between a sound-production portion and a reflection wall surface according to some embodiments of the present disclosure.

FIG. 11A is a schematic diagram illustrating a positional relationship between a sound-production portion and a reflection wall surface according to some embodiments of the present disclosure. Referring to FIG. 11A, in some embodiments, a straight line distance from a center of the sound-production portion (e.g., the sound-production portion 210) to the reflection wall surface is defined as h. An angle between a normal line of a sound outlet hole that points outward from the center of the sound-production portion and a straight line between the center of the sound-production portion and the reflection wall surface is θ. The distance h reflects a distance between the sound-production portion and a wall of a concha cavity in a wearing state, and the angle θ represents the orientation of the sound outlet hole relative to the inner wall of the concha cavity in the wearing state. Differences values of the distance h or the angle θ result in different distributions of sound pressure in a reflection field.

Figure 11B:
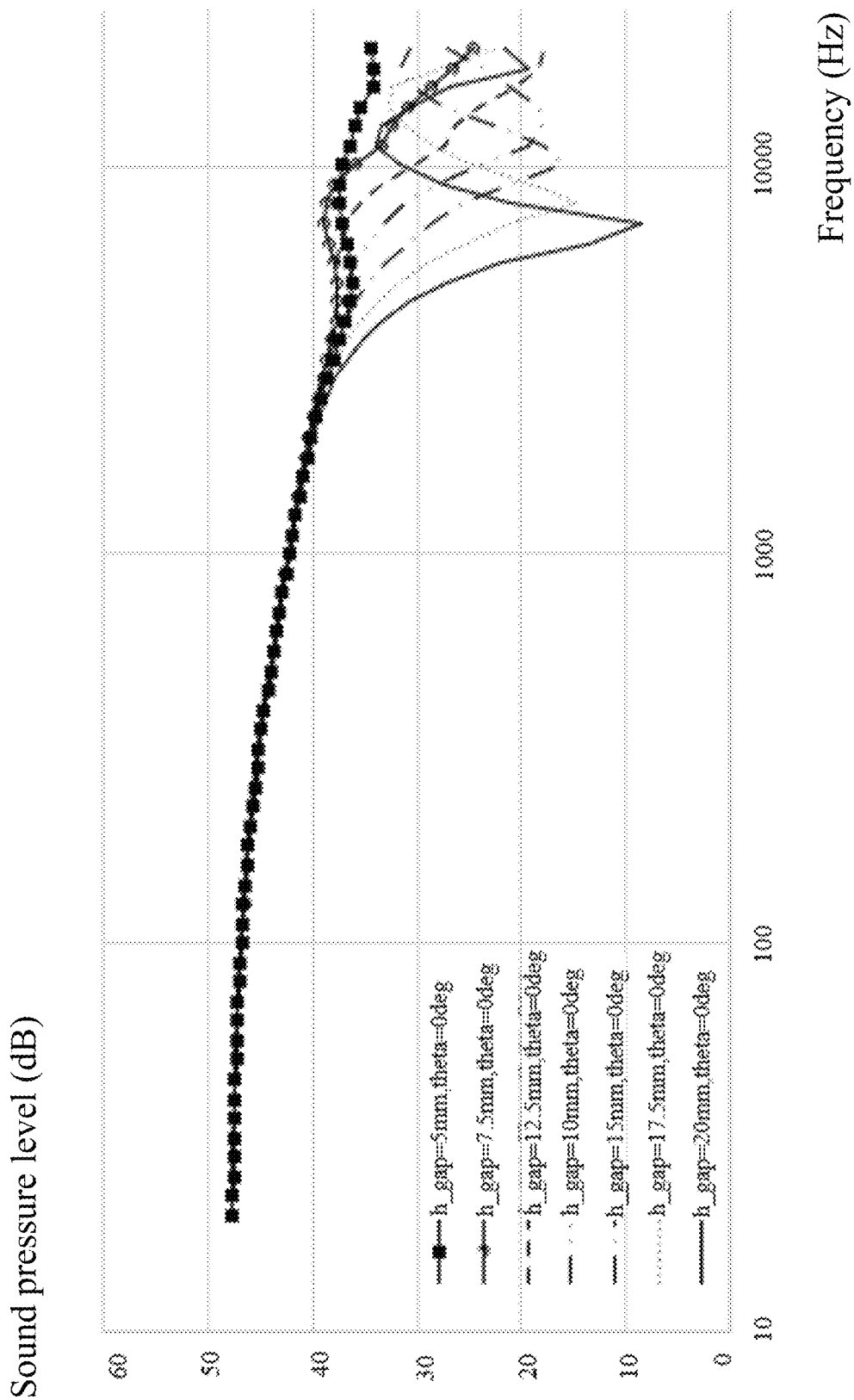
FIG. 11B is a diagram illustrating sound pressure level curves corresponding to a reflection field when a distance h is different according to some embodiments of the present disclosure.

FIG. 11B is a diagram illustrating sound pressure level curves corresponding to a reflection field when the distance h is different according to some embodiments of the present disclosure. Different curves in FIG. 11B represent a corresponding sound pressure level curve when the distance h (denoted by h_gap in the figure) is 5 mm, 7.5 mm, 10 mm, 12.5 mm, 15 mm, 17.5 mm, and 20 mm, respectively, under the condition that the angle θ is 0°. A comparison of each curve shows that the smaller the distance h (i.e., the closer the sound-production portion is to the reflection wall surface), the higher the sound pressure level in a high frequency. Corresponding to a structure of the clipping earphone 200 in the preceding section, when the clipping earphone 200 is in a wearing state, an outer surface of the shell 211 of the sound-production portion 210 adheres to the inner wall of the concha cavity, and at least a portion of the sound outlet hole 213 is blocked by the inner wall of the concha cavity, so that a volume of sound that is exported out of the sound outlet hole 213 and transmitted to the ear canal of the wearer can be increased in the clipping earphone 200.

Figure 11C:
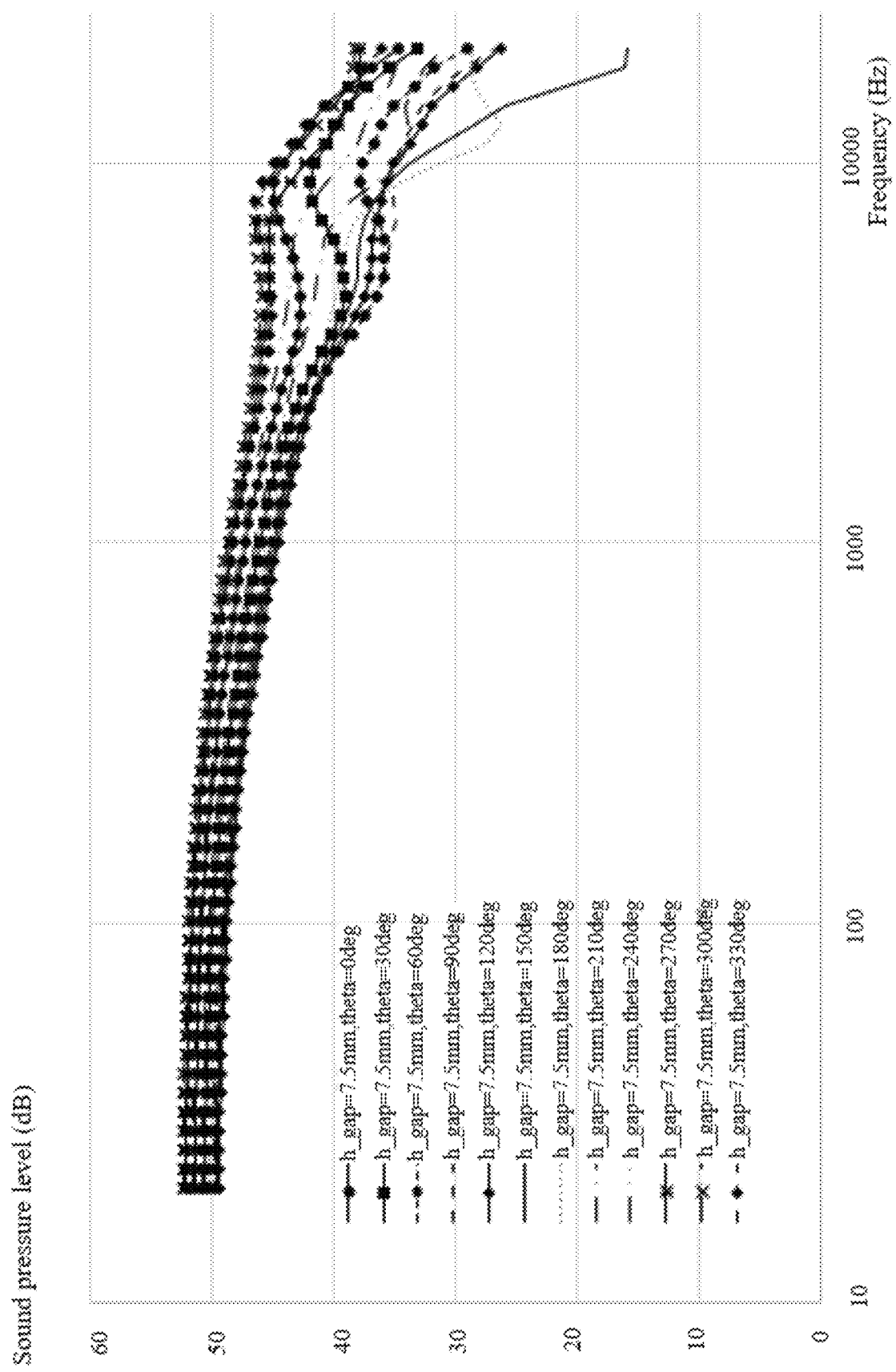
FIG. 11C is a diagram illustrating sound pressure level curves corresponding to a reflection field when an angle θ is different according to some embodiments of the present disclosure.

FIG. 11C is a diagram illustrating sound pressure level curves corresponding to a reflection field when the angle θ is different according to some embodiments of the present disclosure. Different curves in FIG. 11C represent corresponding sound pressure level curves when the angle θ (denoted by theta in the figure) is at 0°, 30°, 60°, 90°, 120°, 150°, 180°, 210°, 240°, 270°, 300°, and 330°, respectively, under a condition that the distance h is 7.5 mm. A comparison of each curve shows that a sound pressure level of a sound transmitted to a hearing point is greater when the sound outlet hole is pointing towards the hearing point (e.g., an opening of an ear canal) and a reflection wall surface (in the wearing condition).

Figure 12:
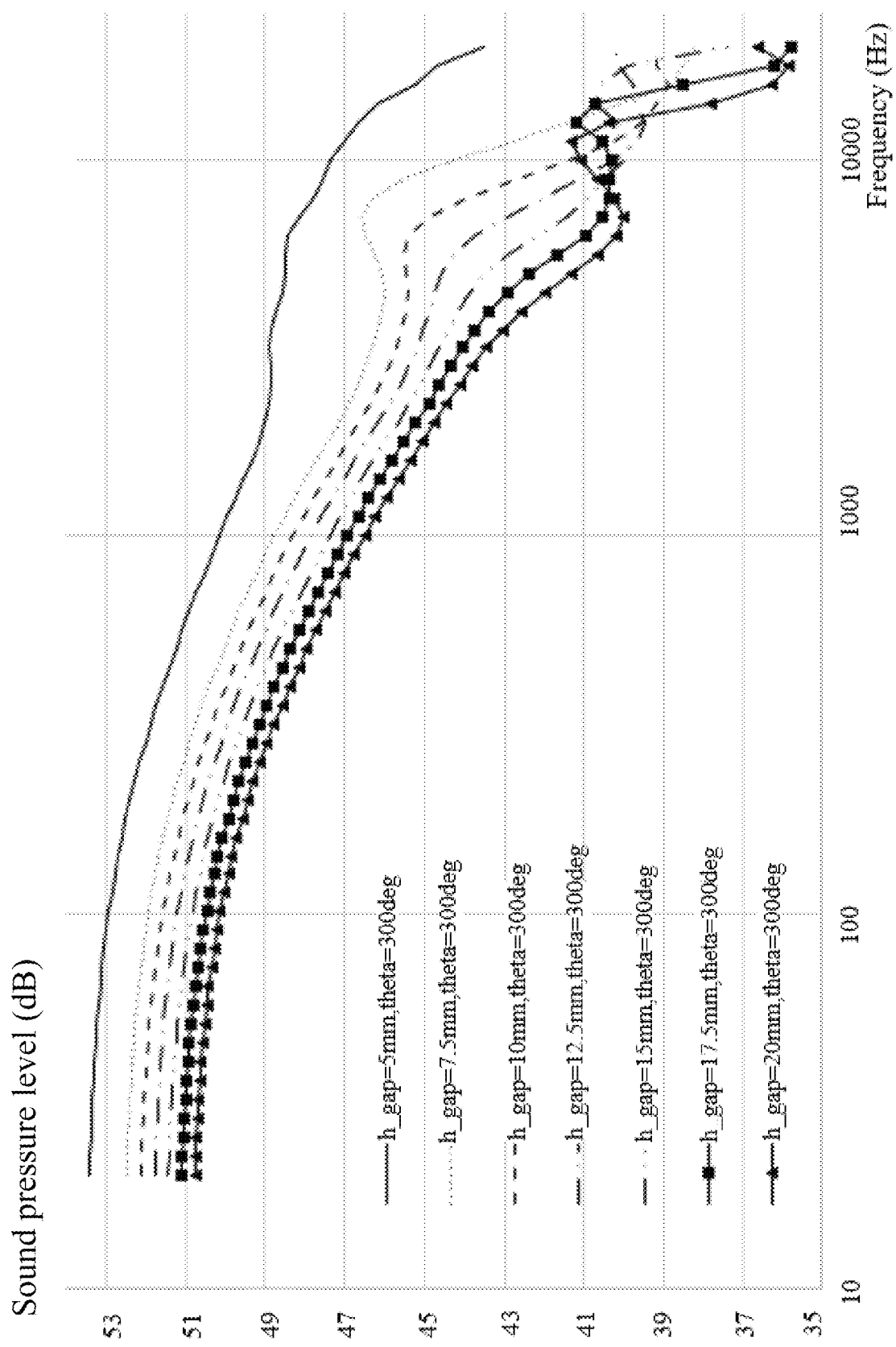
FIG. 12 is a diagram illustrating sound pressure level curves corresponding to a reflection field when a distance h is different according to some embodiments of the present disclosure.

FIG. 12 is a diagram illustrating sound pressure level curves corresponding to a reflection field when the distance h is different according to some embodiments of the present disclosure. Different curves in FIG. 12 represent corresponding sound pressure level curves when the distance h is 5 mm, 7.5 mm, 10 mm, 12.5 mm, 15 mm, 17.5 mm, and 20 mm, respectively, under a condition that the angle θ is 300°. In some embodiments, the sound pressure level is maximized under a condition that the angle θ is the same, a sound-production portion is in contact with a reflection wall surface, and a sound outlet hole is located on a side where a contact point is located (e.g., a feature point on the shell 211 mentioned above). As shown in a solid curve of FIG. 12, when the distance h is 5 mm and the angle is 300°, the sound-production portion is in contact with the reflection wall surface and the sound outlet hole is completely located at a side where the contact point is located, at this time, the sound pressure level is maximized. Corresponding to a structure of the clipping earphone 200 in the preceding section, when the clipping earphone 200 is in a wearing state, an outer surface of the shell 211 of the sound-production portion 210 is in contact with a wall of a concha cavity, and a feature point (and its nearby region) on the shell 211 may be blocked by the inner wall of the concha cavity, and when the sound outlet hole 213 is completely located on a side of the feature point (e.g., the arc BC in FIG. 4A is completely located on a side of the first projection point A), it can be ensured that a partial region of the sound outlet hole 213 is blocked by the inner wall of the concha cavity while an unblocked region is directed toward an opening of an ear canal, thereby allowing a wearer to hear a higher volume of the listening sound.

Figure 13:
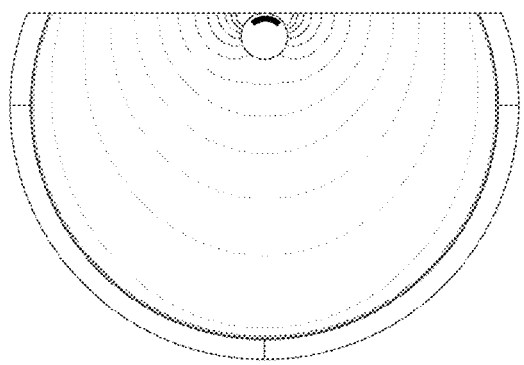
FIG. 13 is a diagram illustrating sound pressure level curves when a distance h is the same and an angle θ is different at the same frequency according to some embodiments of the present disclosure.
Figure 13:
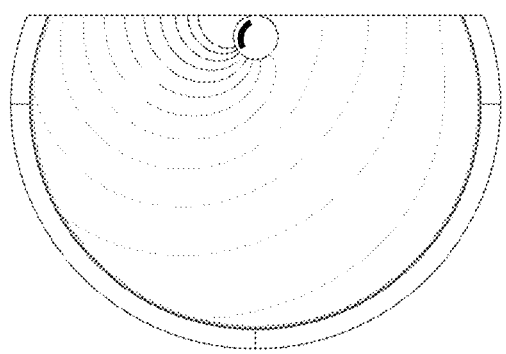
Figure 13:
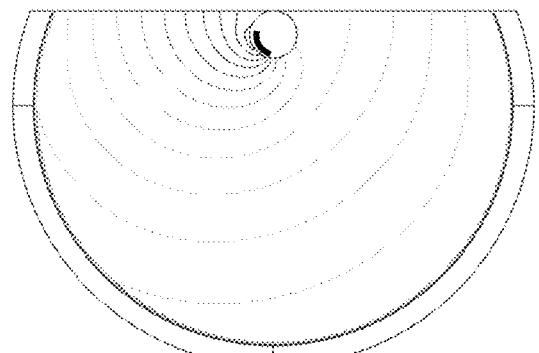
Figure 13:
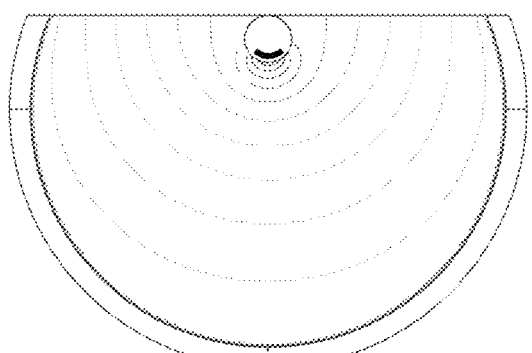
Figure 13:
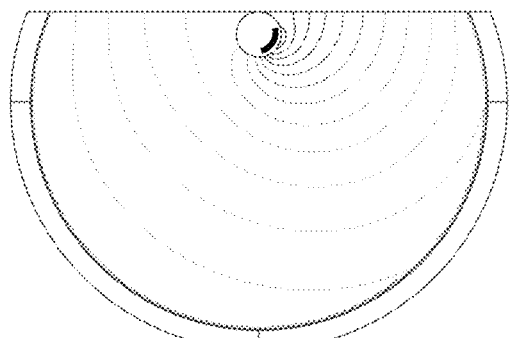
Figure 13:
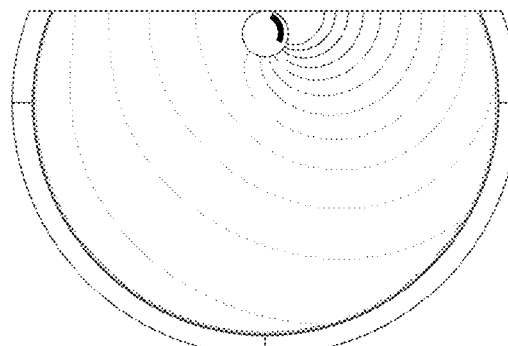

FIG. 13 is a diagram illustrating sound pressure level curves when the distance h is the same and the angle θ is different at the same frequency according to some embodiments of the present disclosure. (a)-(f) in FIG. 13 represent corresponding sound pressure level curves when the angle θ changes at a frequency of 2000 Hz and a distance h of 5 mm, respectively (i.e., a sound-production portion is in contact with a reflection wall surface). (a)-(f) in FIG. 13 correspond to angles θ of 0°, 60°, 120°, 180°, 240°, and 300°, respectively. A comparison of (a)-(f) in FIG. 13 shows when a normal line of a sound outlet hole that points outward from a center of the sound-production portion points obliquely to the reflection wall surface (e.g., the angle θ is 60° or 300°), it can produce the maximized sound pressure level (an area of a large sound-pressure-level region is the largest) on one side, and the large sound-pressure-level region on that side may be regarded as a listening position.

In conjunction with FIG. 11A to FIG. 13, the distance h reflects a distance between the sound-production portion and a wall of a concha cavity in a wearing state, and the angle of θ reflects the orientation of the sound outlet hole relative to the inner wall of the concha cavity in the wearing state. A distribution of sound pressure in a reflection field is different when the distance h and/or the angle θ are different. Corresponding to the clipping earphone 200 in the preceding section, when the distance between the sound-production portion 210 of the clipping earphone 200 and the inner wall of the concha cavity in the wearing state, and/or the orientation of the sound outlet hole 213 of the sound-production portion 210 relative to the concha cavity wall is different, a volume of a sound exported out of the sound outlet hole 213 of the clipping earphone 200 to the ear canal of the wearer is different. When an outer surface of the shell 211 of the sound-production portion 210 is in contact with the inner wall of the concha cavity, a partial region of the sound outlet hole 213 is blocked by the inner wall of the concha cavity, and the sound outlet hole 213 is located exclusively on one side where a feature point is located on the shell 211, it is possible to make a reflection field formed by a sound field of a sound exported via the sound outlet hole 213 stronger, so to increase a volume of a sound exported out of the sound outlet hole 213 of the clipping earphone 200 and transmitted to the ear canal of the wearer.

Figure 14:
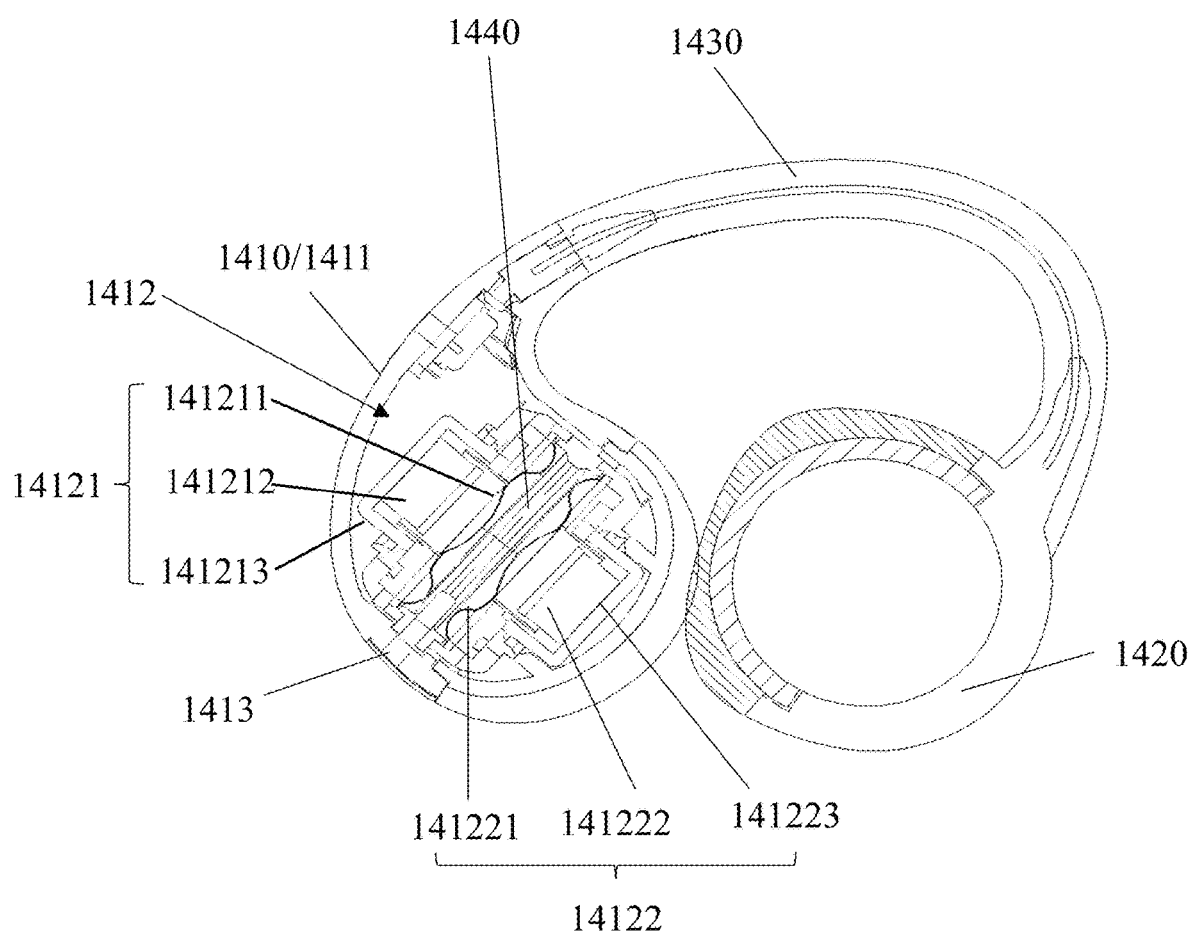
FIG. 14 is a schematic diagram illustrating an exemplary structure of another clipping earphone according to some embodiments of the present disclosure.

FIG. 14 is a schematic diagram illustrating an exemplary structure of another clipping earphone according to some embodiments of the present disclosure. A structure of a clipping earphone 1400 shown in FIG. 14 is substantially the same as a structure of the clipping earphone 200. For example, a sound-production portion 1410, an abutting portion 1420, an ear hook 1430, a shell 1411, a sound-production component 1412 (e.g., a first sound driver 14121, a first vibration diaphragm 141211, a first magnet 141212, a first magnetic shield 141213, and a second sound driver 14122, a second vibration diaphragm 141221, a second magnet 141222, a second magnetic shield 141223) are each structured substantially the same as corresponding structures (e.g., the sound-production portion 210, the abutting portion 220, the ear hook 230, the shell 211, the sound-production component 212) in the clipping earphone 200. A difference between the structure of the clipping earphone 1400 and the structure of the clipping earphone 200 is that a sound outlet hole 1413 is provided in a different manner from the sound outlet hole 213. It should be noted that the sound-production component 1412 is described in this embodiment as including two sound drivers as an example, and in other embodiments, the sound-production component 1412 also includes only one sound driver.

In some embodiments, the sound outlet hole 1413 of the clipping earphone 1400 has an outer end surface with an elongated shape, and the outer end surface has a second symmetry plane that is parallel to a lengthwise extension direction of the elongate. In some embodiments, the second symmetry plane is perpendicular to the first symmetry plane 300 of the ear hook 1430. With this setup, when the clipping earphone 1400 is in a wearing state, the sound outlet hole 1413 is less likely to be blocked by a wall of a concha cavity, which enables more sound exported via the sound outlet hole 1413 to be transmitted to a wearer's ear canal, thereby improving the sound volume and sound effect.

In some embodiments, the sound outlet hole 1413 is in acoustic communication with a front cavity of the sound-production component 1410, and the sound outlet hole 1413 exports a sound out of the front cavity of the sound-production component 1410 to the shell 1411. For example, when the sound-production component 1412 includes two sound drivers, a first sound transmission channel 1440 is formed between the first vibration diaphragm 14121 of the first sound driver 14121 and the second vibration diaphragm 141221 of the second sound driver 14122, the first sound transmission channel 1440 forms a front cavity or a portion of a front cavity of the two sound drivers. The sound outlet hole 1413 is in acoustic communication with the first sound transmission channel 1440, and sounds generated by front sides of both vibration diaphragms are exported out through the first sound transmission channel 1440 and the sound outlet hole 1413 to the exterior of the shell 1411 and further transmitted to a listening position. It can be seen whether the sound outlet hole 1413 is blocked by the inner wall of the concha cavity in the wearing state affects the listening volume heard by a wearer. For example, when the sound outlet hole 1413 is blocked by the inner wall of the concha cavity, a sound exported to the outside of the shell 1411 via the sound outlet hole 1413 is smaller, and the wearer hears a smaller listening volume. When the sound outlet hole 1413 is not blocked by the inner wall of the concha cavity, a sound exported to the outside of the shell 1411 via the sound outlet hole 1413 is larger, and the wearer hears a larger listening volume.

In order to ensure that the sound outlet hole 1413 in the wearing state is not blocked by the inner wall of the concha cavity, and to improve the listening volume of the wearer, in some embodiments, a position of the sound outlet hole 1413 on the shell 1411 may be set. Combined with the previous description, a portion of the shell 1411 that is closer to a feature point on the shell 1411 may be blocked by the inner wall of the concha cavity, and a portion of the shell 1411 that is further away from the feature point on the shell 1411 is not blocked by the inner wall of the concha cavity. Based on this, to ensure that the sound outlet hole 1413 is not blocked by the inner wall of the concha cavity, a straight line distance between a center of a projection of an outer end surface of the sound outlet hole 1413 on the first symmetry plane 300 and a first projection point (e.g., the first projection point A) formed by a projection of the feature point on the shell 1411 on the first symmetry plane 300 is in a range of 7.0 mm to 8.5 mm. The center of the projection of the outer end surface of the sound outlet hole 1413 on the first symmetry plane 300 refers to a shaped center formed by the projection of the outer end surface of the sound outlet hole 1413 on the first symmetry plane 300.

Figure 15:
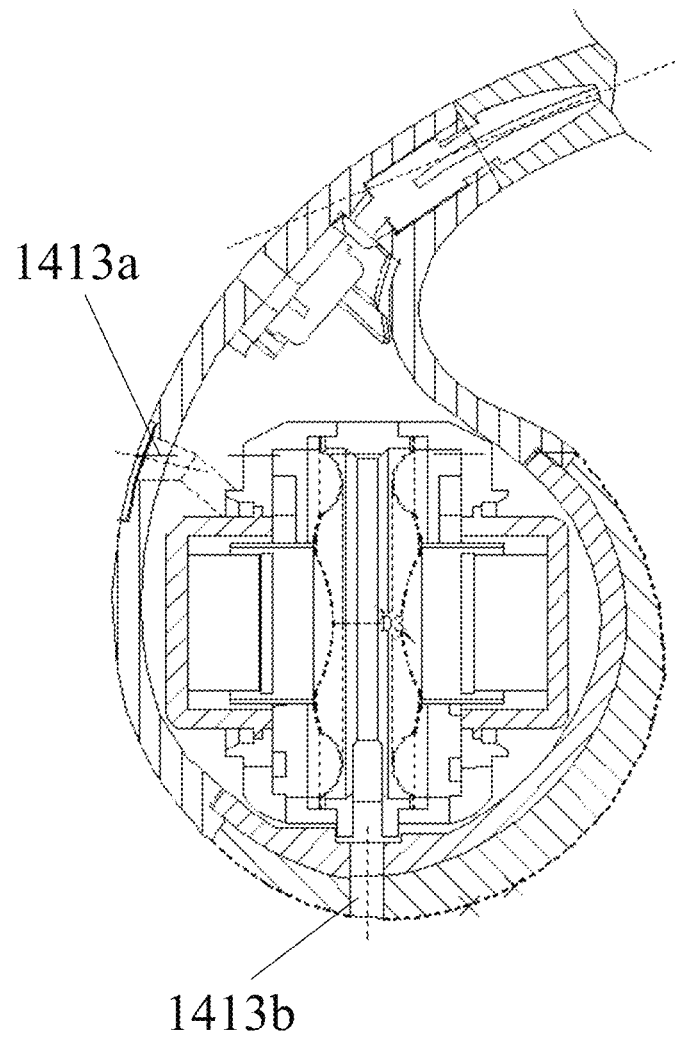
FIG. 15 is a schematic diagram illustrating an exemplary structure of a sound-production portion according to some embodiments of the present disclosure.

FIG. 15 is a schematic diagram illustrating an exemplary structure of a sound-production portion according to some embodiments of the present disclosure. In some embodiments, as shown in FIG. 15, the sound outlet hole 1413 is located at a first limit position 1413b on the shell 1411 when a straight line distance between a center of a projection of an outer end surface of the sound outlet hole 1413 on the first symmetry plane 300 and a first projection point (e.g., the first projection point A) is the shortest. The sound outlet hole 1413 may be located at a second limit position 1413a on the shell 1411 when the straight line distance between the center of the projection of the outer end surfaces of the sound outlet hole 1413 on the first symmetry plane 300 and the first projection point (e.g., the first projection point A) is the longest.

In some embodiments, when the sound-production component 1412 includes two sound drivers, since the sound outlet hole 1413 is in acoustic communication with the first sound transmission channel 1440, when the sound outlet hole 1413 is located at different positions on the shell 1411, the first sound transmission channel 1440 extends in a different direction, which means that the sound-production component 1412 (or a vibration diaphragm) is oriented/angled differently in an accommodation cavity. In some embodiments, a direction/angle in which the sound-production component 1412 is within the accommodation cavity is adjustable (it is also understood that the sound-production component 1412 is rotatable relative to the shell 1411). As an example, the direction/angle of the sound-production component 1412 set in the accommodation cavity is represented as an angle between a symmetry plane of the sound-production component 1412 and a horizontal plane in a wearing state. The symmetry plane of the sound-production component 1412 is a symmetry plane between the first vibration diaphragm 141211 and the second vibration diaphragm 141221. The first sound driver 14121 and the second sound driver 14122 are located on two sides of the symmetry plane of the sound-production component 1412, respectively. It should be noted that the symmetry plane of the sound-production component 1412 is always perpendicular to the first symmetry plane 300 of the ear hook 1430, regardless of the direction/angle at which the sound-production component 1412 is set in the accommodation cavity.

By adjusting the direction/angle of the sound-production component 1412 in the accommodation cavity, the position of the sound outlet hole 1413 on the shell 1411 can be adjusted so as to ensure that the sound outlet hole 1413 is not blocked by a wall of a concha cavity in the wearing state, and to increase a listening volume heard by a wearer.

In some embodiments, the sound outlet hole 1413 has a center axis. When the outer end surface of the sound outlet hole 1413 is elongated, the outer end surface has four vertices that form two diagonal lines, and an axis that passes through an intersection of the two diagonal lines of the outer end surface with an elongated shape and is perpendicular to the outer end surface is the center axis of the sound outlet hole 1413. In some embodiments, when the sound-production component 1412 includes two sound drivers, the center axis of the sound outlet hole 1413 is located on the symmetry plane between the first vibration diaphragm 141211 and the second vibration diaphragm 141221.

In some embodiments, the center axis of the sound outlet hole 1413 is located on the first symmetry plane 300 of the ear hook 1430. At this point, the first symmetry plane 300 divides the outer end surface of the sound outlet 1413 into two symmetrical or nearly symmetrical portions along a lengthwise extension of the outer end surface of the sound outlet hole 1413. In this setup, it is possible to make the sound outlet hole 1413 squarely disposed on a bottom surface of the shell 1411, so that the sound outlet hole 1413 in the wearing state may be pointed toward an opening of an ear canal of the wearer.

In some embodiments, the center axis of the sound outlet hole 1413 also deviates from the first symmetry plane 300. At this point, the outer end surface of the sound outlet hole 1413 is not symmetric with respect to the first symmetry plane 300 along the lengthwise extension of the outer end surface of the sound outlet hole 1413. When the clipping earphone 1400 is worn, due to factors such as gravity or unstable wearing, the clipping earphone 1400 tends to tilt. By setting the center axis of the sound outlet hole 1413 to deviate from the first symmetry plane 300, the tilting of the clipping earphone 1400 due to gravity and other factors when wearing the clipping earphone 1400 may be off-center, so that the sound outlet hole 1413 of the tilted clipping earphone 1400 may be pointed to the ear canal, thereby ensuring the listening effect and the listening volume.

In some embodiments, when the clipping earphone 1400 is in the wearing state and is tilted due to gravity and other factors, a tilting angle (also known as an angle β mentioned later) is typically in a range of 0° to 30°. In some embodiments, in order to ensure that the sound outlet hole 1413 points to the ear canal when the clipping earphone 1400 is tilted, an angle formed between the center axis of the sound outlet hole 1413 and the first symmetry plane 300 (i.e., an angle α mentioned later) is in a range of 15° to 45°.

In some embodiments, the sound outlet hole 1413 is located on the first rigid shell 2111. By locating the sound outlet hole 1413 on the first rigid shell 2111, the sound outlet hole 1413 does not extend into the second rigid shell 2112, which facilitates the splicing and fixation between an end portion of the first rigid shell 2111 and an end portion of the second rigid shell 2112 and improves precision. In addition, with this setup, it is also possible to avoid misalignment of the sound outlet hole 1413, and it is also possible to facilitate the installation of a stencil and a tuning grid on the sound outlet hole 1413.

In some embodiments, the clipping earphone 1400 includes two pressure relief holes (not shown in the figures), both of which are located on the shell 1411 of the sound-production component 1410. In some embodiments, both pressure relief holes are located on a first rigid shell of the shell 1411. With this setup, it can be ensured that the two pressure relief holes are farther away from the sound outlet hole 1413, thereby reducing the impact of a sound output via the two pressure relief holes on a volume of a sound output via the sound outlet hole 1413 at a listening position. In other alternative embodiments, the two pressure relief holes are located on a first rigid shell and a second rigid shell, respectively.

In some embodiments, acoustic holes (e.g., sound outlet holes, pressure relief holes, microphone holes, air vent holes, etc.) provided on the clipping earphone (e.g., the clipping earphone 200 and the clipping earphone 1400) are fully symmetrical. Taking a structure of the clipping earphone 1400 as an example, the center axis of the sound outlet hole 1413 of the clipping earphone 1400 is located on the first symmetry plane 300 of the ear hook 1430, at which time, along the lengthwise extension direction of the outer end surface of the sound outlet hole 1413, the first symmetry plane 300 divides the outer end surface of the sound outlet hole 1413 into two symmetrical or nearly symmetrical portions. When the clipping earphone 1400 includes two pressure relief holes, the two pressure relief holes may be symmetrically disposed with respect to the first symmetry plane 300. On the one hand, by isolating a rear cavity of the first sound driver 2121 from a rear cavity of the second sound driver 2122, it is possible to make sound signals output by the two sound drivers not the same, so as to make the clipping earphone 1400 have a crossover function to some extent; on the other hand, by isolating the rear cavity of the first sound driver 2121 from the rear cavity of the second sound driver 2122, it is also possible to reduce the mutual interference between the two sound drivers. In addition, other acoustic holes provided on the clipping earphone 1400, such as air vent holes, microphone holes, or the like, may also be symmetrically provided with respect to the first symmetry plane 300 to ensure that the acoustic holes on the clipping earphone 1400 are fully symmetrical.

As can be seen above, when a second symmetry plane of the sound outlet hole 1413 is perpendicular to the first symmetry plane 300 of the ear hook 1430, by adjusting the position of the sound outlet hole 1413 on the shell 1411, it is possible to adjust an output volume of the clipping earphone at the opening of the ear canal of the wearer.

Figure 16:
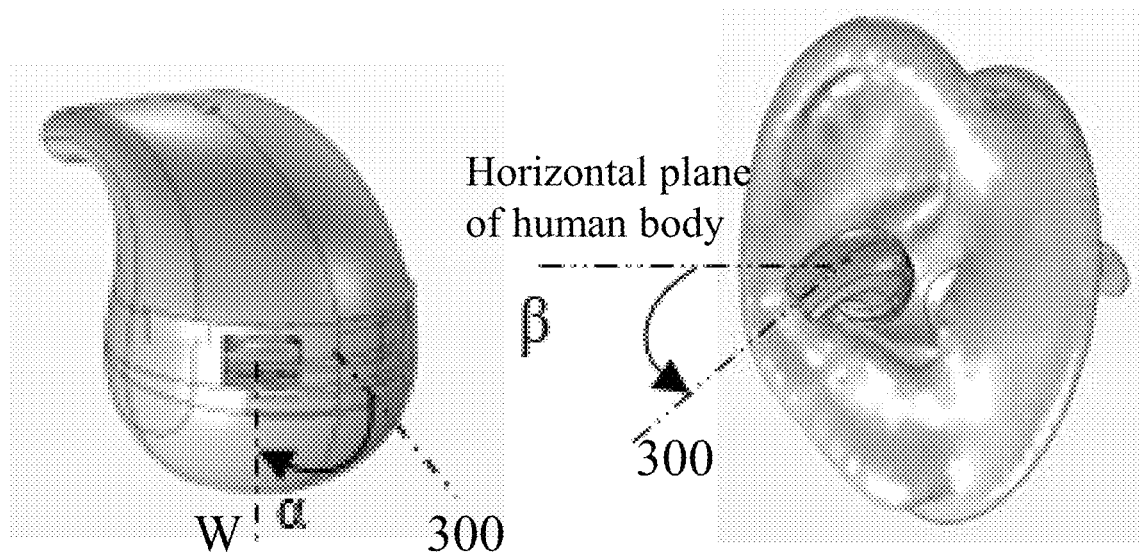
FIG. 16 is a schematic diagram illustrating a disposing position of a sound outlet hole and a wearing state according to some embodiments of the present disclosure.
Figure 17:
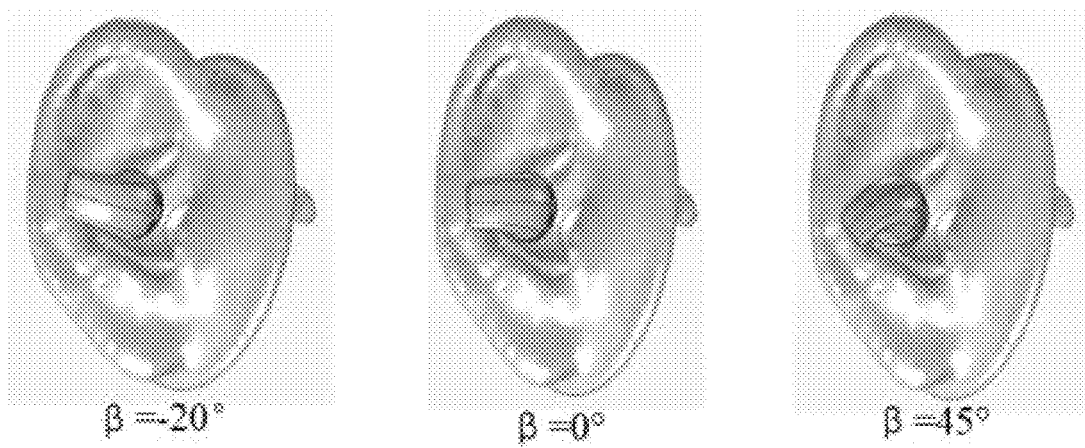
FIG. 17 is a schematic diagram illustrating wearing states at different angles β according to some embodiments of the present disclosure.
Figure 18:
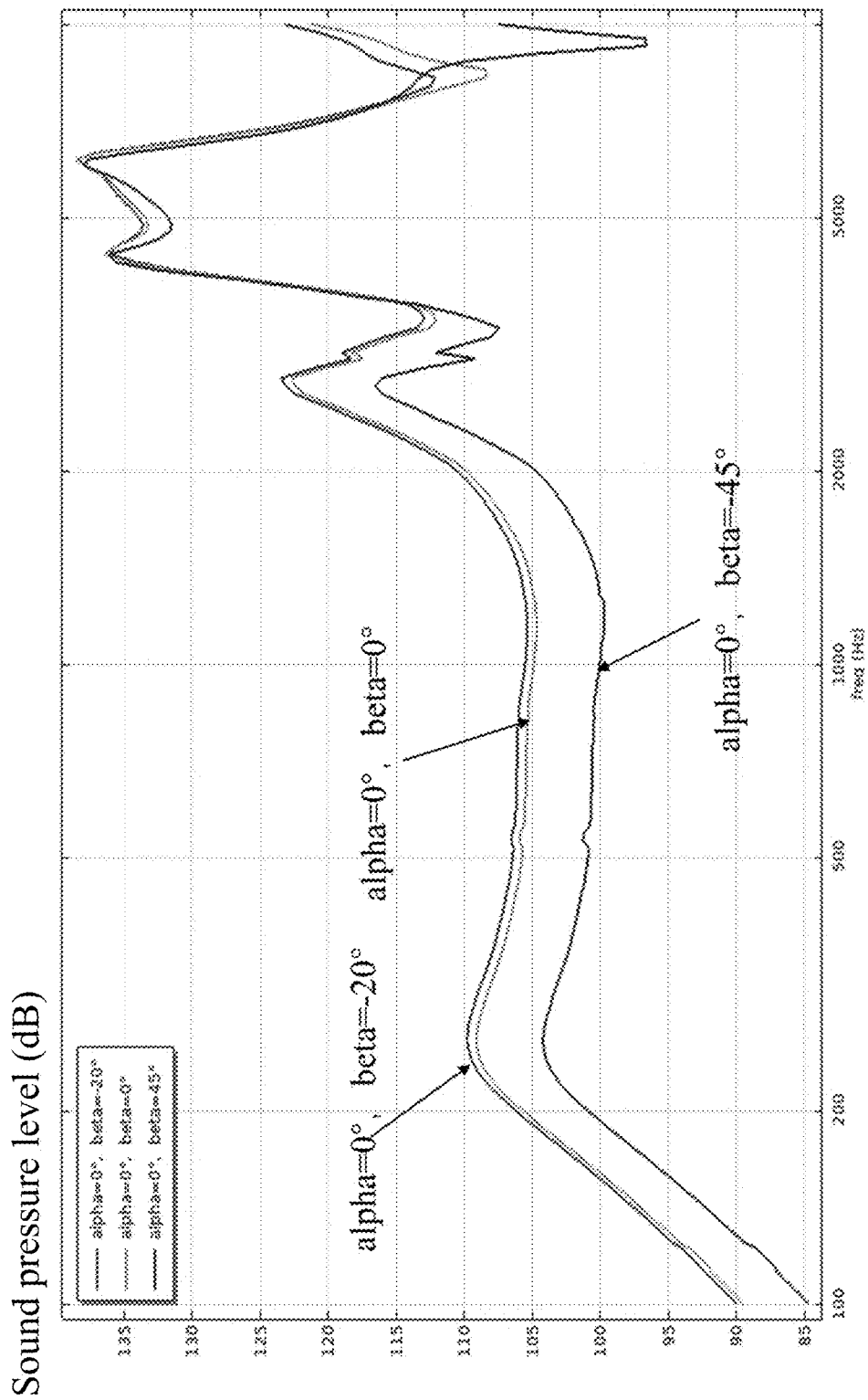
FIG. 18 is a diagram illustrating frequency response curves at an opening of an ear canal corresponding to different angles β when α is 0 according to some embodiments of the present disclosure.
Figure 19:
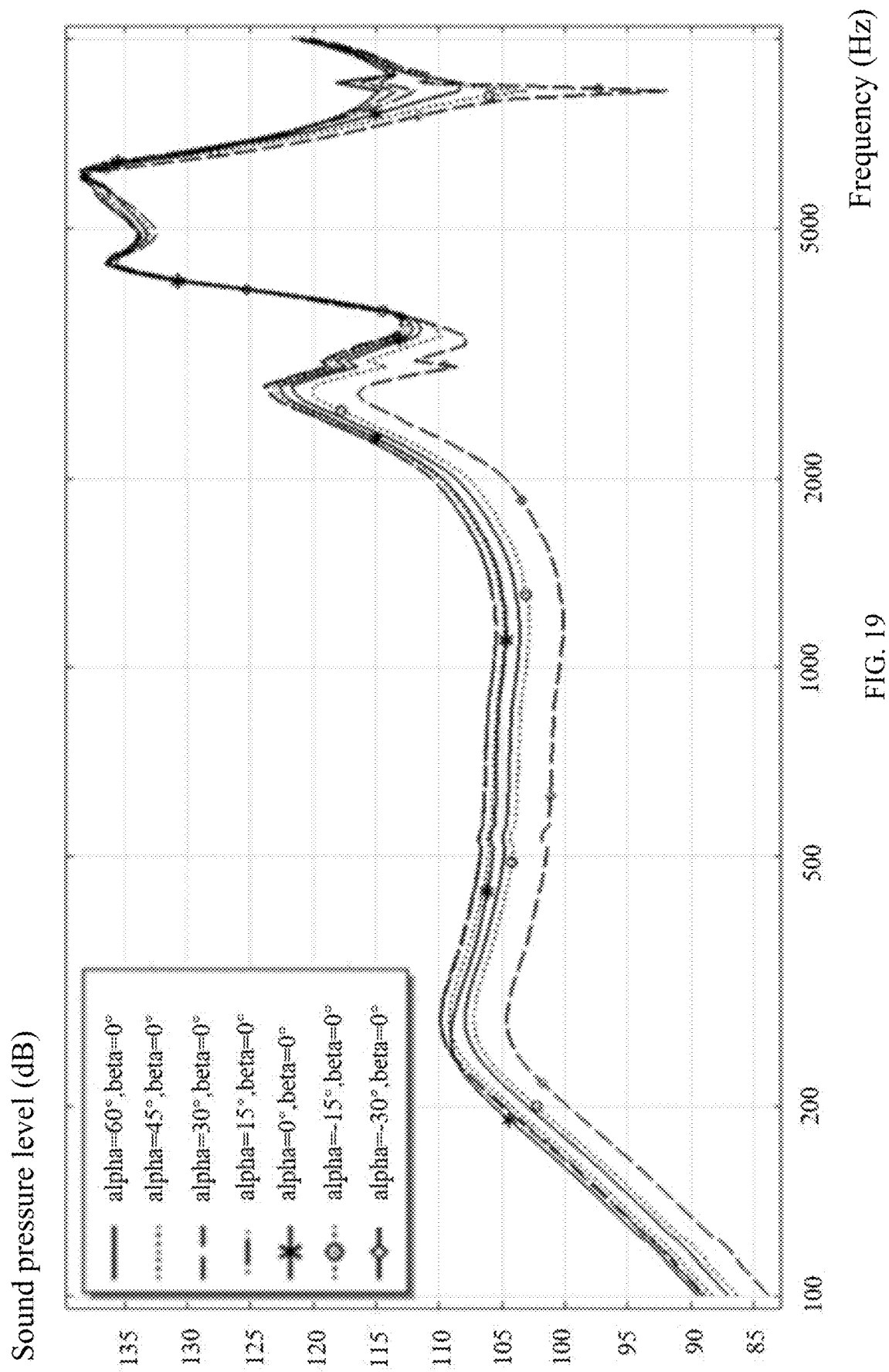
FIG. 19 is a diagram illustrating frequency response curves at an opening of an ear canal corresponding to different angles α when β is 0 according to some embodiments of the present disclosure.

FIG. 16 is a schematic diagram illustrating a disposing position of a sound outlet hole and a wearing state according to some embodiments of the present disclosure. FIG. 17 is a schematic diagram illustrating wearing states at different angles β according to some embodiments of the present disclosure. FIG. 18 is a diagram illustrating frequency response curves at an opening of an ear canal corresponding to different angles β when α is 0 according to some embodiments of the present disclosure. FIG. 19 is a diagram illustrating frequency response curves at an opening of an ear canal corresponding to different angles α when β is 0 according to some embodiments of the present disclosure.

Referring to FIG. 16 and FIG. 17, when a second symmetry plane of a sound outlet hole (e.g., the sound outlet hole 1413) is perpendicular to a first symmetry plane (e.g., the first symmetry plane 300) of an ear hook (e.g., the ear hook 1430), an angle between a normal line W of the sound outlet hole pointing outwardly from a sound-production portion and the first symmetry plane 300 of the ear hook is defined as a, and an angle between the first symmetry plane 300 of the ear hook and the horizontal plane of the human body is defined as β. As shown in FIG. 18, a horizontal coordinate represents a frequency (Hz) of a clipping earphone and a vertical coordinate represents a measured sound pressure level (dB). Fixing a (denoted by alpha in the figure) to be 0° (i.e., a center axis of the sound outlet hole is located on the first symmetry plane of the ear hook), and adjusting the angle β (denoted by beta in the figure) to be −20°, 0°, and 45°, respectively, frequency response curves of sounds of the clipping earphone exported at an opening of the ear canal were measured. From FIG. 18, it can be seen that the measured frequency response curve of the clipping earphone has the highest sound pressure level when α is 0° and β is −20°.

Further, with reference to FIG. 19, frequency response curves of sounds of the clipping earphone at the opening of the ear canal were measured by fixing β to be 0° (i.e., a wearing state in which the first symmetry plane of the ear hook is parallel to the horizontal plane of the human body), and adjusting angles α to be −30°, −15°, 0°, 15°, 30°, 45°, and 60°, respectively. From FIG. 19, it can be seen that when α is in a range of 15° to 45°, the measured sound pressure level of the frequency response curve of the clipping earphone is the highest, i.e. an output volume is the largest.

In addition, in the wearing state of the clipping earphone, β is usually in a range of 0° to 30° due to the influence of gravity, so when the sound outlet hole is set such that B is 0° (i.e., the wearing state in which the first symmetry plane of the ear hook is parallel to the horizontal plane of the human body) and the angle α between the normal line of the sound outlet hole and the first symmetry plane of the ear hook is in a range of 15° to 45°, the listening volume increases in a wearing scenario where B is in a range of 0° to 30°. Corresponding to a structure of the clipping earphone 1400 in the preceding section, i.e., the sound outlet hole 1413 is off-center on the shell 1411, which can offset the tilting of the clipping earphone 1400 due to gravity and other factors when worn, so that the tilted sound outlet hole 1413 of the clipping earphone 1400 can point toward the ear canal, thereby ensuring the listening effect and the listening volume.

The basic concepts have been described above, and it is apparent to those skilled in the art that the foregoing detailed disclosure serves only as an example and does not constitute a limitation of the present disclosure. Although not explicitly stated here, those skilled in the art may make various modifications, improvements and amendments to the present disclosure. These alterations, improvements, and modifications are intended to be suggested by the present disclosure, and are within the spirit and scope of the exemplary embodiments of the present disclosure.

The invention claimed is:

1. A clipping earphone, comprising:
    a sound-production portion configured to be disposed within a concha cavity of a wearer and in contact with an inner wall of the concha cavity, the sound-production portion including:
    a shell, the shell forming an accommodation cavity;
    a sound producer accommodated in the accommodation cavity; and
    a sound outlet hole disposed on the shell and being configured to export a sound generated by the sound producer, wherein a partial region of the sound outlet hole is blocked by the inner wall of the concha cavity;
    an abutting portion configured to abut behind an ear of the wearer; and
    an ear hook configured to bypass an antihelix and a helix of the wearer and connect the sound-production portion and the abutting portion, wherein the ear hook has a first symmetry plane, the sound outlet hole has a center axis, and the center axis is disposed on the first symmetry plane.

2. The clipping earphone of claim 1, wherein a projection of an outer end surface of the sound outlet hole on the first symmetry plane forms an arcuate segment, and a projection of the shell on the first symmetry plane has an arcuate outer profile, and at least a portion of the arcuate outer profile overlaps the arcuate segment.

3. The clipping earphone of claim 2, wherein the shell has a feature point that is in contact with or closest to the abutting portion, a projection of the feature point on the first symmetry plane forms a first projection point, and an arcuate length between an endpoint of two endpoints of the arcuate segment that is closer to the first projection point and the first projection point is in a range of 1.7 mm to 4.5 mm.

4. The clipping earphone of claim 3, wherein an arcuate length between an endpoint of the two endpoints of the arcuate segment that is farther away from the first projection point and the first projection point is in a range of 12 mm to 15.5 mm.

5. The clipping earphone of claim 2, wherein the shell projects onto and forms a first projection on the first symmetry plane, the abutting portion projects onto and forms a second projection on the first symmetry plane, and a tangent line that is tangent to a lower endpoint of the first projection and a lower endpoint of the second projection is a common tangent line, and a first tangent point of the common tangent line and the first projection is located on the arcuate segment.

6. The clipping earphone of claim 5, wherein a ratio of an arcuate length between a first endpoint of the arcuate segment and the first tangent point to an arcuate length between a second endpoint of the arcuate segment and the first tangent point is in a range of 0.5 to 0.85, the first endpoint is an endpoint of two endpoints of the arcuate segment that is closer to the first projection point, and the second endpoint is an endpoint of the two endpoints of the arcuate segment that is farther away from the first projection point, and the second endpoint of the arcuate segment is closer to an ear canal opening of the ear.

7. The clipping earphone of claim 5, wherein a normal line at the first tangent point intersects a normal line at a first endpoint point of the arcuate segment or a normal line at a second endpoint point of the arcuate segment at a center point, and a line connecting the first endpoint and the center point forms a first angle with a line connecting the first tangent point and the center point, a line connecting the second endpoint and the center point form a second angle with the line connecting the first tangent point and the center point, and a ratio of the first angle to the second angle is in a range of 0.2 to 1.3.

8. The clipping earphone of claim 2, wherein an arcuate length of the arcuate segment is in a range of 5.2 mm to 16.7 mm, and a width of the sound outlet hole is in a range of 1.4 mm to 2.2 mm.

9. The clipping earphone of claim 2, wherein a ratio of an arcuate length of the arcuate segment to a length of a straight line segment between a first endpoint and a second endpoint of the arcuate segment is in a range of 1.05 to 1.4.

10. The clipping earphone of claim 2, wherein a projection of the outer end surface of the sound outlet hole on the first symmetry plane forms an arcuate segment, the clipping earphone further comprises a pressure relief hole, a shortest straight line distance between a projection point of a center of the pressure relief hole on the first symmetry plane and the arcuate segment is in a range of 8.1 mm to 11 mm.

11. The clipping earphone of claim 2, wherein the shell has a feature point that is in contact with or closest to the abutting portion, a projection of the feature point on the first symmetry plane forms a first projection point, the clipping earphone further comprises a pressure relief hole, an arcuate length between a projection point of a center of the pressure relief hole on the first symmetry plane and the first projection point is in a range of 7.5 mm to 9.5 mm.

12. The clipping earphone of claim 1, wherein the sound outlet hole has an outer end surface with an elongated shape, the outer end surface has a second symmetry plane parallel to a lengthwise extension direction of the outer end surface, and the second symmetry plane is perpendicular to the first symmetry plane.

13. The clipping earphone of claim 1, further comprising two pressure relief holes, the two pressure relief holes being symmetrically arranged with respect to the first symmetry plane.

14. The clipping earphone of claim 10, wherein the sound producer includes two sound drivers, a first sound transmission channel is formed between vibration diaphragms of the two sound drivers, the sound outlet hole is in acoustic communication with the first sound transmission channel, and the first sound transmission channel forms a front cavity or a portion of the front cavity of the two sound drivers.

15. The clipping earphone of claim 14, wherein each sound driver includes a magnet and a magnetic shield sequentially located away from a corresponding vibration diaphragm, and a basket for support; at least one of the basket or the magnetic shield is provided with a plurality of air vent holes, a second sound transmission channel is formed between the two baskets of the two sound drivers, back sides of the two vibration diaphragms of the two sound drivers are in acoustic communication with the second sound transmission channel via the air vent holes on the baskets, and the second sound transmission channel forms a rear cavity or a portion of the rear cavity of the two sound drivers.

16. The clipping earphone of claim 15, wherein a difference between a resonance frequency of the front cavity and a resonance frequency of the rear cavity is in a range of 0.5 kHz to 1.5 kHz.

17. The clipping earphone of claim 15, wherein the air vent holes on the two baskets are located on two sides of the first symmetry plane, respectively, and the pressure relief hole extends in a direction perpendicular to the first symmetry plane.

18. The clipping earphone of claim 17, wherein two ends of the pressure relief hole extend to one air vent hole on each of the two baskets, respectively, and the two ends of the pressure relief hole have a larger opening size than a middle segment of the pressure relief hole.

19. The clipping earphone of claim 1, further comprising a pressure relief hole, wherein the pressure relief hole is further away from an ear canal opening of the ear than the sound outlet hole.

* * * * *